United States Patent
Kallman et al.

(10) Patent No.: US 10,298,075 B2
(45) Date of Patent: May 21, 2019

(54) INDUCTIVE CHARGING PORTS FOR PORTABLE COMPUTING DEVICES

(71) Applicant: Apple Inc., Cupertino, CA (US)

(72) Inventors: Benjamin J. Kallman, Menlo Park, CA (US); Michael B. Wittenberg, Sunnyvale, CA (US); Christopher S. Graham, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/442,209

(22) Filed: Feb. 24, 2017

(65) Prior Publication Data

US 2017/0250578 A1 Aug. 31, 2017

Related U.S. Application Data

(60) Provisional application No. 62/299,942, filed on Feb. 25, 2016, provisional application No. 62/399,179, filed on Sep. 23, 2016.

(51) Int. Cl.
*H02J 50/10* (2016.01)
*H02J 50/90* (2016.01)
(Continued)

(52) U.S. Cl.
CPC .............. *H02J 50/90* (2016.02); *H01F 27/02* (2013.01); *H01F 27/266* (2013.01); *H01F 27/40* (2013.01);
(Continued)

(58) Field of Classification Search
CPC .................................................... H02J 7/025
(Continued)

(56) References Cited

U.S. PATENT DOCUMENTS

| 4,795,173 A | 1/1989 | Osborne |
| 2015/0162120 A1* | 6/2015 | Ren ........................ H01F 38/14 307/104 |

FOREIGN PATENT DOCUMENTS

| CN | 201038358 Y | 3/2008 |
| CN | 104067479 A | 9/2014 |

(Continued)

OTHER PUBLICATIONS

International Search Report and Written Opinion dated Aug. 28, 2017 in International Application No. PCT/US2017/019408. 23 pages.

(Continued)

*Primary Examiner* — Edward Tso
*Assistant Examiner* — Ahmed H Omar
(74) *Attorney, Agent, or Firm* — Kilpatrick Townsend & Stockton LLP

(57) ABSTRACT

Connector assemblies may be space efficient, have a high corrosion resistance, are difficult to damage, reduce or prevent moisture leakage into an electronic device housing the connector assembly, are readily assembled, and are reliable. One example may provide an inductive charging port for transferring electrical energy from a first electric device to a second electronic device. As compared to conventional connector inserts and connector receptacles, these inductive charging ports may have a smaller form factor and consume a reduced volume in an electronic device. Corrosion resistance may be provided by including a protective layer or cover portion over what would otherwise be exposed surfaces of a transformer core. O-rings, gaskets, or other structures may be included to reduce moisture leakage into a device. The inductive charging port may include a low number of parts for a simplified assembly, and thermal (Continued)

management of various types may be used to improve reliability.

19 Claims, 61 Drawing Sheets

(51) Int. Cl.
    *H02J 7/02*     (2016.01)
    *H01F 38/14*     (2006.01)
    *H02J 7/00*     (2006.01)
    *H01F 27/02*     (2006.01)
    *H01F 27/26*     (2006.01)
    *H01F 27/40*     (2006.01)

(52) U.S. Cl.
    CPC ............ *H01F 38/14* (2013.01); *H02J 7/0042* (2013.01); *H02J 7/025* (2013.01); *H02J 50/10* (2016.02)

(58) Field of Classification Search
    USPC .......................................................... 320/108
    See application file for complete search history.

(56) References Cited

FOREIGN PATENT DOCUMENTS

| | | |
|---|---|---|
| CN | 104395974 A | 3/2015 |
| EP | 2 364 873 A1 | 9/2011 |
| TW | 1420771 B | 12/2013 |

OTHER PUBLICATIONS

Invitation to Pay Additional Fees and Partial Search Report dated May 19, 2017 in International Application No. PCT/US2017/019408. 14 pages.

Notice of Decision to Grant dated Mar. 28, 2019 in Chinese Application No. 2017800131599. 6 pages (includes English translation of allowed claims).

\* cited by examiner

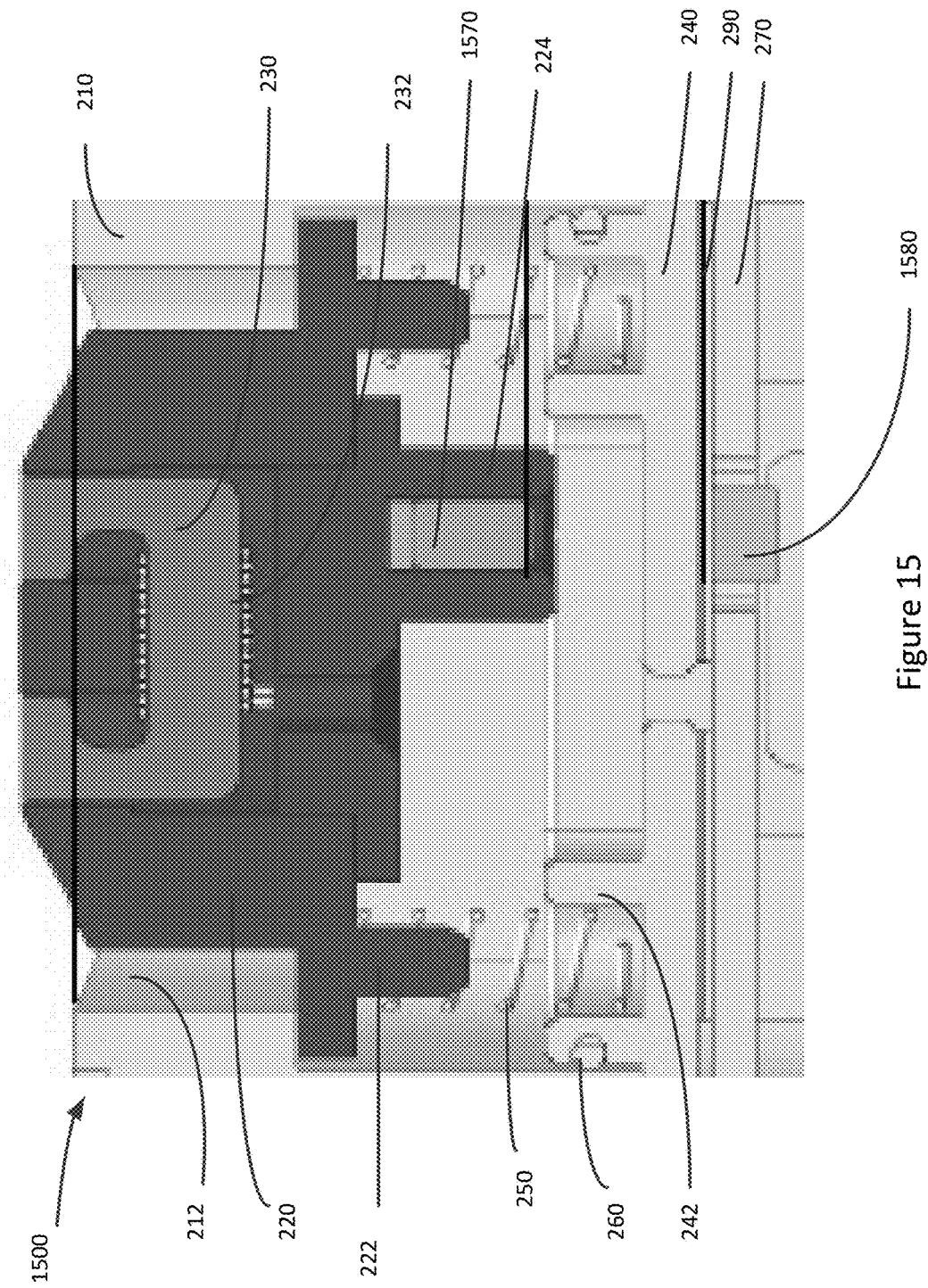

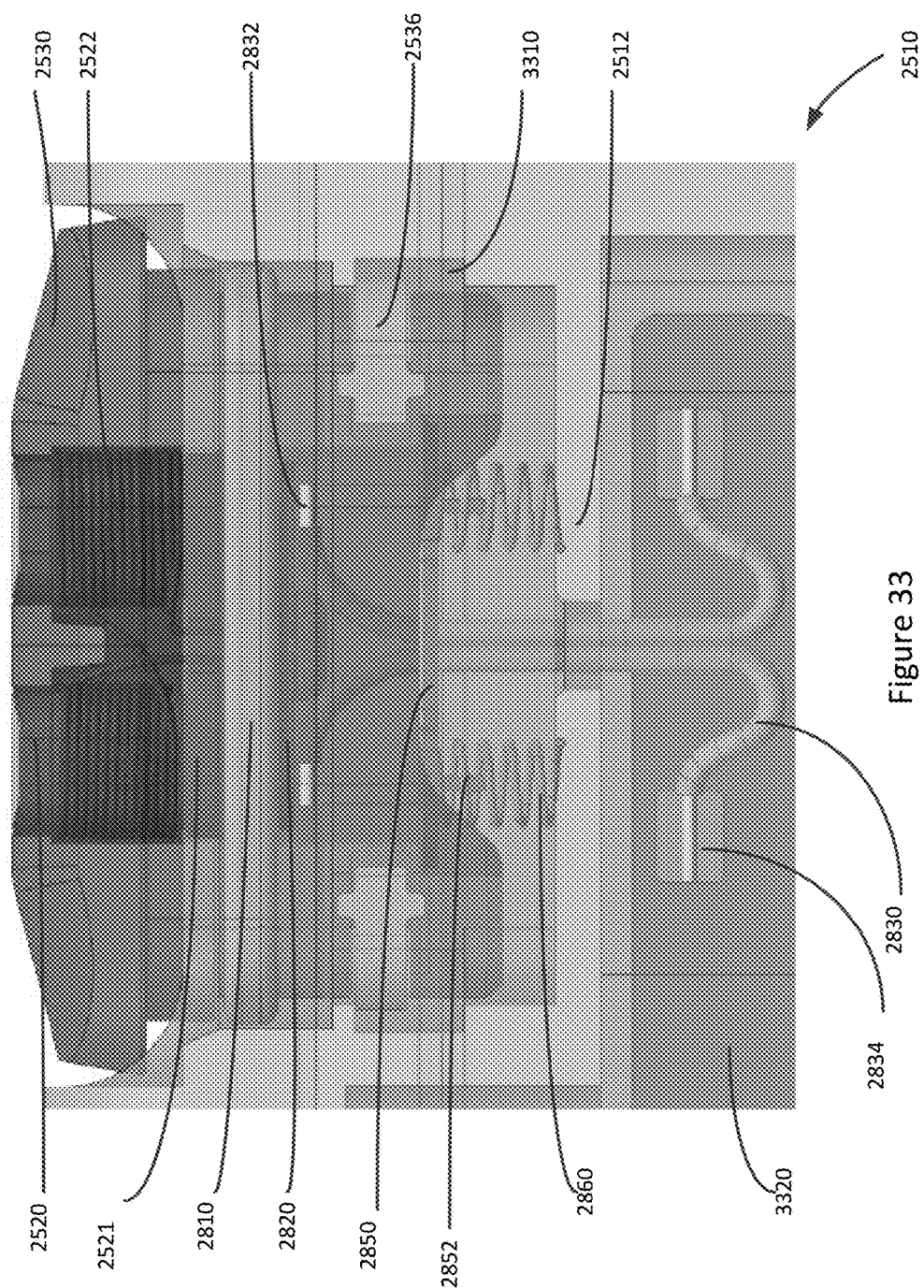

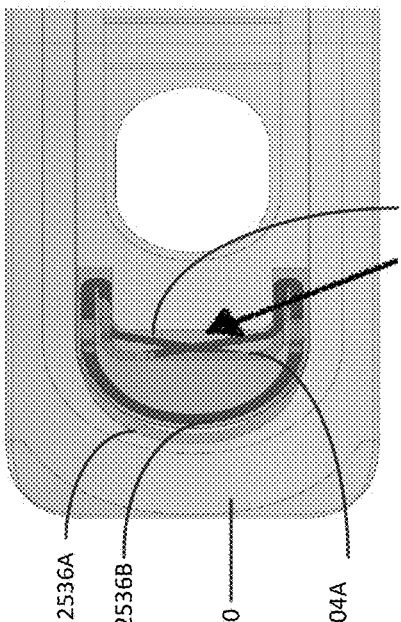
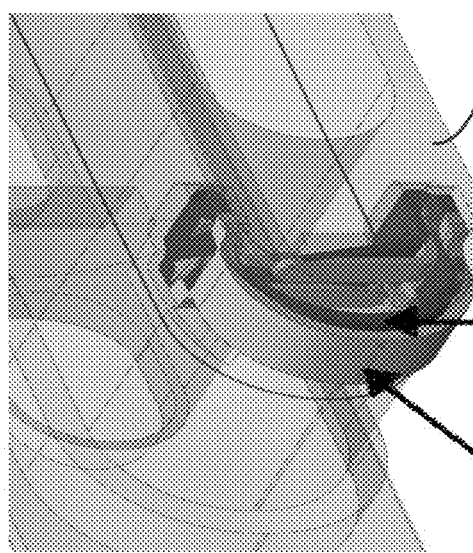
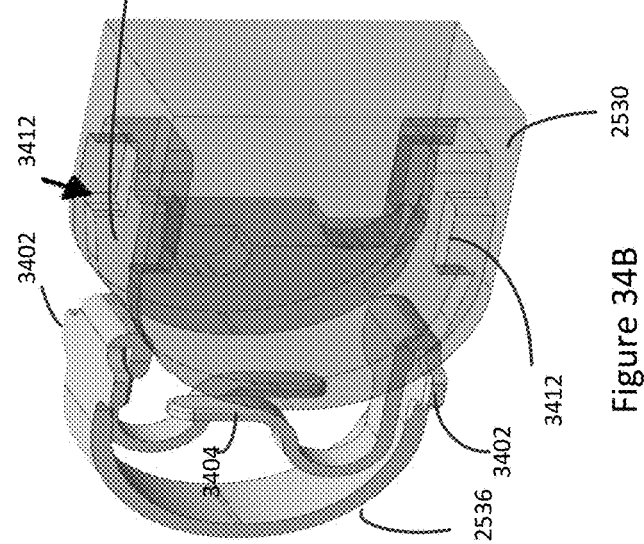

INDUCTIVE CHARGING PORTS FOR PORTABLE COMPUTING DEVICES

CROSS-REFERENCES TO RELATED APPLICATIONS

This application claims the benefit of U. S. patent provisional patent application Nos. 62/399,179, filed Sep. 23, 2016, and 62/299,942, filed Feb. 25, 2016, which are incorporated by reference.

BACKGROUND

Electronic devices often include one or more connector receptacles though which they may provide and receive power and data. This power and data may be conveyed over cables that may include a connector insert at each end of a cable. The connector inserts may be inserted into receptacles in the communicating electronic devices.

In other electronic systems, contacts on a first electronic device may be in direct physical and electrical contact with contacts on a second electronic device without the need for an intervening cable. In such systems, a connector insert may be formed as part of the first electronic device, while a connector receptacle may be formed as part of the second electronic device.

The electrical contacts on these directly connecting connector inserts and connector receptacles may be substantially formed on outside surfaces of the electronic devices. These surfaces may come into direct contact to form electrical connections between electronic devices to convey power and data.

Like other connector systems, there are potential drawbacks to this arrangement. For example, these connectors may be large. Since electronic devices are becoming ever smaller, the presence of large connectors may be non-optimal. Also, since the contacts are at the surfaces of the electronic devices, they may be exposed to corroding fluids that may shorten device lifespan. Since the electronic devices come into physical contact, the connector contacts may become damaged when a connection is formed. Electronic devices may also have fluids spilled on them or they may become partially submerged. Resulting moisture leakage may damage the electronic device housing the connector assembly. Also, connector systems may be manufactured in the millions of units. Accordingly, any simplification in the assembly process may noticeably reduce manufacturing costs. Further, a failure of the connector system may render an entire electronic device inoperable, so reliability may be important for maintaining customer satisfaction.

Thus, what is needed are connector assemblies that may be space efficient, have a high corrosion resistance, are difficult to damage, reduce or prevent moisture leakage into an electronic device housing the connector assembly, are readily assembled, and are reliable.

SUMMARY

Accordingly, embodiments of the present invention may provide connector assemblies that may be space efficient, have a high corrosion resistance, are difficult to damage, reduce or prevent moisture leakage into an electronic device housing the connector assembly, are readily assembled, and are reliable.

An illustrative embodiment of the present invention may provide a space efficient connector assembly by using inductive charging ports for transferring electrical energy from a first electric device to a second electronic device. As compared to conventional connector inserts and connector receptacles, these inductive charging ports may have a smaller form factor and consume a reduced volume in an electronic device. This may allow the device to be smaller or to include an increased level of functionality, or combination of the two. These inductive charging ports may transmit or receive power, though in various embodiments of the present invention, an inductive charging port may be arranged to only transmit or receive power. In a transmitting port of an electronic device, a 0.5 MHz, 1.0 MHz, 1.2 MHz, 2.0 MHz, or other frequency signal may be applied to a winding around a transformer core. This may induce a current in a winding around a transformer core in a second, mated receiving port in a second electronic device. The induced current may then be used to operate the second electronic device, charge a battery in the second electronic device, or both.

These inductive charging ports may provide corrosion resistance by including a protective layer or cover portion over what would otherwise be exposed surfaces of a transformer core. Even where surfaces of a transformer core are exposed, the transformer core may be formed using a soft ferrite material. These materials may be less susceptible to corrosion damage than a conventional stainless-steel or other type of contact.

Another illustrative embodiment of the present invention may provide connector assemblies that are difficult to damage by including protective features for transformer cores. One such embodiment may provide an inductive charging port for an electronic device, the inductive charging port located in an opening of a device enclosure and having a transformer core supported by a housing. The transformer core may have a front near a surface of the device enclosure such that the front of the transformer core is near a mating (or complementary) transformer core of a second device when the electronic device is mated to the second device. The housing may include a protective layer or cover portion over the front of a transformer core in order to protect the front of the transformer core during mating. A front surface of the protective layer or cover portion may be recessed below a surface of the device, again to protect the front of the transformer core during mating with a second electronic device. The protective layer or cover portion may be formed in various ways. For example, the housing may be formed by injection molding, then the protective layer or cover portion may be compressed by coining. The final protective layer or cover portion may have a thickness between 0.07 and 1.0 mm, between 0.09 and 0.12 mm, or it may have a different range of thickness. The reduced thickness of the protective layer or cover portion may improve inductive coupling with a second mated connector.

The spacing between a front surface of the protective layer or cover portion and the device enclosure may have a tight tolerance in order to maximize inductive coupling between the transformer core and the mating transformer core of the second device, while still protecting the transformer core during device mating. This tolerance may be met by measuring a thickness of the housing, a portion of the housing or other portion or portions of one or more inductive charging ports, measuring a thickness of one or more device enclosures, and then matching inductive charging ports and device enclosures based on the measured thicknesses such that the narrow tolerance is met. In these and other embodiments of the present invention, a shim may be placed between a lateral extension of the housing and a back of the device enclosure to accurately locate relative positions of surfaces of the transformer core and the device enclosure to meet this tolerance. In these and other embodiments of the present invention, a housing may be put into a proper position in a device enclosure, then fixed in place using glue or other adhesive to meet the required tolerance.

These and other protective features may be included in other embodiments of the present invention. In another illustrative embodiment, a connector assembly for an electronic device may include a housing supporting a transformer core. The housing may retract into a device enclosure while the electronic device is being mated with a second device and move forward when the mating has been achieved to reduce the gap between the mating transformer cores. This may protect the transformer core while the devices are being mated.

More specifically, to improve inductive coupling between devices, the housing may extend beyond a surface of the device enclosure. During mating, the electronic device and the second device may move laterally relative to each other. To avoid damage to the housing, the housing may retract into the enclosure while the enclosure of the second device moves across the face of the enclosure for the electronic device. Sloped lead-ins at the surface of the housing on each side of the transformer core may gradually push the housing into the enclosure as they are engaged by the second device. To further protect the transformer core, a surface of the transformer core may be recessed behind a peak of the lead-ins on the housing.

Another illustrative embodiment of the present invention may provide a connector assembly that reduces moisture leakage into an electronic device housing the connector assembly by using potting techniques, sealing structures such as O-rings, gaskets, or other structures or combination thereof.

Another illustrative embodiment of the present invention may provide a connector assembly that is readily assembled by having a reduced number of parts. In one example, an inductive charging port may be located in an opening of an enclosure for an electronic device. The inductive charging port may include a housing supporting a transformer core. A wire coil may be wrapped around at least a portion of the transformer core. The housing may include a front protective layer or cover portion over what would otherwise be an exposed face of the transformer core. A bracket may secure the housing to the enclosure. A flexible circuit board may deliver current to the wire coil and may be located between the bracket and the transformer core. Pliable material, such as foam, may be inserted between the flexible circuit board and the transformer core. The pliable material may protect windings of the coil and the flexible circuit board. Moisture leakage may be reduced by using a sealing structure between the housing and device enclosure. The sealing structure may be an O-ring, gasket, or other such structure. A shim between a lateral extension of the housing and a back of the device enclosure may be used to accurately locate relative positions of surfaces of the transformer core and the device enclosure.

In another embodiment of the present invention that is readily assembled by having a reduced number of parts, a housing and transformer core may move relative to a device enclosure. Specifically, an electronic device may include a connector assembly, where the connector assembly includes an inductive charging port. The inductive charging port may include a transformer core fixed to a first housing. A coil may be wrapped around at least a portion of the transformer core. A second housing may be fixed to the device enclosure. The second housing may be fixed in place using a bracket that is secure to the device enclosure by a fastener. A flexible circuit board may be located between the bracket and the second housing. Conductors on the flexible circuit board may electrically connect to leads of the windings around the transformer core. The first housing may include one or more tail portions, while the second housing may include one or more cavities that may be formed by sidewalls of the second housing. One or more springs or other resilient members may have a first end around a corresponding tail of the first housing and a second end seated in a corresponding one of the cavities of the second housing. The first housing and transformer core may thus be free to move relative to the enclosure and second housing. In operation, the one or more springs or other resilient members may bias the first housing into a resting position such that a forward portion of the first housing extends through an opening in the second housing, while a force applied to a front surface of the first housing may move the first housing into a retracted position in which the first housing may be flush with or entirely within the second housing. A sealing structure, such as an O-ring, may be located between the second housing and the enclosures. Potting material may be used for further moisture protection.

Another illustrative embodiment of the present invention may provide connector assemblies, such as inductive charging ports, that may be reliable. One way to improve reliability of an electronic device is to limit its operating temperature. For example, thermal paste may be used as a potting material in a connector assembly. In these and other embodiments of the present invention, a duty cycle of operation may be monitored and adjusted to limit a connector assembly's temperature. In these and other embodiments of the present invention, a level of power being transferred may be monitored and adjusted. These various adjustments may be made based on a needed power level of a connected device, the operating temperature of the connector assembly, or other factors, or combination thereof. In these and other embodiments of the present invention, more than one inductive charging port may be used to transfer data from an electronic device to a second electronic device.

Another illustrative embodiment of the present invention may provide a connector assembly that may detect when it is being mated with a connector on a second device. In one embodiment, a first magnetic element, such as a magnet, may be fixed to a first housing. A proximity sensor, such as a Hall-effect sensor, may be fixed to a flexible circuit board that may be fixed to a second housing. The first housing may move relative to the second housing when the connector assembly is mated to a second connector. The change in magnetic flux may be detected by the proximity sensor, which may then activate the electronic device or invoke other action in the device. In these and other embodiments of the present invention, a second magnetic element may be fixed to the bracket housing such that the proximity sensor is between the first and second magnetic elements, and a differential sensing scheme may be used.

In these and other embodiments of the present invention, other types of connection detection apparatus may be used. For example, a proximity sensor, such as a Hall-effect sensor, may be placed on a connector assembly, while a magnet may be placed on a second, mating connector assembly. The electronic device with the proximity sensor may detect a change in magnetic flux indicating that the second connector assembly is coming into a mated position. As another example, the presence of a mating connector assembly may be detected by providing a stimulus to a connector assembly and then monitoring the result. For instance, a coil on an inductive charging port may be activated for a short burst. A 5 MHz or other frequency signal may be applied to the coil for a limited duration. Following the burst, the decay of the resulting signal may be monitored. If a second, mating inductive charging port is present, the transformer in the mating port may sustain the signal and the decay may take longer to reach a threshold level, while if no mating transformer is present, the signal may decay quicker and reach a threshold level in a shorter time. As another example, an optical detect may be used to detect mating, or attachment. A light-emitting diode (LED) in an electronic device may generate light, which may be reflected by a surface of a mating connector in a second device as the second device moves across the surface of the electronic device. The reflected light may be detected using a photodiode, which may generate a signal indicating that a connection has been made. The LED and photodiode may also be used for data communication when connectors of the first and second electronic devices are mated. As still another example, a user may provide an input via a user interface to the electronic device indicating that a connection has been made. Any combination of presence detection techniques may be used, and the first and second electronic devices may use the same technique or different techniques.

In various embodiments of the present invention, different types of transformer cores having various winding arrangements may be used. Typically, ferrite material may be used to form the transformer core. The core may be formed as a unit, or it may have inductive portions coupled by a return plate. The contours of the surfaces of the transformer cores may be splined to match a contour of a surface of a device enclosure, and a physical vapor deposition (PVD) process may be used to match a color to a device enclosure as desired. In these and other embodiments of the present invention, the windings may be insulated. If the insulation is damaged, noise may occur. To prevent this noise, the transformer cores may have their edges smoothed during manufacturing, for example by using a tumbling process. The transformer cores may also be coated using a material such as paralyne or soft plastic to prevent damage to the winding insulation during the winding process and during use. In these and other embodiments of the present invention, a thickness of the insulation around the windings may be increased.

In various embodiments of the present invention, data may be provided over a connector system along with, or instead, of power. For example, a signal may be applied and removed from a transformer coil of a connector assembly in an electronic device to send binary data to a second, mated transformer coil of a connector assembly of a second electronic device. The signal may have a frequency of 27 MHz, 40 MHz, 48 MHz, or a different frequency. As another example, data may be communicated using an RF carrier signal modulated by a data signal. The signals may be sent and received using a dedicated data port of the connector system. The carrier signal may have a frequency in the 2.4 GHz or 60 GHz frequency bands, or in another frequency band. The data rate may be in the tens or hundreds of Mbps. For instance, a Bluetooth connection may be formed using capacitive antennae. The capacitive antennae may be very low power such that it does not interfere with other wireless communications that may be occurring between the mated devices or between one of the mated devices and a third device. As another example, optical signaling may be used to communicate data between devices. For instance, an LED and a photodetector (e.g., a photodiode) may be placed in a connector assembly in an electronic device and in a second connector assembly in a second electronic device.

In these and other embodiments of the present invention, other circuitry of the electronic device may be able to make use of portions of the connector assembly. For example, a bracket may be used to convey current for a power supply, as an antenna, as a guide or housing for an antenna, or for other purposes. For example, the bracket may be a plastic housing for an antenna.

Another embodiment of the present invention may provide another space efficient connector assembly by using inductive charging ports for transferring electrical energy between a first electronic device and a second electronic device. A first electronic device may include a first inductive port having a transformer that includes a transformer core having one or more legs surrounded by windings. The transformer may be located in a sleeve that may move relative to an enclosure for the first electronic device. The transformer may be encapsulated, for example with epoxy of other potting material, to seal the transformer and prevent moisture leakage into the first electronic device. Specifically, an epoxy or other potting material may be placed between the transformer and its sleeve, as well as behind the transformer between the transformer and the internal portions of the first electronic device.

In these and other embodiments of the present invention, a surface of the ferrite material of the transformer core may be exposed at a surface of the first electronic device. In these embodiments, a surface of the transformer core, a surface of the sleeve, and a surface of the epoxy or other potting material may form a surface of the inductive port. During assembly, the transformer core and its windings may be placed in sleeve. A liner may be placed over surfaces of the transformer core and sleeve. An epoxy or other potting material may be inserted between the transformer core and sleeve to encapsulate the transformer core, where the liner protects the surface of the transformer core from being exposed to the epoxy or potting material. The epoxy or other potting material may be cured and the lining may then be removed. Afterward, for cosmetic and functional reasons, the surfaces of the transformer core, sleeve, and potting material may be polished or otherwise smoothed together as a unit. For example, a buffing wheel, polishing cloth, fine grit sand paper, blasting, tumbling, or other method may be used. These surfaces may also be colored, for example by ink jet printing, pad printing, physical vapor deposition, epoxy, or other method. They may be colored black, they may be colored to match a device enclosure, or they may have another color. In still other embodiments of the present invention, the sleeve may be extended to provide a covering layer over a surface of the transformer.

A dynamic wire assembly may connect the transformer core windings to internal electronics of the first electronic device. This dynamic wire assembly may include wires having sufficient slack to account for movement of the sleeve relative to the remainder of the first electronic device.

Again, the inductive port of the first electronic device may move relative to an enclosure for the first electronic device. For example, the inductive port of the first electronic device may move in a connection direction towards an inductive port of a second electronic device when the first electronic device and the second electronic device are mated. This movement may be facilitated by a spring mechanism pushing the sleeve in the connection direction. This spring mechanism may include one or more springs or flexures. In various embodiments of the present invention the sleeve may move 0.2, 0.4, 1.0 mm or other distance in the connection direction.

Embodiments of the present may employ retention clips to limit the travel of sleeve. Specifically, notches may be formed in the device enclosure adjacent to the sleeve. Retention clips on the sleeve may compress against sides of the sleeve during assembly and may then expand into the notches, thereby securing the sleeve in place in the device enclosure. The notches may have a greater lateral length along a side of the sleeve as compared to the retention clip. This may allow the sleeve the ability to move as needed.

Another embodiment of the present invention may provide a second electronic device having an inductive charging port for transferring power with the first electronic device. This inductive charging port may include a transformer that includes a transformer core having one or more legs surrounded by windings. The transformer may be located in a sleeve that may be fixed to an enclosure for the second electronic device. The transformer may be encapsulated, for example with epoxy of other potting material, to seal the transformer and prevent moisture leakage into the second electronic device. Specifically, an epoxy or other potting material may be placed between the transformer and its sleeve. An O-ring or other gasket may be placed between the sleeve and the device enclosure to further prevent moisture leakage into the second electronic device. A shim may be used to position a surface of the transformer with a surface of the device enclosure for improved energy transfer.

A surface of the transformer core may be covered with a thin protective layer. This protective layer may be formed by placing a transformer core in a tool holding a liquid plastic. A force may then be applied to the transformer core to create a thin layer plastic over a surface of the transformer core. The plastic may then be cured in place. By making the protective layer thin, the resulting energy transfer may be maximized while still protecting the transformer core. This layer may be formed of liquid crystal polymer or other material. This layer may be as thin as 0.5, 0.1, 0.2, or 0.5 mm. Autoclaving, degassing, or other steps may be employed to avoid separation of the layer from the surface of the transformer.

The inductive port for the second electronic device may include a transformer core having windings around one or more legs. The transformer core may be located in a sleeve. Leads from the windings may attach to landing pads. Dimple plates may form electrical contact with the landing pads. A flexible circuit board may connect to the dimple plates. The dimple plates may be held in place using a flexure or bracket.

In various embodiments of the present invention, a data port may incorporate various structural features adapted to the interior geometry an electronic device or connector system in which the data port is installed. For example, in the case of a 60-GHz data port, it may be desirable to place a transceiver chip in close proximity to an outer surface of the housing of the electronic device. Further, the transceiver chip may be an edge-fired chip for which a particular orientation of the transceiver chip within the data port is desirable for optimum signal strength. This orientation may dictate a particular path for electrical connections (e.g., a flexible printed circuit board connected between the transceiver chip and other components of the electronic device), which may entail an acute bend angle. In some embodiments, an interposer that includes leads with a 90-degree or other bend angle may be connected between the transceiver chip and the flexible printed circuit board, and this may reduce the bend angle and corresponding strain on the flexible printed circuit board. In other embodiments, the flexible printed circuit board may be connected directly to the transceiver chip, and a mandrel or similar structure may provide strain relief for the acute bend angle of the flexible printed circuit board.

In various embodiments of the present invention, the components of the connector assemblies may be formed in various ways of various materials. For example, conductive portions may be formed by stamping, metal-injection molding, machining, micro-machining, 3-D printing, or other manufacturing process. The conductive portions may be formed of stainless steel, steel, copper, copper titanium, phosphor bronze, palladium, palladium silver, or other material or combination of materials. They may be plated or coated with nickel, gold, or other material. The nonconductive portions, such as the housings and other portions, may be formed using injection or other molding, 3-D printing, machining, or other manufacturing process. The nonconductive portions may be formed of silicon or silicone, Mylar, Mylar tape, rubber, hard rubber, plastic, nylon, elastomers, liquid-crystal polymers (LCPs), ceramics, or other nonconductive material or combination of materials. The transformer cores may be formed of ferrite material, such as a soft ferrite. The transformer cores may be sintered or subjected to other manufacturing steps. The flexible circuit boards may be replaced with printed circuit boards (PCBs) or other appropriate substrates.

Embodiments of the present invention may provide connector assemblies that may be located in, or may connect to, various types of devices, such as portable computing devices, tablet computers, desktop computers, laptops, all-in-one computers, wearable computing devices, cell phones, smart phones, media phones, storage devices, keyboards, covers, cases, portable media players, navigation systems, monitors, power supplies, adapters, remote control devices, chargers, and other devices. These connector assemblies may provide interconnect paths for signals that are compliant with various standards such as Universal Serial Bus (USB), High-Definition Multimedia Interface® (HDMI), Digital Visual Interface (DVI), Ethernet, DisplayPort, Thunderbolt™, Lightning, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. In various embodiments of the present invention, these interconnect paths provided by these connectors may be used to convey power, ground, signals, test points, and other voltage, current, data, or other information.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIG. 15 illustrates a connector assembly that may detect when it is being mated with a second connector assembly on a second device;

FIG. 33 illustrates a transparent view of an inductive charging port according to an embodiment of the present invention;

FIG. 34A illustrates another transparent view of an inductive charging port according to an embodiment of the present invention, while FIGS. 34B-34D illustrate a retention clip for securing a sleeve to a device enclosure according to an embodiment of the present invention;

DESCRIPTION OF ILLUSTRATIVE EMBODIMENTS

Figure 1:
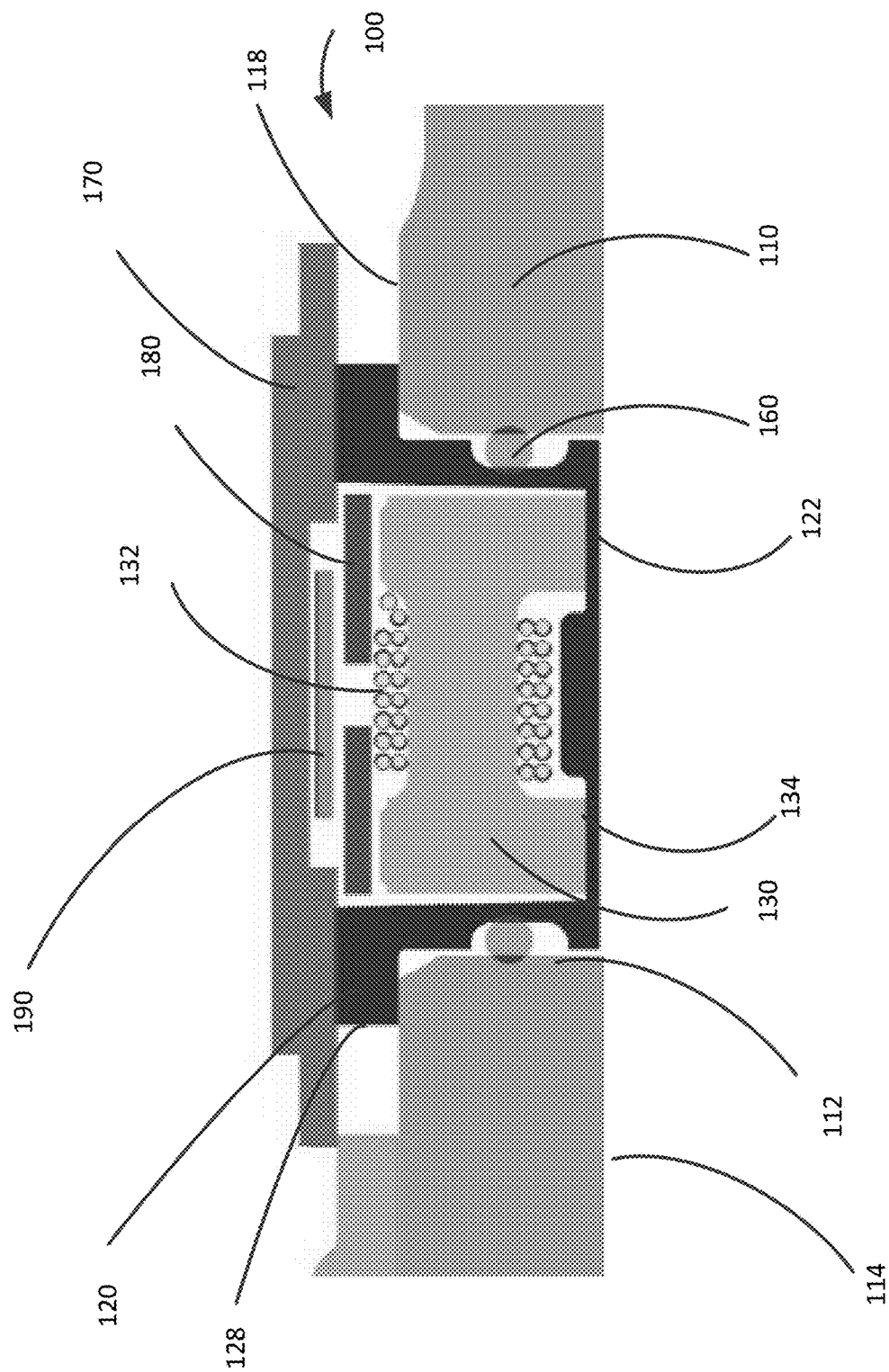
FIG. 1 illustrates a connector assembly according to an embodiment of the present invention.

FIG. 1 illustrates a connector assembly according to an embodiment of the present invention. This figure, as with the other included figures, is shown for illustrative purposes and does not limit either the possible embodiments of the present invention or the claims.

This figure illustrates a side view of a connector assembly for an electronic device. The connector assembly in this example may be an inductive charging port 100. This inductive charging port may receive power from, or it may provide power to, a second electronic device (not shown). The inductive charging port 100 may include transformer core 130 supported by housing 120, which may be located in an opening 112 of device enclosure 110. Inductive charging port 100 may further include flexible circuit board 190, compliant member 180, bracket 170, and an O-ring 160.

When transmitting power, an oscillatory signal may be provided to flexible circuit board 190. This signal may have a frequency of 0.5 MHz, 1.0 MHz, 1.2 MHz, 2.0 MHz, or other frequency. The oscillatory signal, generated by a crystal or other oscillating circuit, may be applied via conductors of flexible circuit board 190 to windings 132. Windings 132 may be wrapped around transformer core 130 and may generate a magnetic field. This magnetic field may induce a current in a corresponding winding around a corresponding transformer core in a mated connector assembly in the second electronic device. When receiving power, a magnetic field induced in transformer 130 core by a mated connector assembly in the second device may generate a current in windings 132. This current may be transferred via conductors of flexible circuit board 190. This current may be used to charge a battery in the electronic device, it may be used to power circuitry in the electronic device, it may be used to charge a battery or power circuitry in a third electronic device, or a combination thereof.

Compliant member 180 may be a piece of foam or other compressible material to protect windings 132 and flexible circuit board 190. Bracket 170 may be fixed to device enclosure 110 using fasteners, such as screws (not shown). Moisture or fluid leakage may be reduced or prevented by a sealing structure or gasket, in this example O-ring 160. O-ring 116 may be located between housing 120 and device enclosure 110. O-ring 160 may also reduce or prevent the ingress of debris and other substances into the electronic device.

In various embodiments of the present invention, it may be desirable to protect transformer core 130 from damage when the electronic device is being mated with a second electronic device. Accordingly, housing 120 may include a protective layer or cover portion 122 over a front surface 134 of transformer core 130. This protective layer or cover portion 122 may also prevent corrosion of surface 134 of transformer 130. This protective layer or cover portion 122 may be formed in various ways. For example, housing 120 may be insert molded around transformer core 130. The housing may then be coined such that protective layer or cover portion 134 is compressed and thinned. In various embodiments of the present invention, protective layer or cover portion 134 may have a thickness between 0.07 and 1.0 mm, between 0.09 and 0.12 mm, or it may have a different range of thickness. By making the protective layer or cover portion 134 very thin, the efficiency of the transfer of energy between the inductive charging port 100 and a second inductive charging port on a second electronic device may be improved.

To further protect transformer core 130, a surface of protective layer or cover portion 122 may be recessed relative to surface 114 of device enclosure 110. However, it is desirable to maintain a tight control on the amount that the transformer core 130 is recessed. For example, if the recess is too deep, the efficiency of the energy transfer may suffer, while at the recess is too shallow, the transformer core may stand a greater chance of being damaged during the attachment of a second device.

Accordingly, embodiments of the present invention may provide various methods for precisely controlling the depth of this recess. In a specific embodiment of the present invention, a width of housing 120 may be measured for several inductive charging ports. Specifically, a width of housing 120 from an underside of lateral extension 128 of housing 120 to a surface of protective layer or cover portion 122 may be measured for several housings 120. A width of device enclosure 110 at opening 112 may be measured for several device enclosures. Based on these measurements, inductive charging ports may be matched to properly sized device enclosures to maintain a tight control on the depth of the recess. In other embodiments of the present invention, a shim may be placed between the lateral extensions 128 of housing 120 and a back side 118 of device enclosure 110. These shims may be selected in order to provide a recess having a proper depth. In other embodiments of the present invention, housing 120 and device enclosure 110 may be placed in proper positions and then fixed to each other using glue or other type of adhesive.

Inductive charging port 100 may be considerably smaller than a typical connector receptacle or insert typically used to transfer power. This space savings may allow a reduction in device size, thereby allowing a device to include additional functionality, or a combination of the two.

Figure 2:
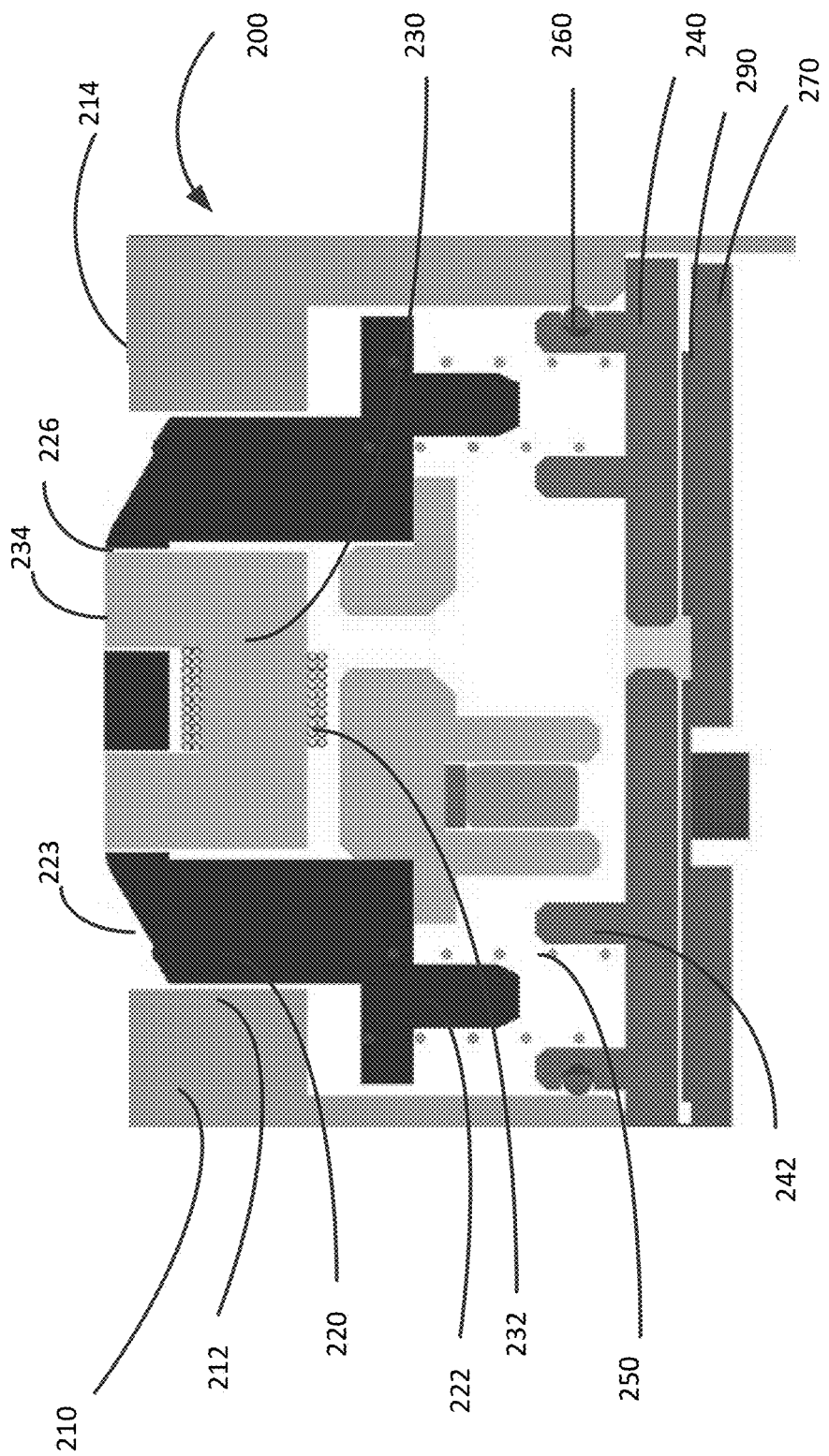
FIG. 2 illustrates another connector assembly according to an embodiment of the present invention.

FIG. 2 illustrates another connector assembly according to an embodiment of the present invention. In various embodiments of the present invention, this connector assembly may mate with the connector assembly shown in FIG. 1 above. As before, the connector assembly in this example may be an inductive charging port 200. Inductive charging port 200 may receive power from, or it may provide power to, a second electronic device (not shown). The inductive charging port 200 may include transformer core 230 supported by first housing 220, which may be located in an opening 212 of device enclosure 210. Inductive charging port 200 may further include flexible circuit board 290, second housing 240, bracket 270, resilient members or springs 250, and O-ring 260.

When transmitting power, a signal may be provided to flexible circuit board 290. For example, an oscillatory signal, generated by a crystal or other oscillating circuit, may be applied via conductors of flexible circuit board 290 to windings 232. This signal may have a frequency of 0.5 MHz, 1.0 MHz, 1.2 MHz, 2.0 MHz, or other frequency. Windings 232 may be wrapped around transformer core 230 and may generate a magnetic field. This magnetic field may induce a current in a corresponding winding around a corresponding transformer core in a mated connector assembly in a second electronic device. When receiving power, a magnetic field induced in transformer 230 core from a mated connector assembly in the second device may generate a current in windings 232. This current may be transferred to conductors of flexible circuit board 290. This current may be used to charge a battery in the electronic device, it may be used to power circuitry in the electronic device, it may be used to charge a battery or power circuitry in a third electronic device, or a combination thereof.

Bracket 270 may be fixed to the device enclosure 210 using fasteners, such as screws (not shown). Second housing 240 may also be fixed to the device housing 210. Moisture or fluid leakage may be reduced or prevented by a sealing structure, in this example O-ring 260. O-ring 260 may be located between second housing 240 and device enclosure 110. O-ring 260 may also reduce or prevent the ingress of debris and other substances into the electronic device. Springs 250 or other resilient members may have a first end around tail portions 222 of housing 220 and a second end in cavities formed by sidewalls 242 in second housing 240. Springs 250 may bias the first housing 220 forward and away from second housing 240. Potting material may be placed between first housing 220 and second housing 240 to protect leads of windings 232. Again, this potting material may be thermal paste to improve heat dissipation, though it may be epoxy or other potting material.

In various embodiments of the present invention, it may be desirable to protect transformer core 230 from damage when the electronic device housing this connector assembly is mated with a second electronic device. In this example, housing 220 and transformer core 230 may recess or be pushed into the electronic device while a second electronic device is being mated. Specifically, during mating, a second electronic device may pass along a surface 214 of the device enclosure 210. When a leading edge of the second electronic device reaches first housing 220, it may encounter one of the lead-in features 223 on a front surface of housing 220. As an edge of the second electronic device continues to move laterally across the surface 214 of enclosure 210, first housing 220 and transformer core 230 may be pushed into the electronic device, compressing springs 250, and thereby protecting transformer core 230 from damage.

In this and other embodiments of the present invention, lead-in features 223 may include a peak 226, which may extend further than a front surface 234 of transformer core 230. This may further protect a surface 234 of transformer core 230 from damage when the electronic device is mated to second electronic device.

Again, inductive charging port 200 may be considerably smaller than a typical connector receptacle or insert typically used to transfer power. This space savings may allow a reduction in device size, thereby allowing a device to include additional functionality, or a combination of the two.

Figure 3:
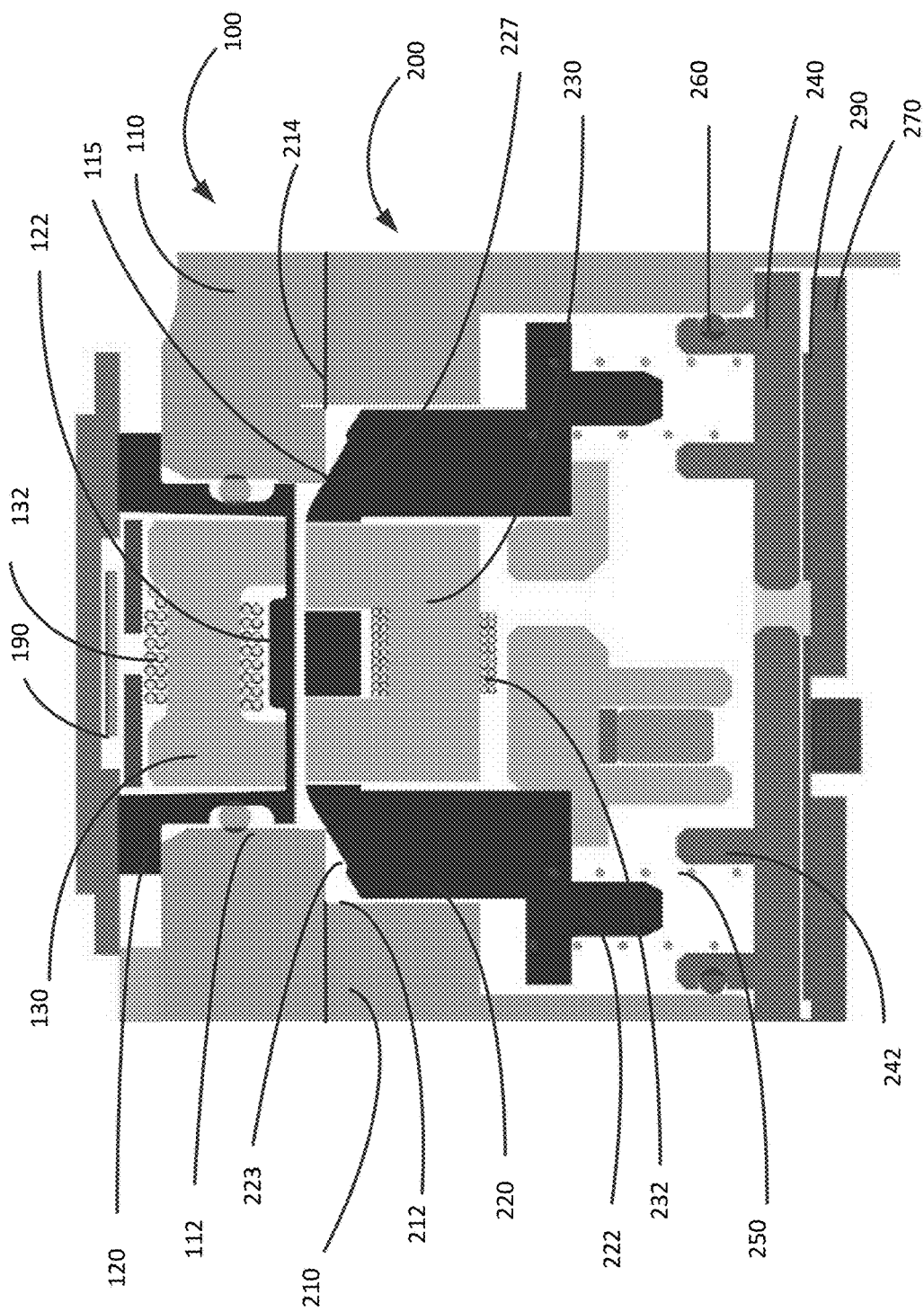
FIG. 3 illustrates a connected state between two connector assemblies according to an embodiment of the present invention.

FIG. 3 illustrates a connected state between two connector assemblies according to an embodiment of the present invention. In this example, inductive charging port 100 in a first electronic device may be mated with inductive charging port 200 in a second electronic device. As before, the first electronic device may provide power to the second electronic device. Specifically, an oscillating signal, for example at 0.5 MHz, 1.0 MHz, 1.2 MHz, 2.0 MHz, or other frequency, may be applied to conductors of flexible circuit board 190 in inductive charging port 100. This signal may drive windings 132, thereby developing a magnetic field in transformer core 130. This magnetic field may induce a magnetic field in transformer core 230 in inductive charging port 200. This induced magnetic field may generate a current in windings 232. This current may be conveyed using flexible circuit board 290. This current may be used to charge a battery in the second electronic device, run circuitry in the second electronic device, or charger battery or run circuitry in a third electronic device, or combination thereof. Similarly, the second electronic device may provide power to the first electronic device. Specifically, an oscillating signal, for example at 0.5 MHz, 1.0 MHz, 1.2 MHz, 2.0 MHz, or other frequency, may be applied to conductors of flexible circuit board 290 in inductive charging port 200. This signal may drive windings 232, thereby developing a magnetic field in transformer core 230. This magnetic field may induce a magnetic field in transformer core 130 in inductive charging port 100. This induced magnetic field may generate a current in windings 132. This current may be conveyed using flexible circuit board 190. This current may be used to charge a battery in the first electronic device, run circuitry in the first electronic device, or charger battery or run circuitry in a third electronic device, or combination thereof.

Again, springs 250 may push or bias first housing 220 and transformer core 230 towards the opening 112 of device enclosure 110. This forward travel may be limited by edges 115 of device enclosure 110 encountering points 227 of the leading features 223. Again, for the purposes of efficient energy transfer, it may be desirable to position transformer cores 130 and 230 in close proximity when the two electronic devices are mated. In this example, the spacing may be determined by a thickness of protective layer or cover portion 122 and an air gap between a front surface of protective layer or cover portion 122 and a front surface of transformer core 230. The spacing may be determined by the resting positions of edges 115 of the device enclosure 110 on points 227 of the lead-in features 223 of housing 220.

Embodiments of the present invention may provide connector assemblies, such as these inductive charging ports, that may be reliable. One way to improve reliability of an electronic device is to limit its operating temperature. For example, thermal paste may be used as the potting material described herein. In these and other embodiments of the present invention, a duty cycle of operation may be monitored and adjusted to limit a connector assembly's temperature. In these and other embodiments of the present invention, a level of power being transferred may be monitored and adjusted. These various adjustments may be made based on a needed power level of a connected device, the operating temperature of the connector assembly, or other factors, or combination thereof. In these and other embodiments of the present invention, more than one inductive charging port may be used by each device to transfer power between the two electronic devices.

Again, a connection between the first electronic device and the second electronic device may be formed by sliding the surfaces of the enclosures of the two devices across each other. This motion may be relative, that is, the first device may be fixed and the second electronic device may be moved, the second electronic device may be fixed and the first electronic device may move, or some combination of the two may occur. An example of such a connection being made is shown in the following figures.

Figure 4:
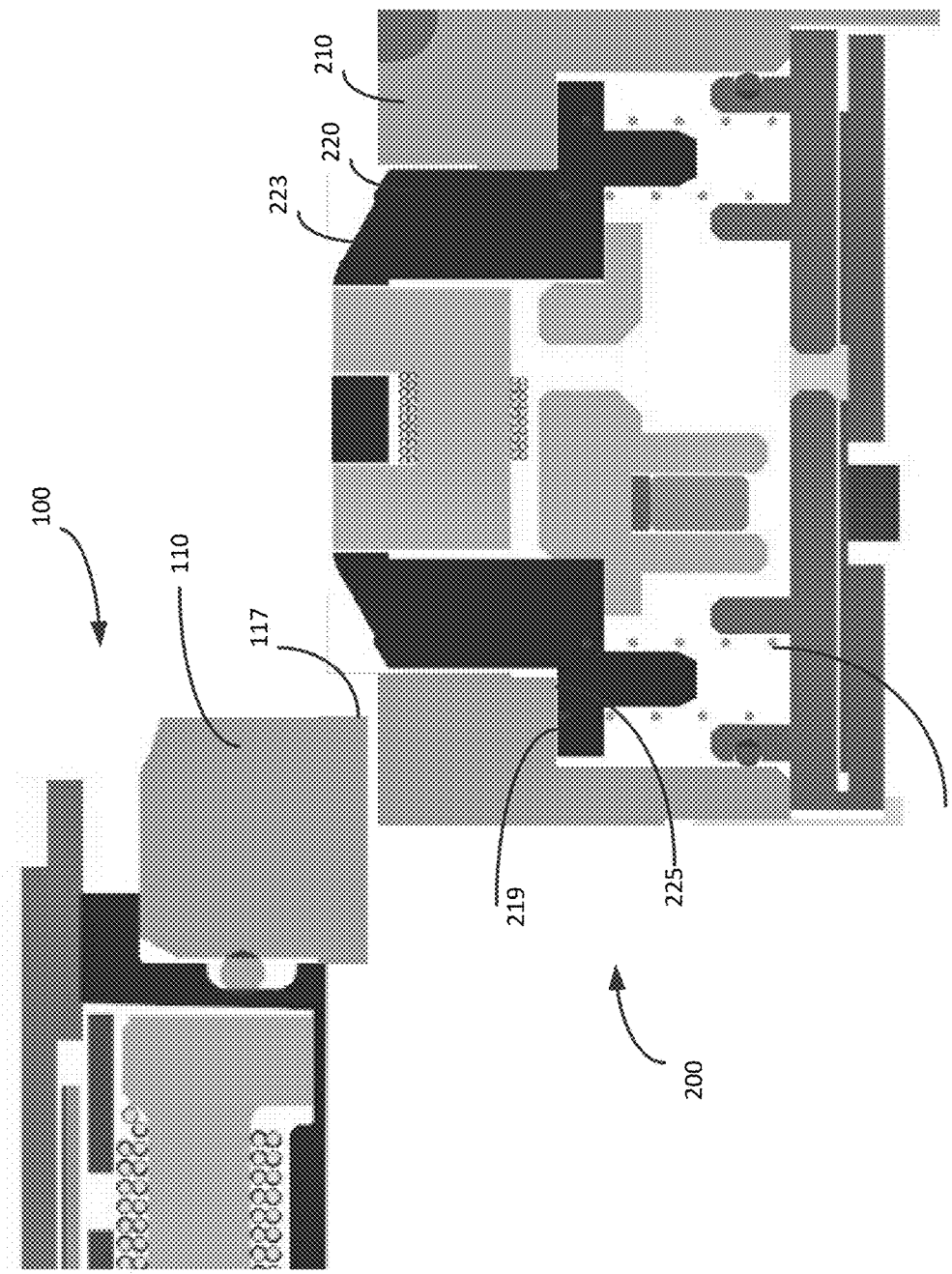
FIG. 4 illustrates states of connector assemblies according to an embodiment of the present invention before a connection is made between two electronic devices.

FIG. 4 illustrates states of connector assemblies according to an embodiment of the present invention before a connection is made between two electronic devices. In this example, a first electronic device having a first inductive charging port 100 in device enclosure 110 may be moved relative to a second electronic device having a second inductive charging port 200 in device enclosure 210. The relative motion of the first electronic device may be from left to right. Edge 117 of enclosure 110 has yet to encounter lead-in features 223 of first housing 220 in inductive charging port 200. Therefore, springs 250 are shown pushing housing 220 upward until lateral surfaces 225 of housing 220 reach lateral surfaces 219 of device enclosure 210.

Figure 5:
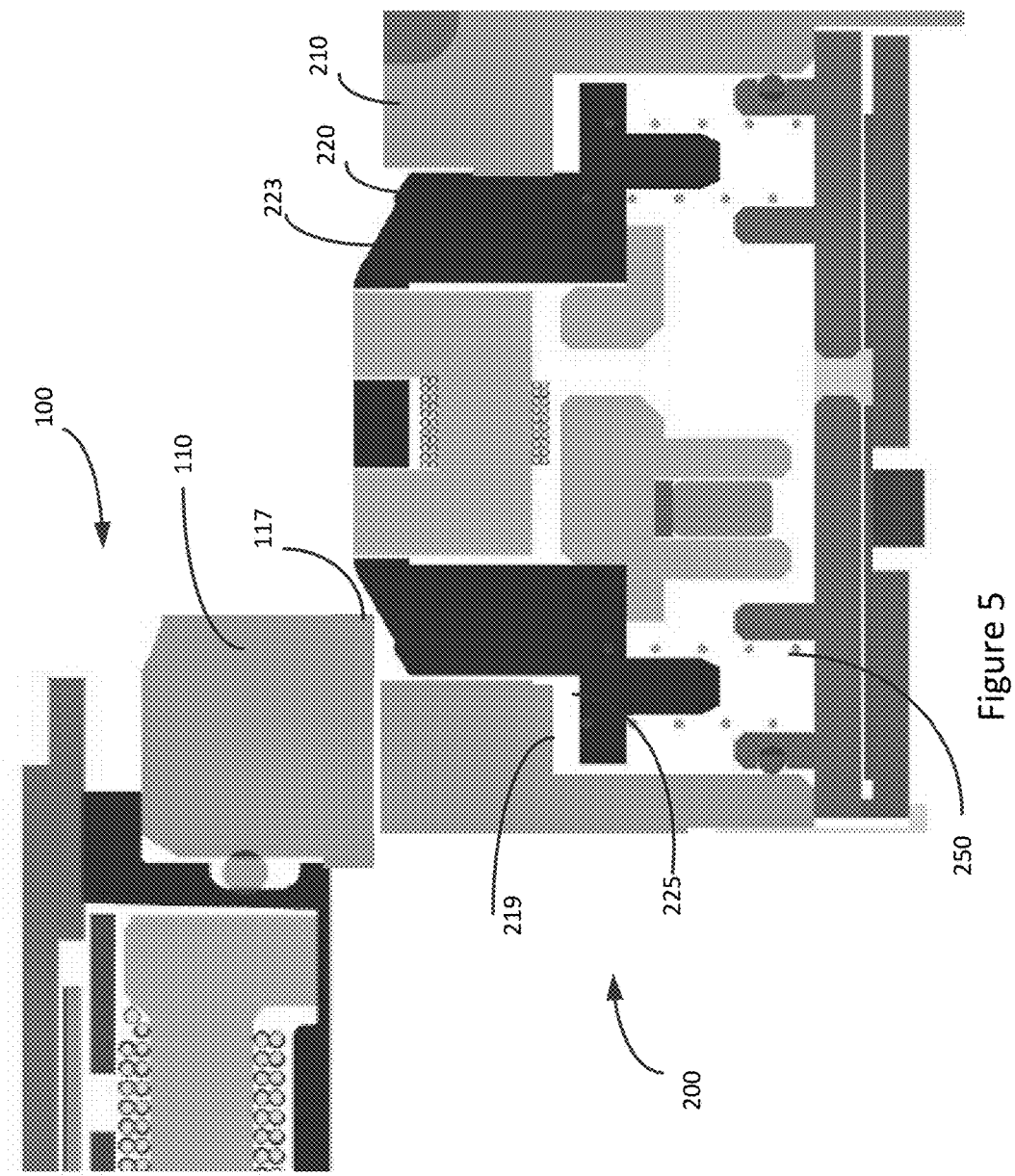
FIG. 5 illustrates states of connector assemblies according to embodiments of the present invention while a connection is being made between two electronic devices.

FIG. 5 illustrates states of connector assemblies according to embodiments of the present invention while a connection is being made between two electronic devices. In this example, edge 117 of housing 110 of connector assembly 100 has reached a leading edge 223 of housing 220 of inductive charging port (connector assembly) 200. This encounter may push housing 220 downward into the second electronic device, thereby compressing springs 250. This downward travel may also separate lateral surfaces 225 of housing 220 from lateral surfaces 219 of device enclosure 210.

Figure 6:
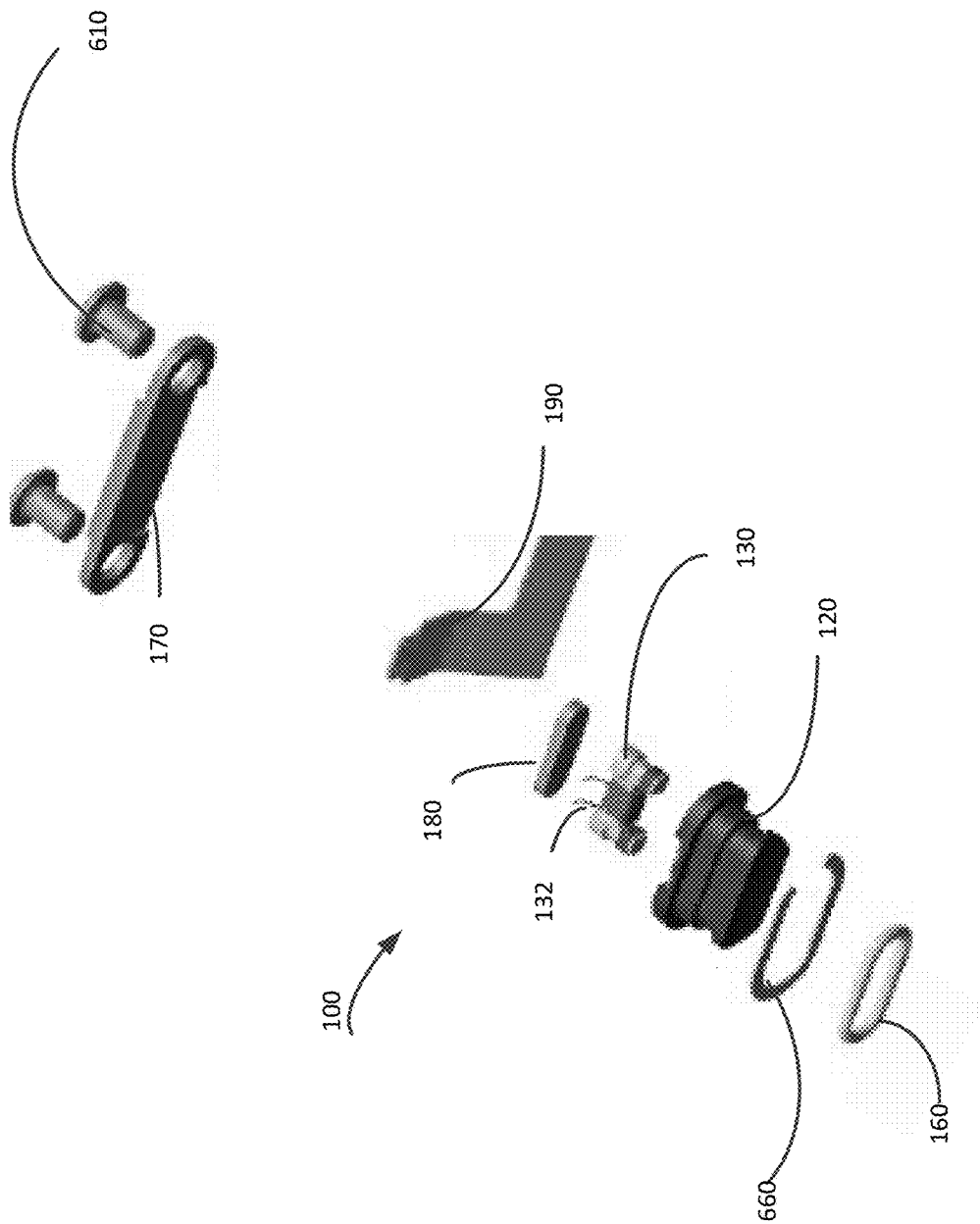
FIG. 6 illustrates an exploded view of a connector assembly according to an embodiment of the present invention.

FIG. 6 illustrates an exploded view of a connector assembly according to an embodiment of the present invention. This connector assembly may be an inductive charging port 100, as shown in the included examples. Inductive charging port 100 may include a housing 120 around transformer core 130. Housing 120 may be insert molded around transformer core 130. In other embodiments of the present invention, housing 120 and transformer core 130 may be formed as separate pieces and transformer core 130 may be press fit or otherwise located in housing 120. Windings 132 may be wrapped around some or all of transformer core 130. O-ring 160 may be placed around housing 120 and fit between housing 120 and device enclosure 100, as shown in FIG. 1. An optional shim 660 may be placed between lateral projections on housing 120 and a rear of the device enclosure, as described herein. Flexible circuit board 190 may connect to leads of windings 122. Compliant member 180 may be formed of foam or other material to protect leads of wings 132 and flexible circuit board 190. Bracket 170 may be placed behind housing 120 and may be fixed to a device enclosure by fasteners, such as screw 610.

Figure 7:
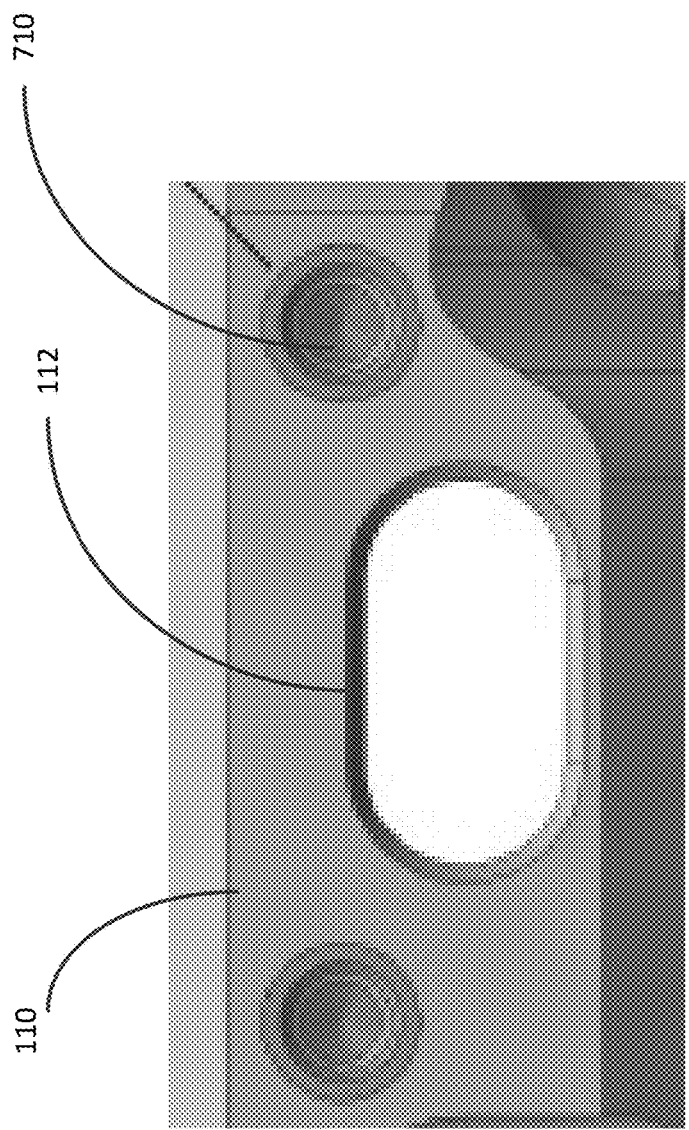
FIG. 7 illustrates an opening in the device enclosure into which an inductive charger port according to an embodiment of the present invention may be inserted.

FIG. 7 illustrates an opening in the device enclosure into which an inductive charger port according to an embodiment of the present invention may be inserted. Device enclosure may include opening 112. Enclosure 110 may further include threaded nuts 710 to accept fasteners 610, as shown in FIG. 6.

Figure 8:
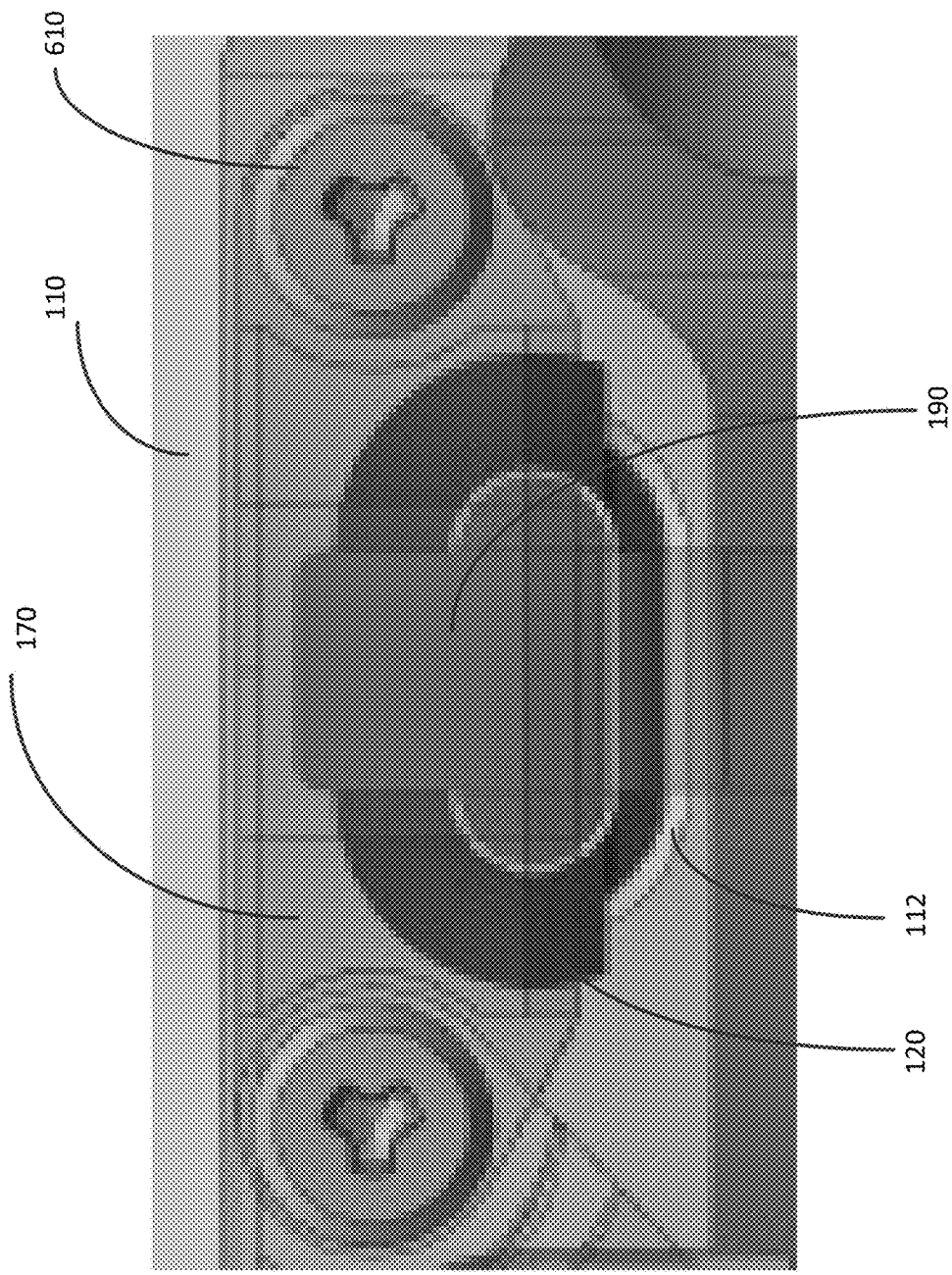
FIG. 8 illustrates a rear view of an assembled inductive charging port according to an embodiment of the present invention.

FIG. 8 illustrates a rear view of an assembled inductive charging port according to an embodiment of the present invention. In this example, bracket 170 has been secured in place relative to housing 110. That is, bracket 170 may be been fixed to housing 110 by fasteners 610. Flexible circuit board 190 may contact leads to windings 132, which may be wrapped around transformer core 130, as shown in FIG. 1. Transformer core 130 may be located in housing 220.

Figure 9:
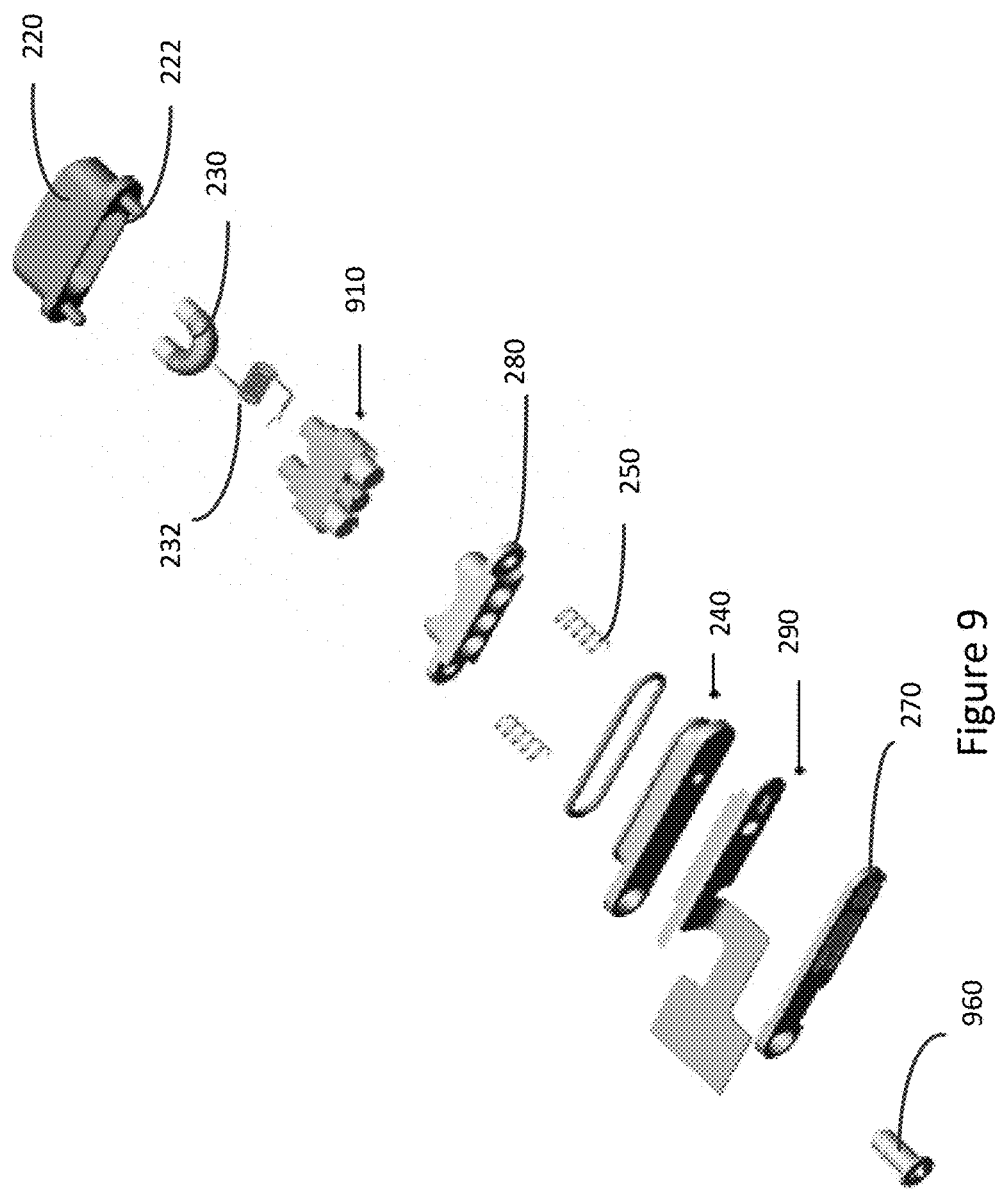
FIG. 9 illustrates an exploded view of a connector assembly according to an embodiment of the present invention.

FIG. 9 illustrates an exploded view of a connector assembly according to an embodiment of the present invention. In this example, the connector assembly may be the inductive charging port 200. Inductive charging port 200 may include first housing 220 supporting transformer core 230. Windings 232 may be wrapped around transformer core 230. Optional capture plate 280 may be mated with first housing 220 to secure transformer 230 in place. In other embodiments of the present invention, capture plate 280 may be omitted. Bracket 270 may be fixed to a device enclosure 210 as shown in FIG. 2, by fastener or screw 960. Fastener or screw 960 may pass through openings in bracket 270 and second housing 240, and into a threaded opening in a rear of device enclosure 210. O-ring 260 may be placed around second housing 240 and may be located between second housing 240 and an opening 212 in device enclosure 210. Resilient members or springs 250 may have a first end around the tail portions 222 of first housing 220 and second ends that may be held in place in cavities in second housing 240. Potting material 910 may fill the cavity between first housing 220 and second housing 240, thereby protecting connections to windings 232. As before, this potting material may be a thermal paste to improve head dissipation in the connector assembly.

In these and other embodiments of the present invention, a first transformer core 130 may be disposed within first inductive charging port 100, and a second transformer core 230 may be disposed within second inductive charging port 200. Each transformer core may be made of ferrite or similar materials. Some or all of the surfaces of the transformer cores may be coated to protect against damage to the wires that are wound around the cores (or portions thereof). The shapes of the transformer cores may be, e.g., C-shapes or U-shapes, and the cores may be but need not be symmetric. Examples of transformer core shapes and wire windings will now be described.

Figure 10:
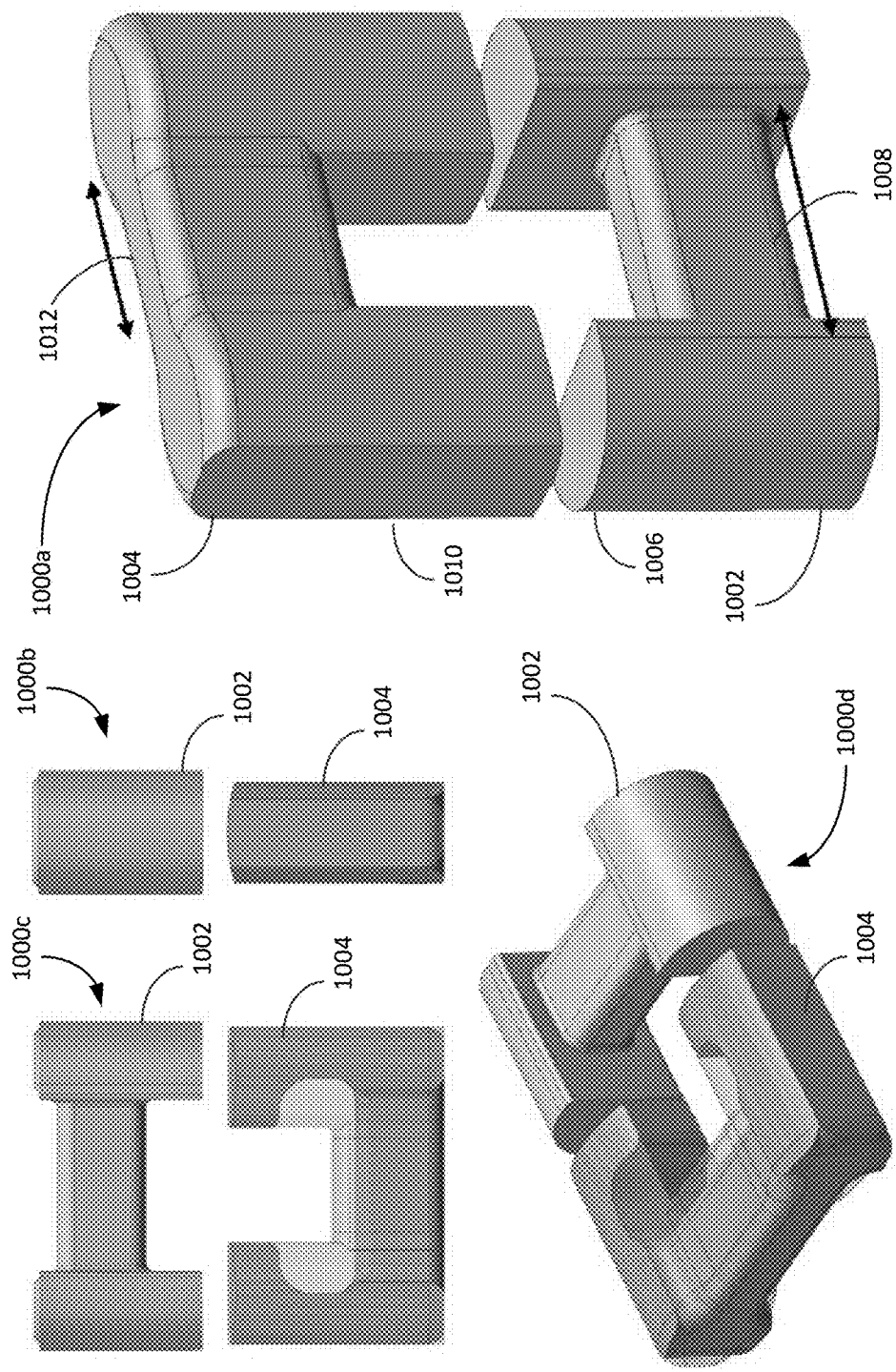
FIG. 10 illustrates an example of complementary transformer core shapes according to an embodiment of the present invention.

FIG. 10 shows an example of complementary transformer core shapes according to some embodiments of the present invention. Shown at 1000*a* are complementary transformer cores 1002 and 1004. In some embodiments, transformer core 1002 may be used as transformer core 130 in first inductive charging port 100 while transformer core 1004 is used as transformer core 230 in second inductive charging port 200. Transformer core 1002 may have a shape that is optimized for a small space, e.g., by providing short leg sections 1006 connected by a central yoke section 1008. Transformer core 1004 may have longer leg sections 1010 and a yoke section 1012. Leg sections 1010 and/or yoke section 1012 may be shaped to accommodate wire windings. One example of such shaping is shown in top view at 1000*b*, in side view at 1000*c*, and in perspective view at 1000*d*. As shown, yoke sections 1008 and 1012 may include a central narrow region, and this may accommodate wire windings. In some embodiments, the ends of leg sections 1010 may be shaped for cosmetic effect. For instance, as seen at 1000*b* and 1000*c*, the ends of leg sections 1010 may be rounded or splined to conform to the front face of a connector assembly in which transformer core 1004 is to be included. In embodiments where the front face of transformer core 1002 is visible, the ends of leg sections 1006 may also be shaped for cosmetic effect.

Figure 11:
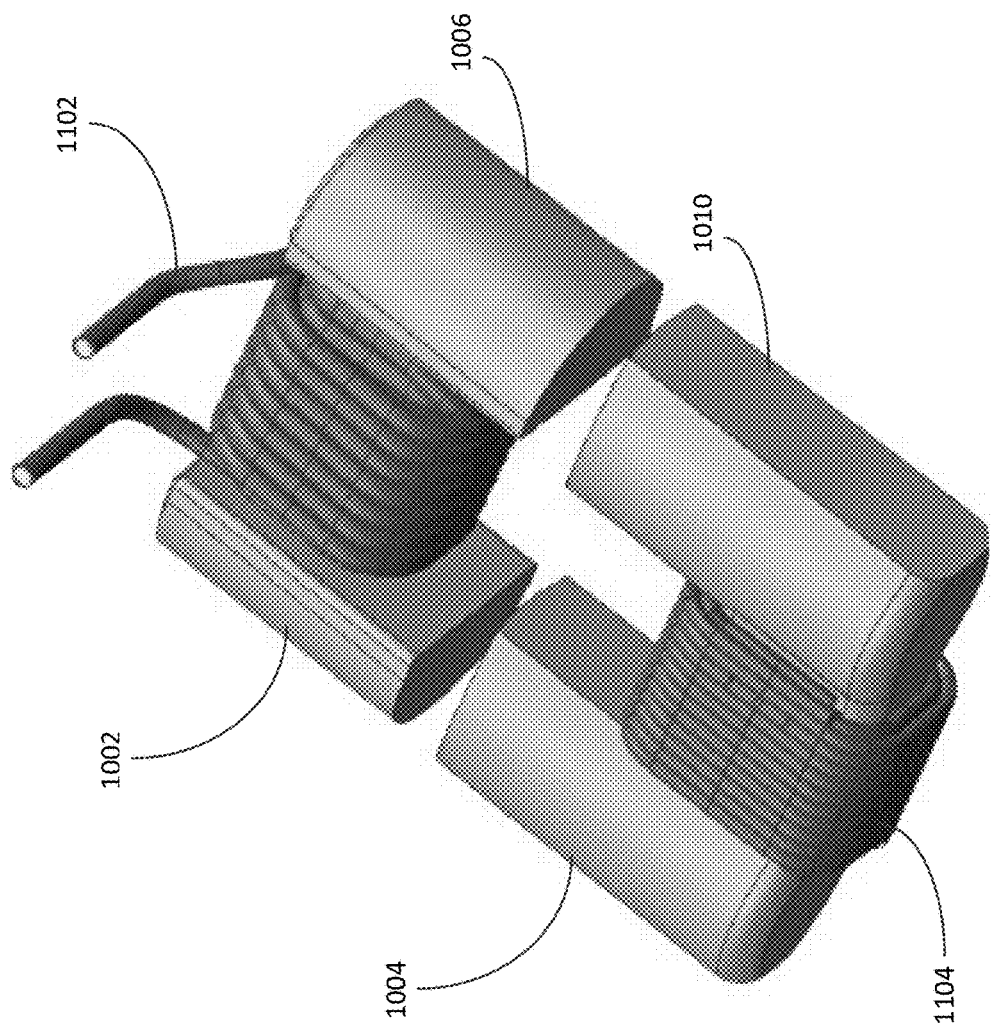
FIG. 11 illustrates an example of complementary transformer cores after winding of wires according to an embodiment of the present invention.

FIG. 11 shows an example of complementary transformer cores 1002 and 1004 after winding of wires 1102, 1104 around yoke sections 1008, 1012. The number of turns of wires 1102, 1104 may be increased, e.g., by winding the wires in multiple layers and/or by using wire with a smaller gauge. In some embodiments, wire windings may extend along leg sections 1006 and/or 1010.

Figure 12:
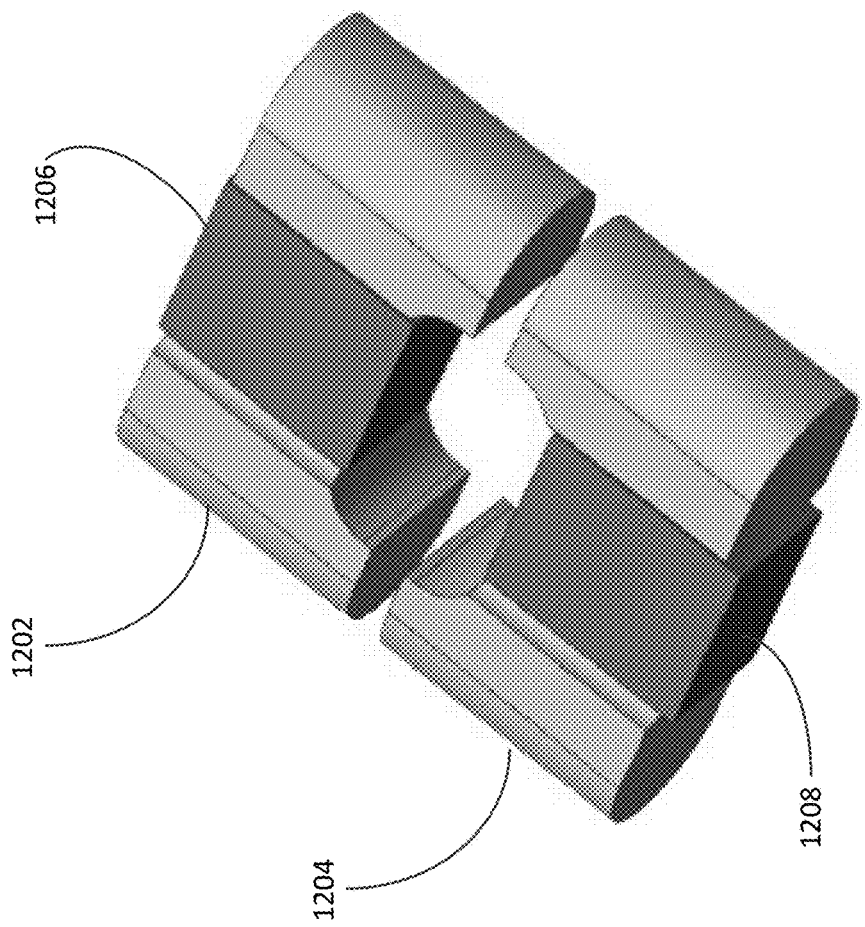
FIG. 12 illustrates another example of complementary transformer core shapes according to an embodiment of the present invention.

FIG. 12 shows another example of complementary transformer core shapes. Transformer cores 1202, 1204 have thicker yoke sections and shorter leg sections than transformer cores 1002, 1004. Wires 1206, 1208 may be wrapped around the yoke sections of transformer cores 1202, 1204. In this example, transformer cores 1202, 1204 have the same shape, but this is not required.

Figure 13:
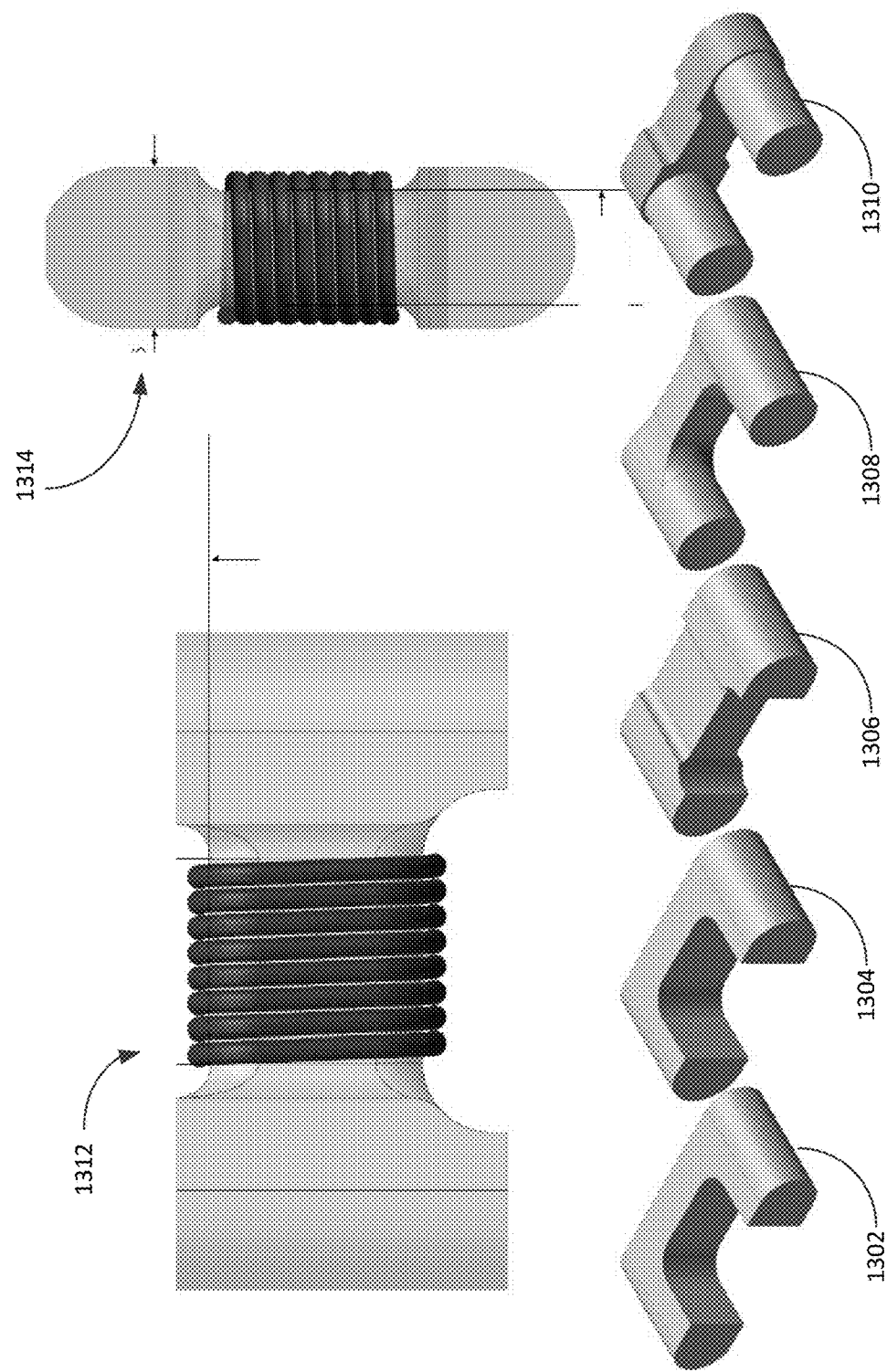
FIG. 13 illustrates additional examples of transformer core shapes that may be used in some embodiments of the present invention.

FIG. 13 shows additional examples of transformer core shapes 1302-1310, each designed to fit within the same housing (e.g., housing 120 of FIG. 1). As shown, the thickness of the yoke section relative to the legs may be varied, and the shape of both the yoke section and the legs may be varied. Wires may be wrapped around the yoke and/or leg sections of each transformer core to form a wire coil. In some embodiments, the yoke may be shaped to have a narrow midsection, e.g., as shown for transformer cores 1306, 1308, 1310. Where this is the case, the wire windings that form an inductive coil around the transformer core may be arranged such that they do not extend beyond a boundary defined by outer surfaces of the transformer core, as shown at 1312 and 1314.

In some embodiments, the legs may be shaped to facilitate wire windings around the legs in addition to or instead of the yoke. Winding wire around the legs results in wire coils being located closer to the interface. This may reduce magnetic flux leakage at the interface, which may improve efficiency of the inductive charging port. For instance, the legs may have cylindrical shapes, as shown for transformer cores 1308, 1310, which may facilitate winding of a wire. In the case of transformer core 1310, the legs are narrower than the ends of the yoke section, and wire windings on the legs may be arranged such that they do not extend beyond a boundary defined by outer surfaces of the transformer core. In some embodiments, transformer core 1310 may be manufactured by forming the yoke and legs as separate parts, then attaching the parts to each other.

It should be noted that where the wire windings for coils do not extend beyond a boundary defined by outer surfaces of the transformer core, contact with the housing (e.g., housing 120 described above) is made by the ferrite material of the transformer core and not by the wires. Accordingly, to the extent that ferrite transformer cores may be produced with small manufacturing tolerances, preventing the wire windings from extending beyond the boundary defined by outer surfaces of the transformer core may allow for more consistent alignment between the transformer core and the housing. This in turn may provide more consistent alignment (and therefore more reliable power transfer performance) between complementary transformer cores in different devices.

Figure 14A:
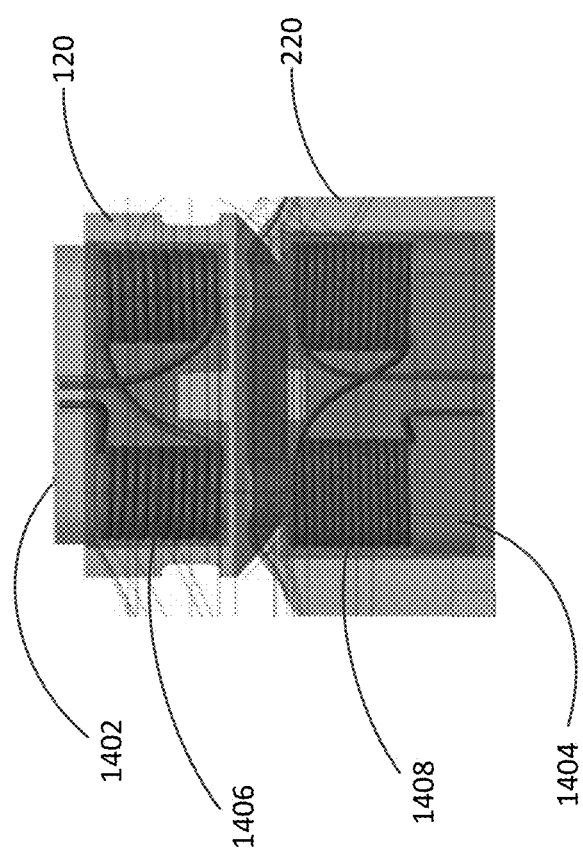
FIGS. 14A and 14B illustrate additional examples of complementary transformer core shapes that may be used in some embodiments of the present invention.

FIG. 14A shows another example of complementary transformer core shapes that may be used in some embodiments of the present invention. In this example, each of complementary transformer cores 1402 and 1404 has a U shape with wire windings 1406, 1408 disposed along the legs of each core. A single wire may be wrapped first around one leg, then around the other as shown. As shown, wire windings 1408, 1408 need not extend all the way to the ends of the legs, although in some embodiments they may. Cores 1402 and 1404 may be shaped similarly to core 1310 shown in FIG. 13, with legs that are narrower than the ends of the yoke section. In the example shown, core 1404 has longer legs and a thicker yoke than core 1402; these dimensions may be varied, and cores 1402 and 1404 may be the same size or different sizes, provided that the legs of the two cores are alignable with each other to support efficient transfer of magnetic flux. Narrow midsections of 1410, 1412 of the yokes may allow the ends of wire windings 1406, 1408 to pass through to the outside of housings 120, 220 to facilitate electrical connections. Wire windings 1406, 1408 may be arranged such that they do not extend beyond a boundary defined by outer surfaces of the transformer cores. In this arrangement, housings 120, 220 may make contact with the ferrite material cores 1402, 1404 but not with wire windings 1406, 1408. As noted above, this may allow for more consistent alignment.

Figure 14B:
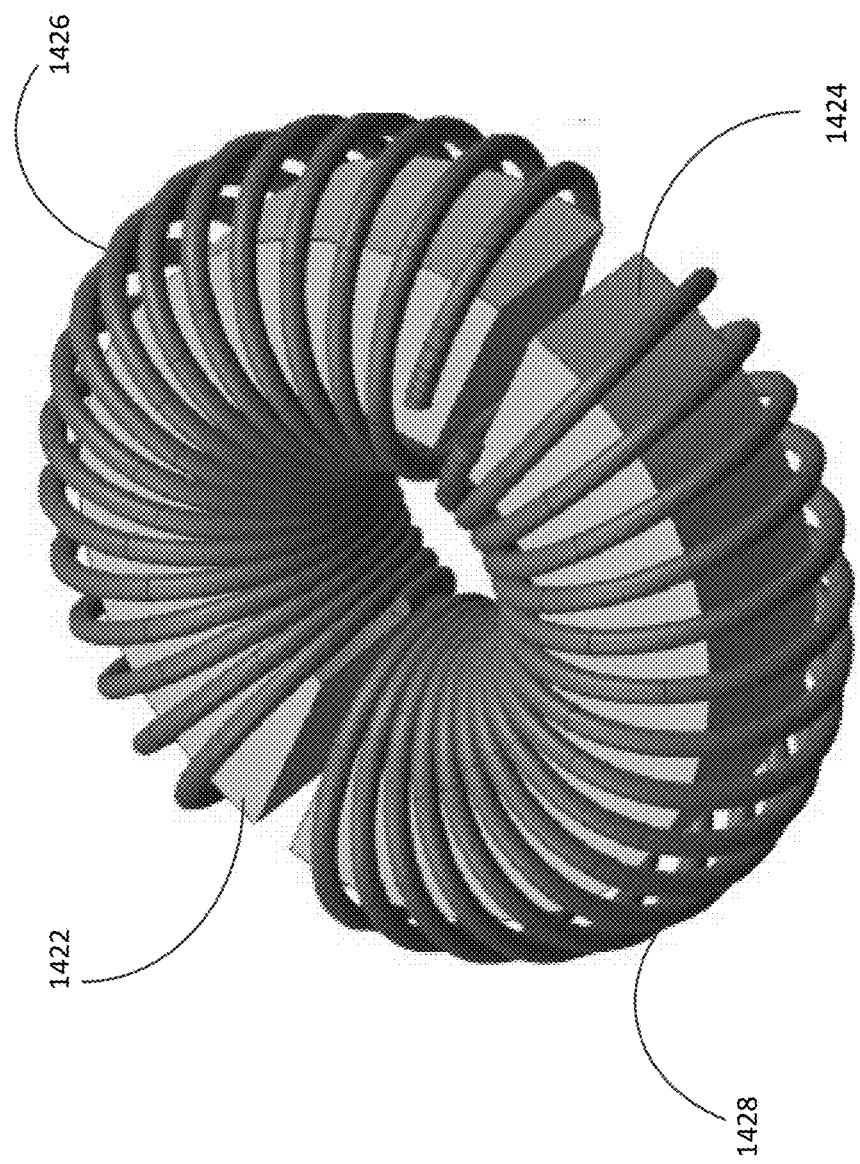

FIG. 14B shows another example of complementary transformer core shapes that may be used in some embodiments of the present invention. In this example, each of complementary transformer cores 1422 and 1424 has a semicircular shape with wire windings 1426, 1428 disposed along nearly the entire length of each core. While this shape may provide somewhat higher power transfer efficiency than the U shapes shown in FIGS. 10-13, in some embodiments space constraints or other design considerations may preclude the use of semicircular transformer cores.

The various transformer core shapes shown in FIGS. 10-14B are illustrative and may be modified. The dimensions may be adapted to conform to the geometry of a particular connector assembly in which an inductive charging port is to be included. It should be noted that complementary transformer cores may have the same shape or different shapes as desired. For example, one transformer core may be U-shaped while the other is semicircular. Efficient transfer of magnetic flux from one transformer core to the other may occur as long as the ends of the legs are properly aligned between the two complementary transformer cores. Those skilled in the art with access to the present disclosure will be able to construct transformer cores in a variety of shapes and form factors suited for different connector assemblies.

The wire windings for coils described herein are illustrative and may be varied. In some embodiments, the wire winding scheme may be designed to maximize the number of turns of wire, subject to geometric constraints (e.g., keeping the windings within the form factor defined by the transformer core). For example, multiple layers of winding may be used. In some embodiments, one or more layers of a wrapping foil may be used in place of winding a wire; the foil layers may be laminated together and wrapped around all or part of the transformer core (e.g., just around the yoke). As another example, a tubular structure incorporating one or more layers of windings may be fabricated and slid over the transformer core, e.g., over the legs of transformer core 1310.

In some embodiments, it may be desirable to use wires with thin insulation for the wire windings, e.g., in order to increase the number of turns of wire in a given space. If the insulation is damaged during the assembly process, electromagnetic noise or electrical shorting may result, impairing performance. Thicker insulation on the wires may reduce the likelihood of impaired performance but may also reduce the number of turns of wire that may be accommodated. Accordingly, in some embodiments, additional steps may be taken during manufacture to reduce the risk of damage to the wire insulation by preparing the surface of the ferrite prior to winding the wire. For example, the ferrite part may be tumbled or polished during manufacture to reduce surface roughness or sharp edges. In addition or instead, a coating material such as paralyne or soft plastic may be applied to the ferrite prior to winding the wire. Such preparations may improve reliability of the inductive charging port.

In these and other embodiments of the present invention, a connector assembly may detect when it is being mated with a second connector assembly on a second device. Examples will now be described.

FIG. 15 illustrates a connector assembly that may detect when it is being mated with a second connector assembly on a second device. The connector assembly in this example may be an inductive charging port 1500. Inductive charging port 1500 may be substantially similar to, or the same as, inductive charging port 200 as shown herein. In this embodiment of the present invention, a first magnetic element, such as magnet 1570, may be fixed to first housing 220. Specifically, magnet 1570 may be at least partially housed in holder portion 224 of first housing 220. A proximity sensor, such as Hall-effect sensor 1580, may be fixed to flexible circuit board 290. First housing 220 may move relative to flexible circuit board 290 while the connector assembly is being mated to a second connector assembly in a second electronic device. A change in magnetic flux may be detected by proximity sensor 1580, which may then provide signals using conductors on flexible circuit board 290 to activate the electronic device or invoke other action in the electronic device.

As before, first housing 220 may be located in an opening 212 in device enclosure 210 of an electronic device. First housing 220 may support transformer core 230, which may be at least partially surrounded by windings 232. Second housing 240 may be fixed to device enclosure 210 by bracket 270. Flexible circuit board 290 may be held in place between second housing 240 and bracket 270. First housing 220 may move relative to second housing 240, bracket 270, and device enclosure 210, which again may be fixed to each other. Resilient members or springs 250 may have first ends around tail portions 222 of first housing 220 and second ends that may be held in place in cavities in second housing 240 formed by side walls 242. Magnet 1570 may be held in place by holder portion 224 of first housing 220. Hall-effect sensor 1580 may be fixed to flexible circuit board 290, which again may be fixed to second housing 240 and device enclosure 210 by bracket 270. As before, a sealing structure, such as O-ring 260, may be placed between second housing 240 and device enclosure 210.

In these and other embodiments of the present invention, a second magnet element may be used to improve the detection capability of proximity sensor 1580. An example is shown in the following figure.

Figure 16:
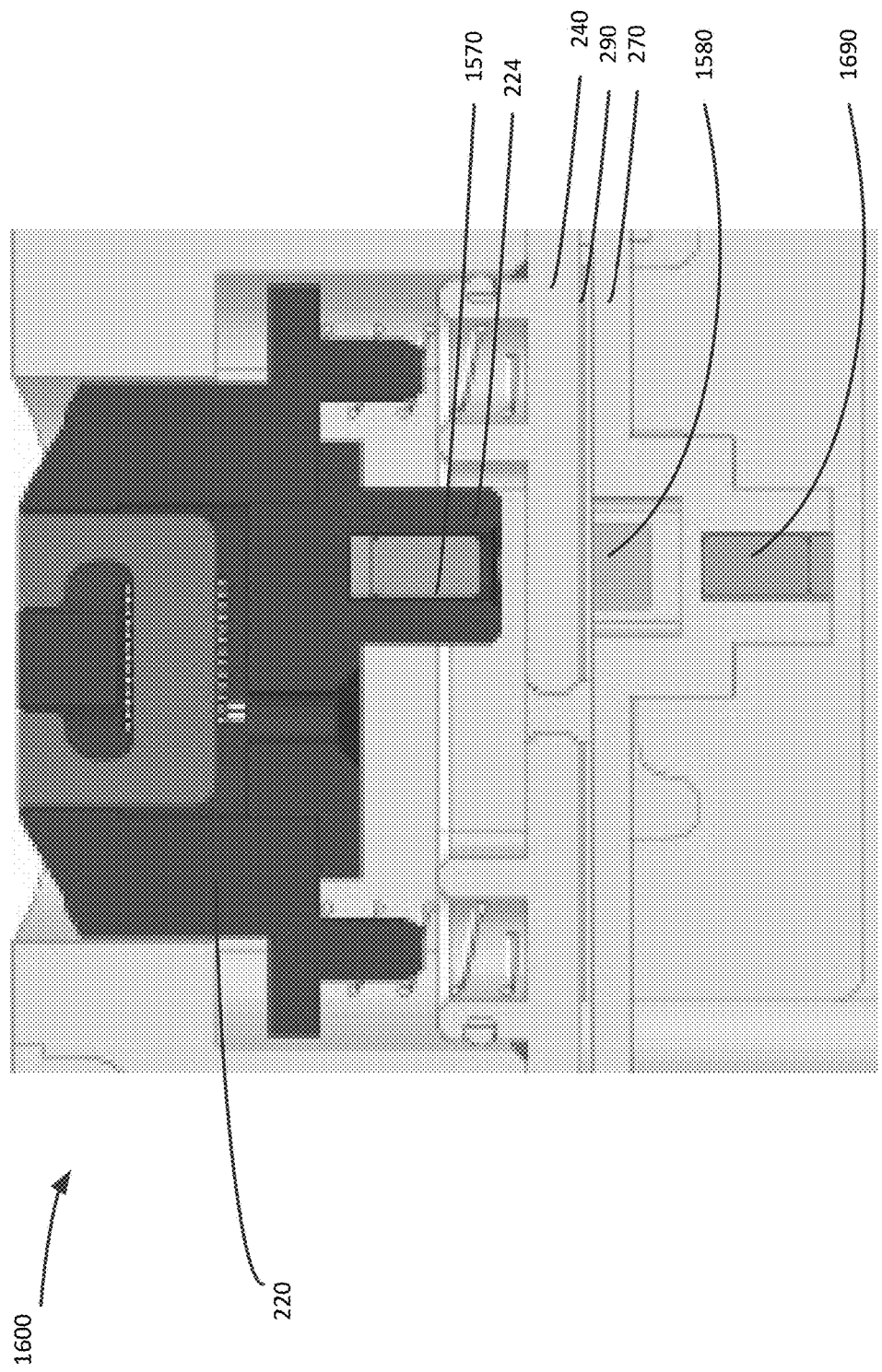
FIG. 16 illustrates a connector assembly that may detect when it is being mated with a second connector assembly on a second device.

FIG. 16 illustrates a connector assembly that may detect when it is being mated with a second connector assembly on a second device. The connector assembly in this example may be an inductive charging port 1600. Inductive charging port 1600 may be substantially similar to, or the same as, inductive charging port 200 or 1500 as shown herein, with the addition of a second magnet. In this example, a first magnetic element, which may be magnet 1570, may be fixed to first housing 220. Specifically, magnet 1570 may be at least partially housed in holder portion 224 of first housing 220. A proximity sensor, which may be Hall-effect sensor 1580, may be fixed to flexible circuit board 290. A second magnetic element, such as magnet 1690, may be fixed to bracket 270, such that Hall-effect sensor 1580 may be located between the first and second magnetic elements, in this case magnets 1570 and 1690. In this configuration, magnet 1690 may be fixed to bracket 270. Bracket 270 in turn may be fixed to flexible circuit board 290, second housing 240, and device enclosure 210. Hall-effect sensor 1580, being fixed to flexible circuit board 290, may thus be fixed in position relative to magnet 1690. First housing 220, and therefore magnet 1570, may move relative to flexible circuit board 290 when the connector assembly may be mated to a second connector assembly in a second electronic device. A change in magnetic flux may be detected by proximity sensor 1580, which may then provide signals using conductors on flexible circuit board 290 to activate the electronic device or invoke other action in the electronic device.

Figure 17:
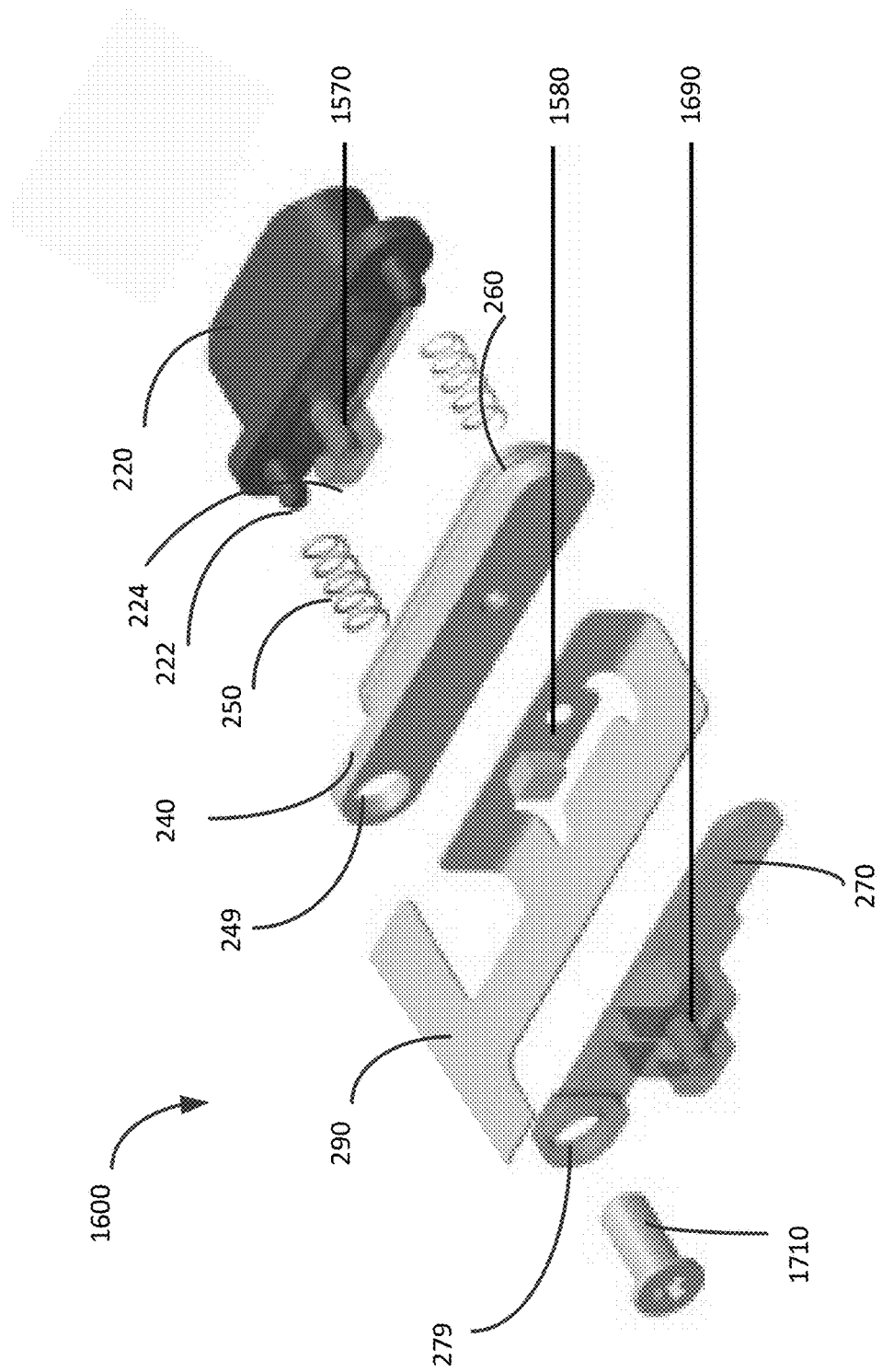
FIG. 17 illustrates an exploded view of a connector assembly that may detect when it is being mated with a second connector assembly on a second device.

FIG. 17 illustrates an exploded view of a connector assembly that may detect when it is being mated with a second connector assembly on a second device. The connector assembly in this example may again be inductive charging port 1600. First housing 220 may be located in an opening 212 in device enclosure 210 of an electronic device, as show in FIGS. 2 and 16. First housing 220 may support transformer core 230, which may be at least partially surrounded by windings 232, as shown in FIGS. 2 and 16. Second housing 240 may be fixed to device enclosure 210 by bracket 270. Flexible circuit board 290 may be held in place between second housing 240 and bracket 270. First housing 220 may move relative to second housing 240, bracket 270, and device enclosure 210, which again may be fixed to each other. Resilient members or springs 250 may have first ends around tail portions 222 of first housing 220 and second ends that may be held in place in cavities in second housing 240 formed by side walls 242, as shown in FIGS. 2 and 16. Magnet 1570 may be held in place by holder portion 224 of first housing 220. Hall-effect sensor 1580 may be fixed to flexible circuit board 290, which again may be fixed to second housing 240 and device enclosure 210 by bracket 270. As before, a sealing structure, such as O-ring 260, may be placed around second housing 240 and between second housing 240 and device enclosure 210, as shown in FIGS. 2 and 16.

In these and other embodiments of the present invention, other types of connection detection apparatus may be used. For example, a proximity sensor may be placed on a connector assembly, while a magnet may be placed on a second, mating connector assembly. In these and other embodiments of the present invention, the presence of a mating connector assembly may be detected by providing a stimulus to a connector assembly and then monitoring the result. For example, a coil on an inductive charging port may be activated for a short burst. A 5 MHz or other frequency signal may be applied to the coil for a limited duration. Following the burst, the decay of the resulting signal may be monitored. If a second, mating inductive charging port is present, the transformer in the mating port may sustain the signal and the decay may take longer to reach a threshold level, while if no mating transformer is present, the signal may decay quicker and reach a threshold level in a shorter time. In these and other embodiments of the present invention, an optical detect may be used. A light-emitting diode (LED) in an electronic device may generate light, which may be reflected by a surface of a mating connector in a second device as the second device moves across the surface of the electronic device. The reflected light may be detected using a photodiode, which may generate a signal indicating that a connection has been made. Details are shown below. In these and other embodiments of the present invention, a user may provide an input via a user interface to the electronic device indicating that a connection has been made.

In various embodiments of the present invention, it may be desirable for a first electronic device to be able to detect the presence of a second device. It may also be desirable for the second electronic device to be able to detect the presence of the first electronic device, though such detection may not be necessary. As applied to the above connector assemblies, in some systems inductive charging port 100 may need to be able to detect the presence of inductive charging port 200, in some systems inductive charging port 200 may need to be able to detect the presence of inductive charging port 100, in some systems both may be necessary, while in other systems, no detection may be necessary.

Inductive charging ports 1500 and 1600 shown in FIGS. 15 and 16 may be used to detect a presence of inductive charging port 100 in systems where that may be required, though in other embodiments of the present invention, other detect techniques may be used. Since portions of inductive charging port 100 do not move when a connection is made, one or more of the other techniques listed here, or other such technique, may be employed by inductive charging port 100 to detect a connection by inductive charging port 200. For example, a proximity sensor, such as a Hall-effect sensor, may be used in inductive charging port 100 to detect a magnet element, such as a magnet, in inductive charging port 200.

In these and other embodiments of the present invention, it may be desirable for a first electronic device and a second electronic device to exchange data in addition to transferring power. Accordingly, a connector assembly that includes inductive charging port 100 or 200 may also include a separate data port. Examples of data ports will now be described.

Figure 18:
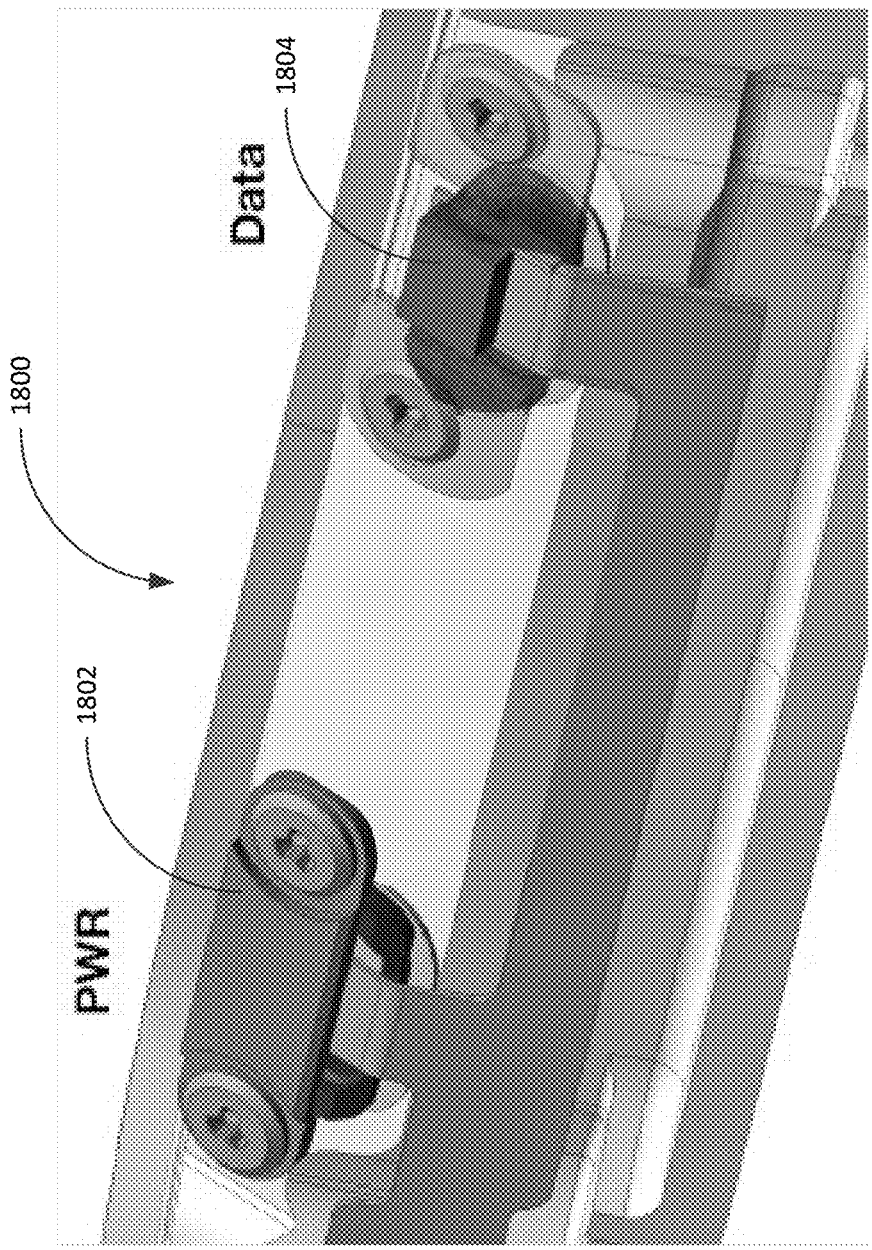
FIG. 18 illustrates a rear view of a connector assembly according to an embodiment of the present invention.

FIG. 18 shows a rear view of a connector assembly 1800 according to an embodiment of the present invention. Connector assembly 1800 includes a power port 1802 and a data port 1804. Power port 1802 may be an inductive charging port, which may be implemented as described above. Data port 1804 may be implemented using various contactless data transfer technologies, examples of which will now be described.

In some embodiments, data port 1804 may use inductive data transfer for carrier-free baseband signaling. Structures similar to the inductive charging structures described above may be used for data transfer in addition to or instead of power transfer. For example, current pulses in the wire windings on one side of the inductive interface may be detected on the other side and interpreted, e.g., as binary data. Conventional inductive data transfer techniques and protocols may be used. With a single data port, bidirectional communication may be supported using a half-duplex mode.

Figure 19:
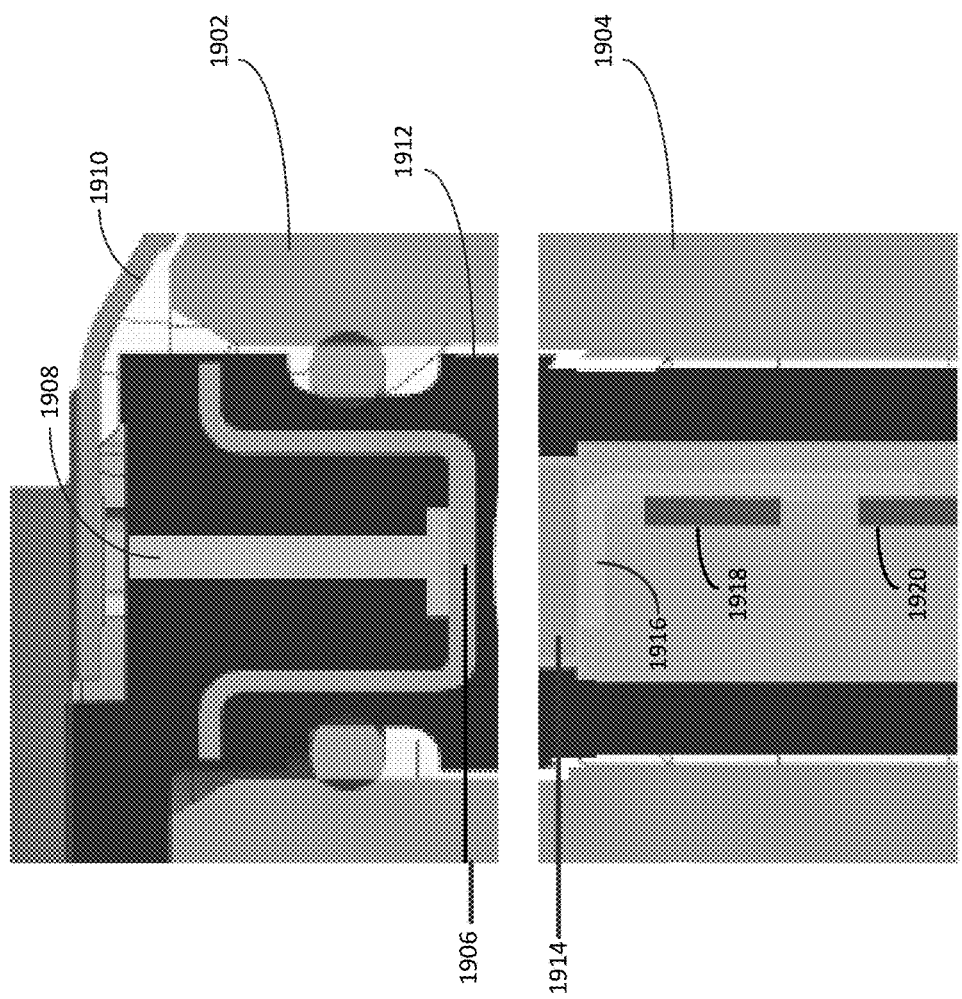
FIG. 19 illustrates a simplified cross-section view of complementary capacitive data ports according to an embodiment of the present invention.

In other embodiments, data port 1804 may provide a capacitive antenna arrangement. FIG. 19 shows a simplified cross-section view of complementary capacitive data ports 1902, 1904 according to an embodiment of the present invention. First capacitive data port 1902 may include a metal plate 1906 that is connected via metal tab 1908 to supporting circuity (e.g., flexible circuit board 1910) within a first electronic device, in which first capacitive data port 1902 is located. Plastic housing material 1912, which may act as a dielectric, covers metal plate 1906. Similarly, second capacitive data port 1904 may include a metal plate 1914 that is connected via metal tab 1916 to supporting circuitry (e.g., circuits 1918, 1920) within a second electronic device, in which second capacitive data port 1904 is located. Although no dielectric covering is shown on second capacitive data port 1904, a dielectric covering may be provided if desired.

Capacitive data ports 1902, 1904 may each be installed in a connector assembly. Capacitive data ports 1902, 1904 may be arranged in their respective connector assemblies such that metal plates 1906 and 1914 become aligned parallel to and opposite each other (as shown in FIG. 19) when the connector assemblies are attached to, or molded with, each other. Metal plates 1906 and 1914, separated by insulating material 1906 (and, in some embodiments, an air gap), provide a capacitive antenna coupling that may support bidirectional radio-frequency (RF) signal transmission. Any RF signaling protocol may be used. For example, in some embodiments, capacitive data ports 1902, 1904 may support data transmission conforming to a wireless communication protocol such as Bluetooth® communication protocols and standards promulgated by the Bluetooth SIG (including Bluetooth® Classic and/or Bluetooth® Smart communication protocols). Other wireless communication protocols may also be used, including custom-designed application specific protocols. It should be noted that capacitive data ports 1902, 1904 may be optimized for short-range communication, on the assumption that they will be used only to communicate with a complementary data port. This may reduce or eliminate interference with other long-range wireless communication interfaces that may be present in either or both of the first and second electronic devices.

Figure 20:
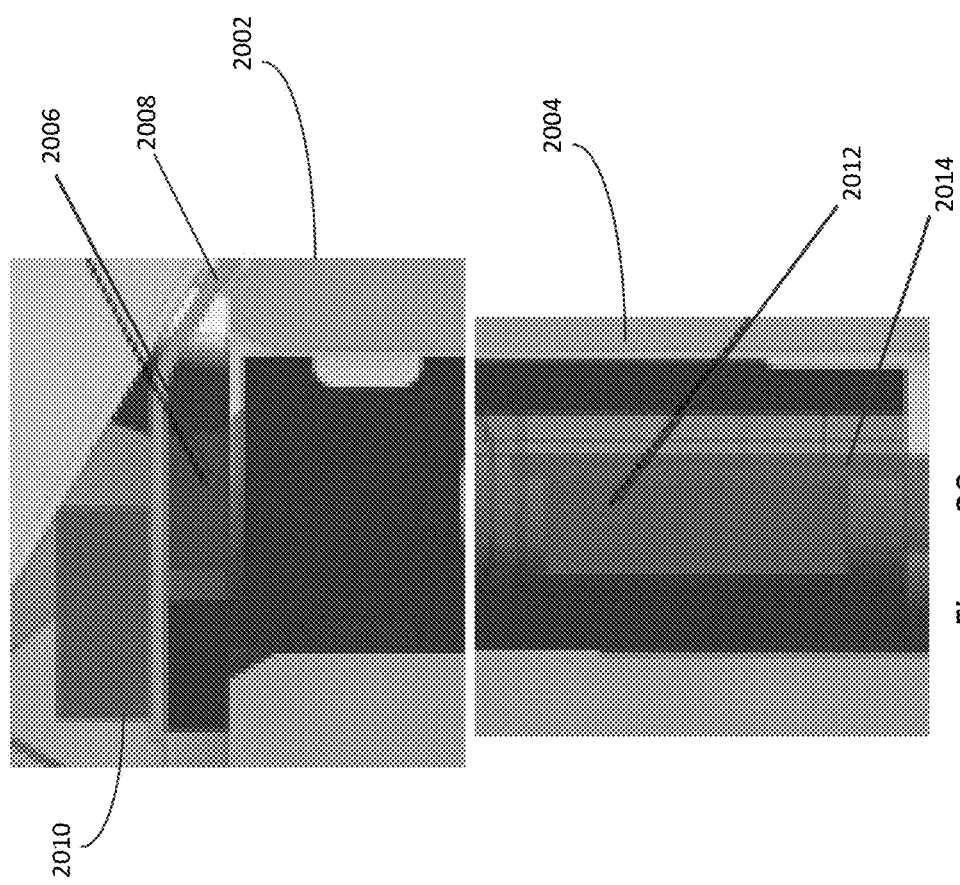
FIG. 20 illustrates a simplified cross-section view of complementary 60-GHz data ports according to an embodiment of the present invention.

In other embodiments, data port 1804 may support RF data communication in the 60 GHz band, which may provide bandwidth of approximately 500 Mbps. FIG. 20 shows a simplified cross-section view of complementary 60-GHz data ports 2002, 2004 according to an embodiment of the present invention. First data port 2002 may include a 60-GHz broadside antenna 2006 mounted on a printed circuit board 2008, which may be a flexible circuit board that connects to other circuitry in a first electronic device, in which first data port 2002 is located. Also mounted on printed circuit board 2008 is a 60-GHz transceiver chip 2010. Second data port 2004 may include a 60-GHz edge-fire antenna and transceiver chip 2012, which may be connected to a circuit board 2014 or other supporting circuitry in a second electronic device, in which second data port 2004 is located.

Figure 21:
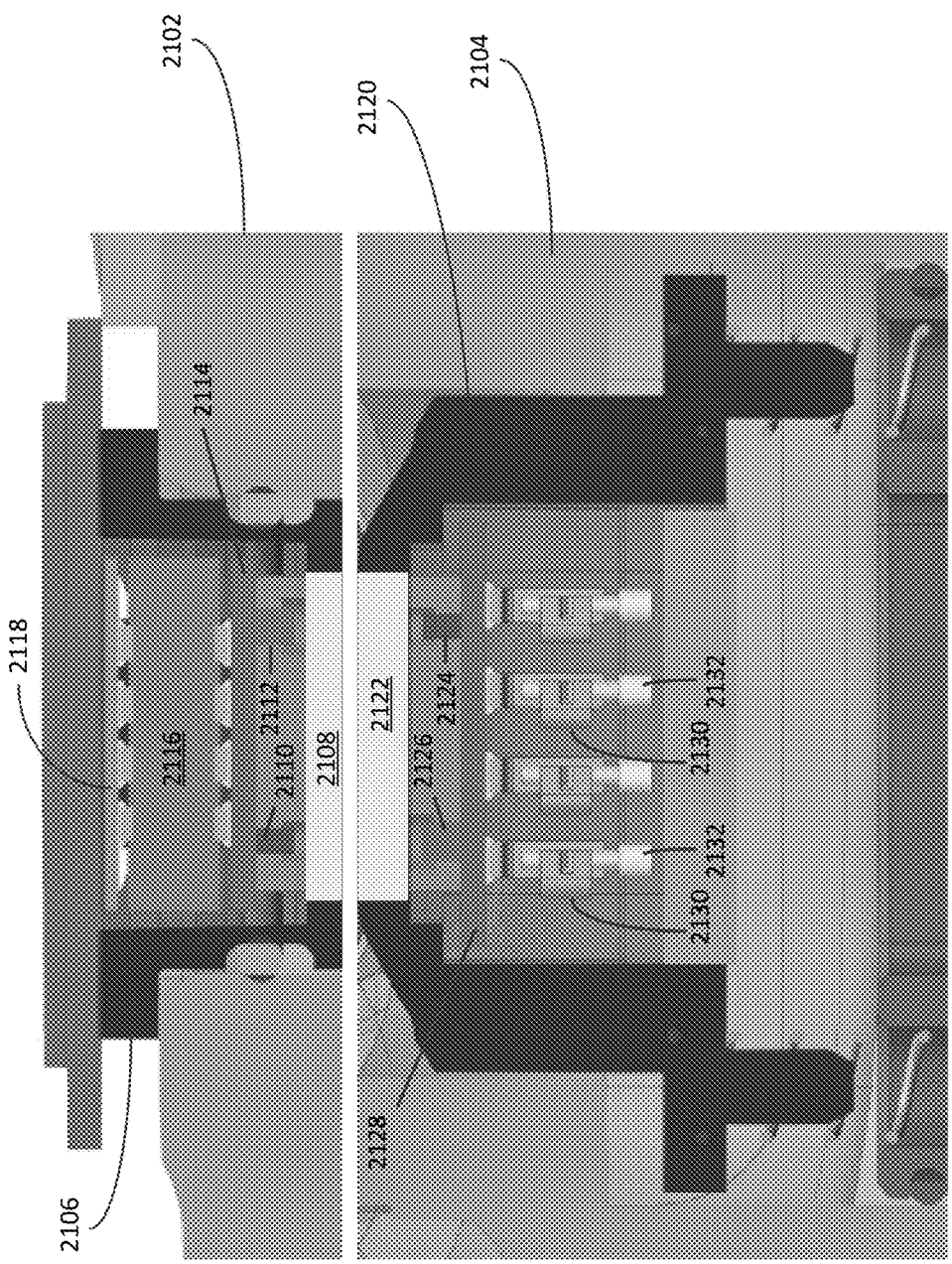
FIG. 21 illustrates a simplified cross-section view of complementary optical data ports according to an embodiment of the present invention.

In still other embodiments, data port 1804 of FIG. 18 may support optical data communication, e.g., using infrared wavelengths or other wavelengths. FIG. 21 shows a simplified cross-section view of complementary optical data ports 2102, 2104 according to an embodiment of the present invention. First data port 2102 may include a housing 2106, which may be generally similar to housing 120 described above. Housing 2106 may include an optically transparent window portion 2108. Optically transparent window 2108 may be made of any material that is transparent to light at the frequency of interest (e.g., various plastics that are transparent in the infrared). In some embodiments, all of housing 2106 (or all of the front surface of housing 2106) may be made of the same optically-transparent material. A light-emitting diode (LED) 2110 may be arranged to emit light of an appropriate wavelength toward optically transparent window 2108, and a photodetector 2112, which may be a photodiode or other device, may be arranged to receive light entering via optically transparent window 2108. LED 2110 and photodetector 2112 may be connected, e.g., via circuit board 2114, to supporting circuitry. For example, the reverse side of circuit board 2114 may connect to an interposer 2116, which may connect to a flexible circuit board 2118. Flexible circuit board 2118 may be connected to other circuitry in a first electronic device, in which first data port 2102 is located.

Similarly, second data port 2104 may include a housing 2120 with an optically transparent window 2122. Optically transparent window 2122 may be made of any material that is transparent to light at the frequency of interest (e.g., various plastics that are transparent in the infrared). A light-emitting diode (LED) 2124 may be arranged to emit light of an appropriate wavelength toward optically transparent window 2122, and a photodetector 2126, which may be a photodiode or other device, may be arranged to receive light entering via optically transparent data window 2122. LED 2124 and photodetector 2126 may be connected, e.g., via circuit board 2128, to supporting circuitry. For example, the reverse side of circuit board 2128 may be connected to wire termination units 2130, which may in turn be connected to wires 2132. Other arrangements are also possible.

The LEDs and photodetectors may be arranged such that when a first connector assembly that includes first data port 2102 and a second connector assembly that includes second data port 2104 are attached to each other, LED 2110 is oriented toward photodetector 2126 while LED 2124 is oriented toward photodetector 2112. This arrangement allows for bidirectional data transmission, as each of the connected electronic devices may operate its LED to send data and/or operate its photodetector to receive data. Conventional or other optical signaling technologies may be used.

Figure 22:
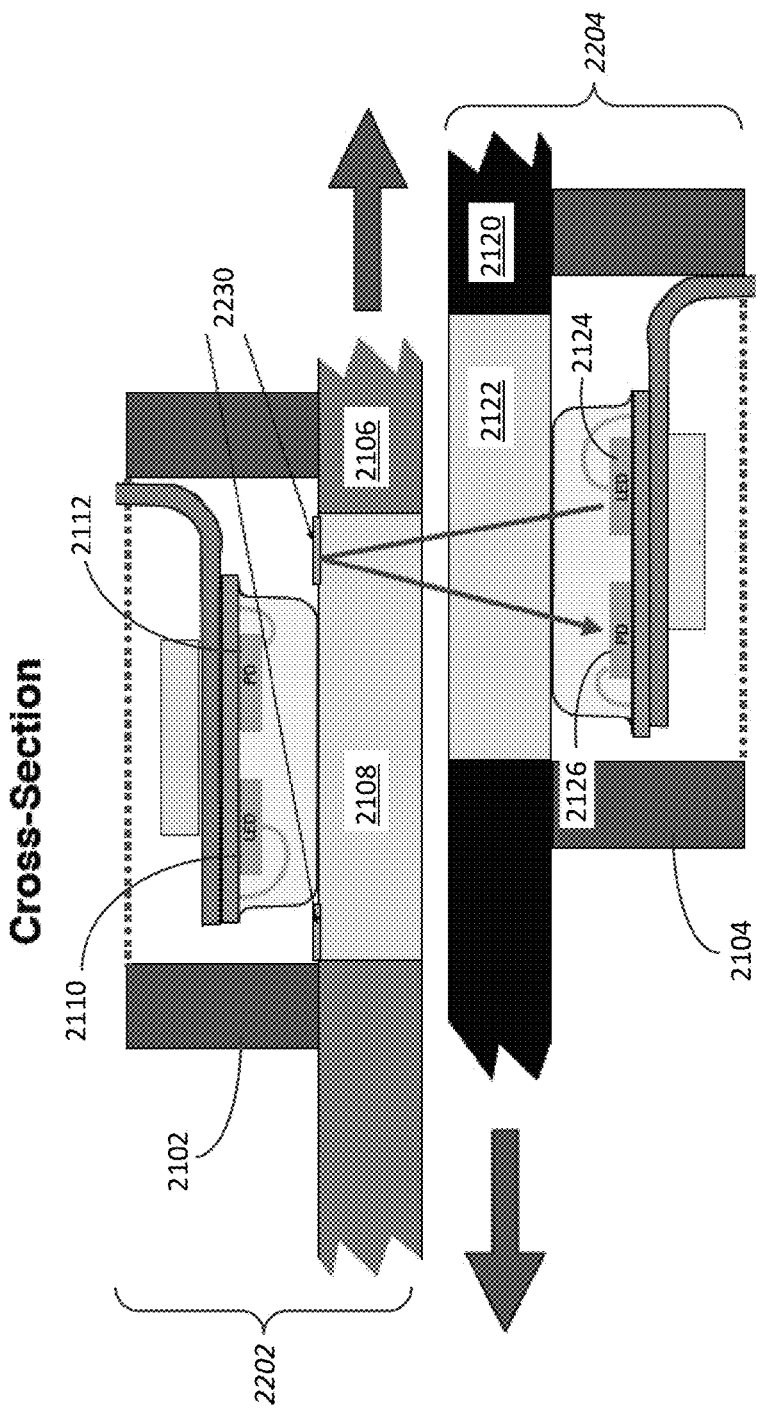
FIG. 22 illustrates a simplified cross-section view of portions of two complementary connector assemblies according to an embodiment of the present invention.

In some embodiments, optical data ports 2102 and 2104 may also be used to detect attachment or mating between a first connector assembly that includes first optical data port 2102 and a second connector assembly that includes second optical data port 2104. FIG. 22 shows a simplified cross-section view of portions of two complementary connector assemblies according to an embodiment of the present invention. Shown are a portion of a first connector assembly 2202 and a portion of a second connector assembly 2204. First connector assembly 2202 includes first optical data port 2102 and may also include an inductive charging port (not shown in FIG. 22), such as inductive charging port 100 described above. Second connector assembly 2204 includes second optical data port 2104 and may also include an inductive charging port (not shown in FIG. 22), such as inductive charging port 200 described above. The inductive charging port and optical data port in each connector assembly 2202, 2204 may be arranged relative to each other, e.g., as shown in FIG. 18. For instance, in FIG. 22, the inductive charging ports may be located out of view to the left of the connector assembly portions shown.

In the embodiment shown, attachment between first connector assembly 2202 and second connector assembly 2204 may be achieved by sliding second connector assembly 2204 relative to first connector assembly 2202 in the direction indicated by the arrows (this may be, e.g., along the length of connector assembly 1800 of FIG. 18). An attachment operation may be detected using optical data ports 2102 and 2104. For example, optically transparent window 2108 of first optical data port 2102 may include reflective zones 2230 disposed at either end of optically transparent window 2108. Reflective zones 2230 are further shown in FIG. 23, which is a front view of a portion of connector assembly 2202. Optically transparent window 2108 is disposed in housing 2106 and has reflective zones 2230 at either end. Reflective zones 2230 may be positioned at the inner surface of window 2108, as shown in FIG. 22, at the outer surface of window 2108, or embedded within the optically transparent material of window 2108. Reflective zones 2230 may be made of or coated with a material that is highly reflective at a wavelength detectable by photodetector 2126, such as aluminum or silver. Any material may be used, provided that the reflectivity of reflective zones 2230 is sufficiently different from the reflectivity of optically transparent window 2108 or the rest of housing 2106 that photodetector 2126 may reliably detect the difference.

Referring again to FIG. 22, as connector assembly 2204 moves relative to connector assembly 2202, light from LED 2124 may shine onto housing 2106. Some of the light may be reflected back to photodetector 2126. When LED 2124 comes into approximate alignment with reflective zone 2230, the amount of light from LED 2124 that is reflected back to photodetector 2126 may increase significantly. The increased light detected by photodetector 2126 may be used as an indication that second connector assembly 2204 is being attached to first connector assembly 2202. Conversely, an increased signal may occur again as second connector assembly 2204 is being detached from first connector assembly 2202. Such signals may be used by the second electronic device, of which second connector assembly 2204 is a part, to determine when to energize an inductive charging port or to take other actions that are to be performed based on attachment of second connector assembly 2204 to first connector assembly 2202.

Figure 23:
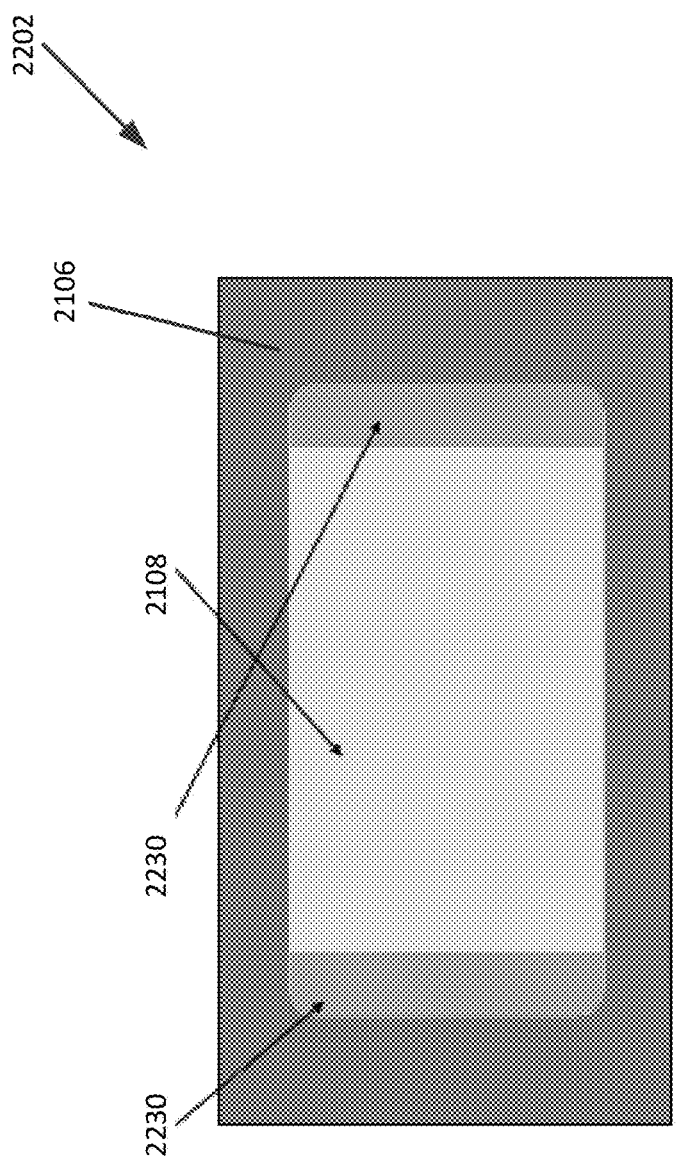
FIG. 23 illustrates a front view of a portion of the connector assembly of FIG. 22 according to an embodiment of the present invention.

It is to be understood that the arrangement shown in FIGS. 22 and 23 is illustrative and may be modified. For example, one or both of reflective zones 2230 may be replaced with light-absorbing zones (e.g., areas made of a material with measurably lower reflectivity than optically transparent window 2108 or the rest of housing 2106), and a decrease in light detected by photodetector 2126 may be used as an indicator that second connector assembly 2204 is being attached to or detached from first connector assembly 2202. Reflective zones may also be placed in other portions of optically transparent window 2108. For example, a reflective zone may be placed in the region between LED 2110 and photodiode 2112. In some embodiments, optically transparent window 2122 may also include reflective (or light-absorbing) zones, and attachment may be detected by first data port 2102 of first connector assembly 2202 using LED 2110 and photodetector 2112. Optical attachment detection may thus be performed by either or both of the first and second electronic devices.

Figure 24:
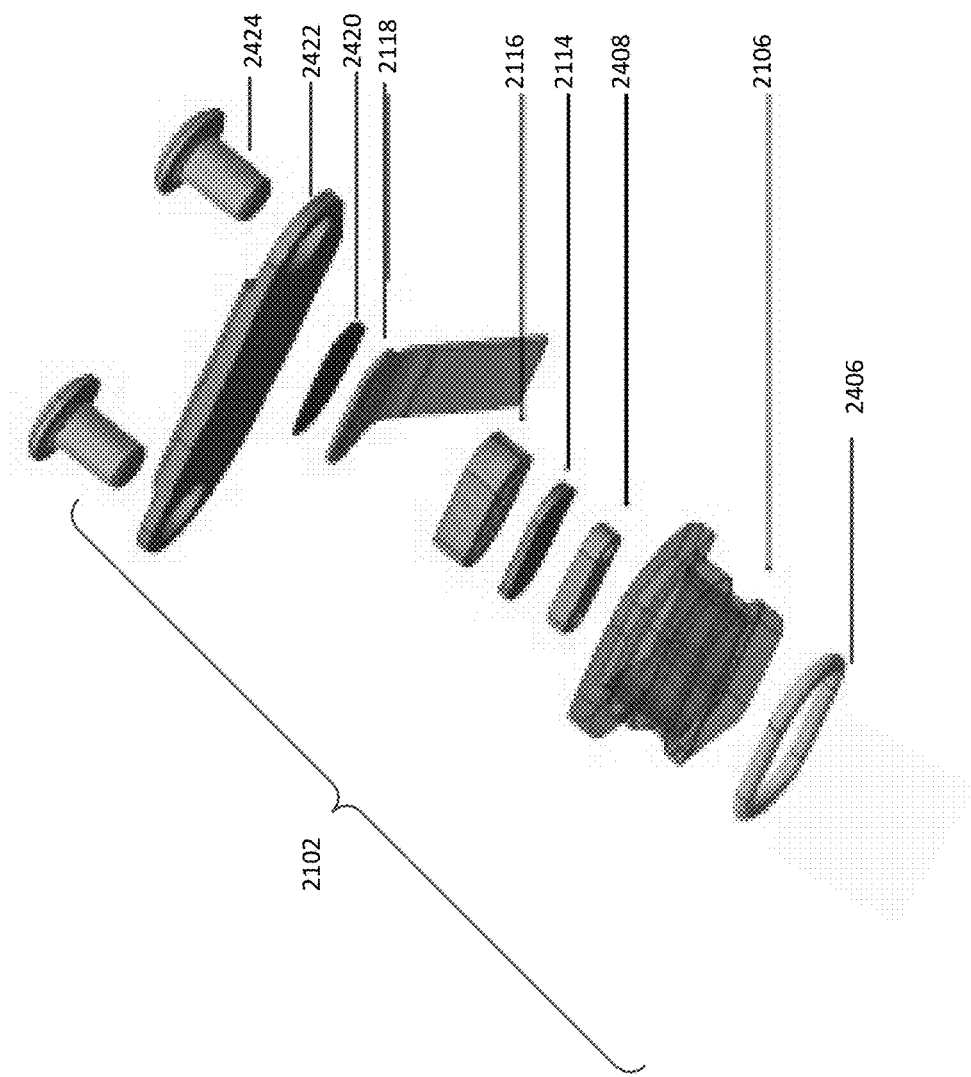
FIG. 24 illustrates an exploded view of components of an optical data port according to an embodiment of the present invention.

FIG. 24 shows an exploded view of components of first optical data port 2102 according to an embodiment of the present invention. As shown, first optical data port 2102 may include a housing 2106, which may be generally similar to housing 120 described above and may include an optically transparent window as described above. O-ring 2406 may be shaped to provide a seal between housing 2106 and a cavity in which housing 2106 is inserted, as described above. Optical transceiver module 2408 may incorporate LED 2110 and photodetector 2112, along with appropriate driver and signal processing circuitry. Optical transceiver module 2408 may be connected via circuit board 2114 to interposer 2116, which in turn may connect to a flexible circuit board 2118. An insulating spacer 2420 may be provided between flexible circuit board 2118 and cover 2422, which may be made of metal. Fasteners 2424 may hold the structure in place in the body of a connector assembly. Viewed from the rear, optical data port 2102 may be similar to data port 1804 shown in FIG. 18. Other types of data ports, including examples described above, may be constructed similarly.

The various data ports shown and described herein are illustrative and may be modified. The dimensions may be adapted to conform to the geometry of the connector assemblies in which the data ports are included, and a connector assembly may include zero or more data ports. For example, some connector assemblies may include one or two power ports and no data port.

In these and other embodiments of the present invention, other circuitry of the electronic device may be able to make use of portions of the connector assembly. For example, a bracket may be used to covey current for a power supply, it may be used as an antenna, a guide or housing for an antenna, or it may be used for other purposes. For example, the bracket may be a plastic housing for an antenna.

Figure 25:
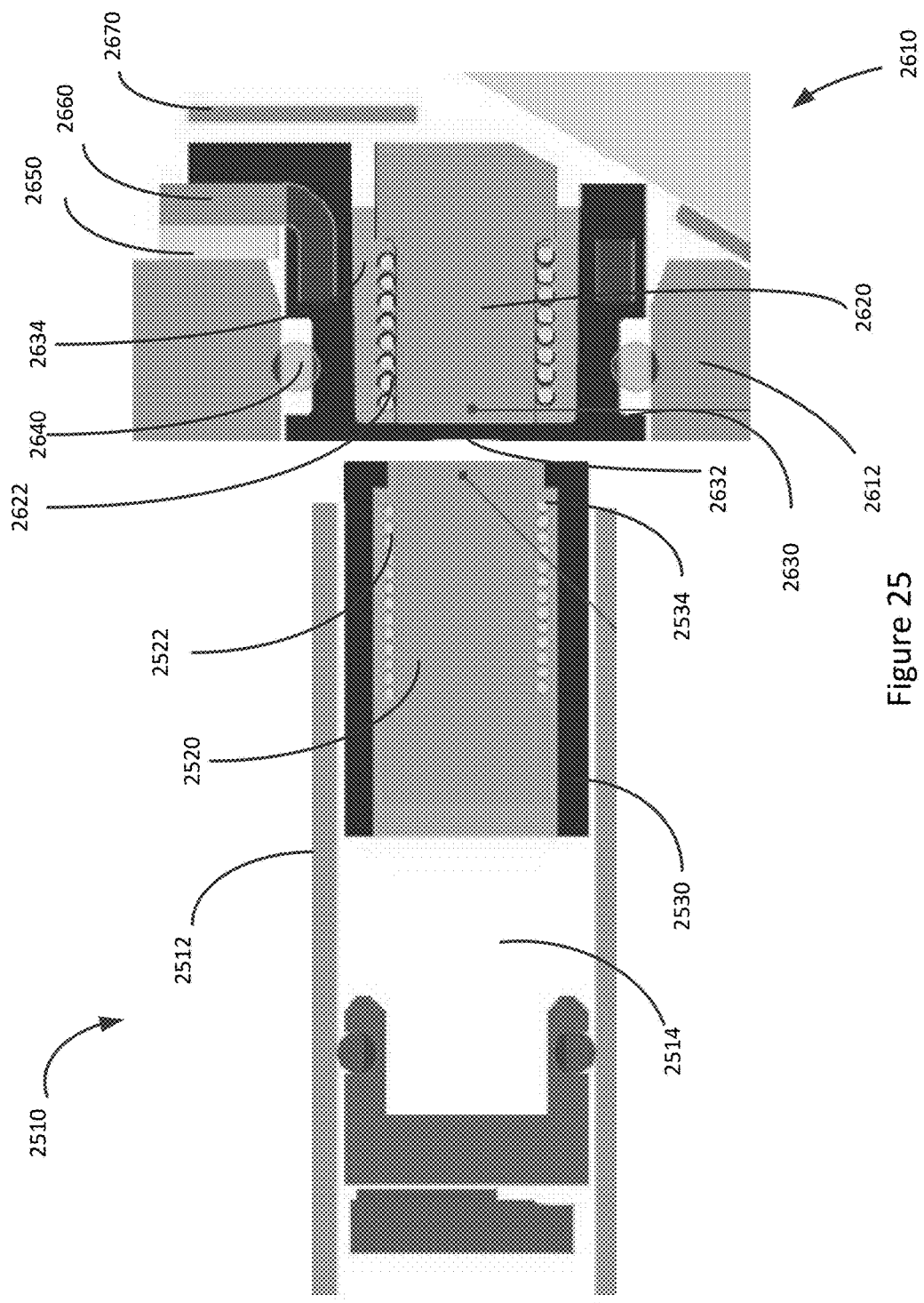
FIG. 25 illustrates inductive charging ports that may be used to transfer power between devices according to an embodiment of the present invention.

FIG. 25 illustrates inductive charging ports that may be used to transfer power between devices according to an embodiment of the present invention. A first inductive charging port 2510 may be housed in a device enclosure 2512 of a first electronic device. A second inductive charging port 2610 may be housed in a device enclosure 2612 for a second electronic device. In various embodiments of the present invention, power may be transferred from the first inductive charging port 2510 to the second inductive charging port 2610, or power may be transferred from inductive charging port 2610 to inductive charging port 2510.

Inductive charging port 2510 may include transformer core 2520 that may be at least partially surrounded by windings 2522. For example, transformer core 2520 may have one or more legs surrounded by windings 2522, a yoke of transformer 2520 may be surrounded by windings 2522, or these or other portions or combinations of portions of transformer core 2520 may be surrounded by windings 2522. Transformer core 2520 may be housed in a sleeve 2530. Sleeve 2530 may move relative to device enclosure 2512. Transformer core 2520 and windings 2522 may be encapsulated in place in sleeve 2530 by an epoxy or other potting material 2534. Similarly, an area 2514 may be at least partially filled with an epoxy or other potting material. Potting material or epoxy 2534 and the potting material or epoxy in area 2514 may prevent moisture ingress into the first electronic device.

Inductive charging port 2610 may include transformer core 2620 that may be at least partially surrounded by windings 2622. For example, transformer core 2620 may have one or more legs surrounded by windings 2622, a yoke of transformer core 2620 may be surrounded by windings 2622, or these or other portions or combinations of portions of transformer core 2620 may be surrounded by windings 2622. Transformer core 2620 may be housed in sleeve 2630. Sleeve 2630 may be fixed in place relative to the device enclosure 2612. Transformer core 2620 and windings 2622 may be secured in place in sleeve 2630 by an epoxy or other potting material 2634. O-ring 2640 may provide a seal to prevent the ingress of moisture into the second electronic device.

Sleeve 2630 may be at least partially molded around frame 2660. Frame 2660 may provide mechanical support for sleeve 2630. Shim 2650 may be placed between device enclosure 2612 and frame 2660 to mechanically align a front surface of transformer 2622 to a front surface of device enclosure 2612. Flexible circuit board 2670 may provide an electrical conduit from transformer core 2620 to other circuitry (not shown) in the second electronic device.

In various embodiments the present invention, it may be desirable to align opposing faces of transformer cores 2520 and 2620 to each other and to minimize the spacing between them. This may improve the transfer of energy between the inductive charging ports 2510 and 2610. Lateral alignment may be achieved as described above. The spacing between transformers 2520 and 2620 may be minimized by either exposing surfaces of transformers 2520 and 2620 at the surfaces of their electronic devices or by covering them with a very thin protective layer. In this example, a surface of transformer core 2520 may be exposed while a surface of transformer core 2620 may be covered by a thin protective layer 2632. The gap may be further reduced by applying a spring force to move sleeve 2530 and transformer core 2520 towards transformer core 2620 in corresponding inductive charging port 2610. The gap may be further reduced by using shim 2650 in inductive charging port 2610 to properly align a surface of transformer core 2620, for example to a surface of device enclosure 2612 of the second electronic device.

Again, in this specific embodiment of the present invention, a surface of transformer core 2520 may be exposed while a surface of transformer core 2620 may be covered with a thin protective layer 2632. Accordingly, surfaces of sleeve 2530, epoxy or potting material 2534, and transformer core 2520 may be exposed at a surface of device enclosure 2512.

During assembly, transformer core 2520 and windings 2522 may be placed in sleeve 2530. A liner may be placed over surfaces of transformer core 2520 and sleeve 2530. Epoxy or other potting material 2534 may be inserted between transformer core 2520 and sleeve 2530, where the liner protects the surface of transformer core 2520 and surface of sleeve 2530 from the epoxy or potting material 2534. The epoxy or potting material 2534 may be cured and the liner may then be removed. Afterward, for cosmetic and functional reasons, the surfaces of transformer core 2520, sleeve 2530, and epoxy or potting material 2534 may be polished or otherwise smoothed together as a unit. For example, a buffing wheel, polishing cloth, sandpaper, blasting, tumbling, or other methods may be used to provide a cosmetic and functional finish to the combined surface. The surfaces of transformer core 2520, sleeve 2530, and potting material or epoxy 2534 may also be colored, for example by ink jet printing, pad printing, physical vapor deposition, epoxy, or other method. They may be colored black, they may be colored to match the device enclosure 2512, or they may have another color. In still other embodiments of the present invention, sleeve 2530 may be extended to provide a protective layer over a surface of the transformer core 2520.

A surface of the transformer core 2620 for the second electronic device may be covered with a thin protective layer 2632. Protective layer 2632 may be formed either along with, or separately from, sleeve 2630 by placing transformer core 2620 in a die holding a plastic in a fluid or liquid state. A predetermined force may be applied to transformer core 2620. The plastic in the die may be squeezed to provide a thin layer over the surface of transformer core 2620. The plastic may then be cured in place. By making protective layer 2632 thin, the resulting energy transfer may be maximized while transformer core 2620 may still be protected by protective layer 2632. Protective layer 2632 may be formed of liquid crystal polymer or other material. Protective layer 2632 may be as thin as 0.05, 0.1, 0.2, or 0.5 mm. Autoclaving, degassing, or other steps may be employed to avoid separation of the protective layer 2632 from the surface of transformer core 2620.

Again, a surface of transformer core 2520 may similarly be covered by a protective layer. An example is shown in the follow figure.

Figure 26:
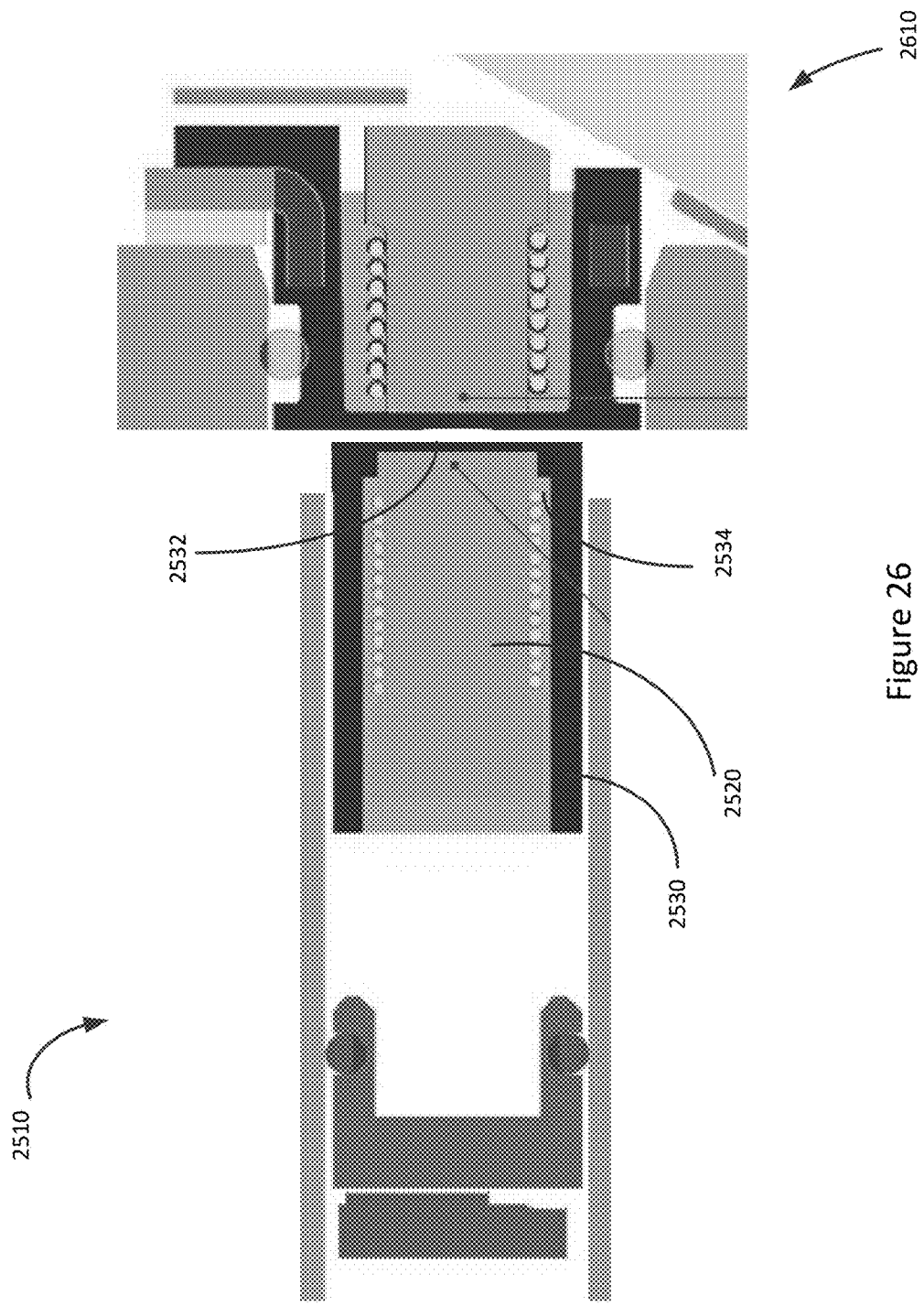
FIG. 26 illustrates inductive charging ports that may be used to transfer power between devices according to an embodiment of the present invention.

FIG. 26 illustrates inductive charging ports that may be used to transfer power between devices according to an embodiment of the present invention. A first inductive charging port 2510 may include a transformer core 2520 in sleeve 2530, where transformer core 2520 is held in place by epoxy or other potting material 2534. A thin protective cover 2532 may be formed together with, or separately from, sleeve 2530. Protective cover 2532 may cover a surface of transformer core 2520 and epoxy or potting material 2534. Protective layer 2532 may be formed by placing transformer core 2520 in a die holding a plastic in a fluid or liquid state. A predetermined force may be applied to transformer core 2520. The plastic in the die may be squeezed to provide a thin layer 2532 over the surface of transformer core 2520. The plastic may then be cured in place. By making protective layer 2532 thin, the resulting energy transfer may be maximized while transformer core 2520 is still protected by protective layer 2532. Protective layer 2532 may be formed of liquid crystal polymer or other material. Protective layer 2532 may be as thin as 0.05, 0.1, 0.2, or 0.5 mm. Autoclaving, degassing, or other steps may be employed to avoid separation of the protective layer 2532 from the surface of transformer core 2520.

Figure 27:
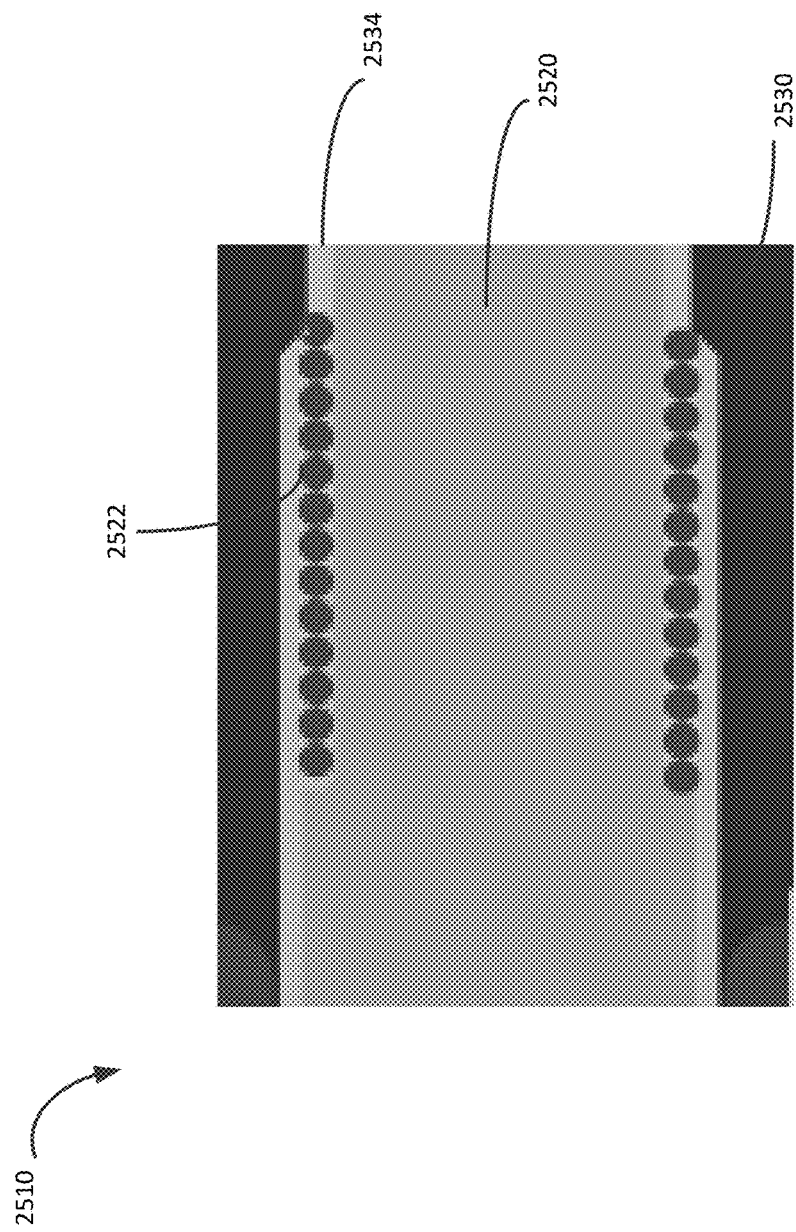
FIG. 27 illustrates a portion of an inductive charging port according to an embodiment of the present invention.

FIG. 27 illustrates a portion of an inductive charging port according to an embodiment of the present invention. Inductive charging port 2510 may include transformer core 2520 having one or more portions at least partially wrapped by windings 2522. Transformer core 2520 and windings 2522 may be located in sleeve 2530. Transformer core 2520 and windings 2522 may be secured in sleeve 2530 by epoxy or other potting material 2534. During assembly, transformer core 2520 may be wrapped by windings 2522. Transformer core 2520 and windings 2522 may be inserted into sleeve 2530. A lining or other material may be placed over front surfaces of transformer core 2420 and sleeve 2530. Epoxy or other potting material 2534 may be injected between transformer core 2520 and sleeve 2530. The lining may protect front surfaces of transformer core 2520 and sleeve 2530 from being exposed to the epoxy or other potting material 2534. The epoxy or other material 2534 may be cured and the liner may be removed.

For cosmetic and functional reasons, the surfaces of transformer core 2520, sleeve 2530, and epoxy or potting material 2534 may be polished or otherwise smoothed together as a unit. For example, a buffing wheel, polishing cloth, sandpaper, blasting, tumbling, or other methods may be used to provide a cosmetic and functional combined surface. The surfaces of transformer core 2520, sleeve 2530, and potting material or epoxy 2534 may also be colored, for example by ink jet printing, pad printing, physical vapor deposition, epoxy, or other method. They may be colored black, they may be colored to match the device enclosure 2512 (as shown in FIG. 25), or they may have another color. In still other embodiments of the present invention, sleeve 2530 may be extended to provide a protective layer over a surface of the transformer core 2520.

Figure 28:
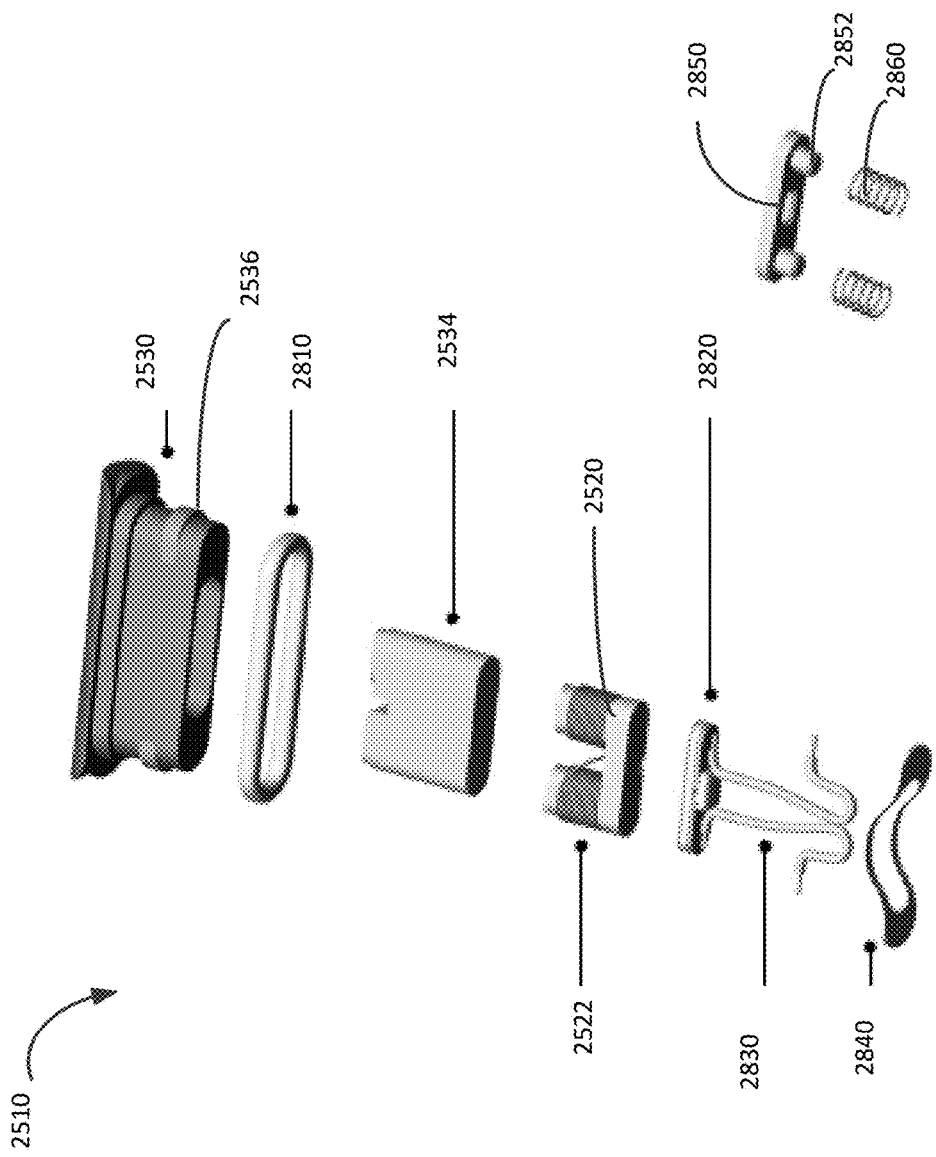
FIG. 28 is an exploded view of an inductive charging port according to an embodiment of the present invention.

FIG. 28 is an exploded view of an inductive charging port according to an embodiment of the present invention. Charging port 2510 may include a sleeve 2530. Sleeve 2530 may be inserted into an opening in device enclosure 2512 as shown in FIG. 25. Retention clips 2536 may secure sleeve 2530 in device enclosure 2512 while still allowing sleeve 2530 to move relative to device enclosure 2512. Transformer core 2520 may include one or more legs and a yoke at least partially wrapped by windings 2522. Transformer core 2520 may be inserted into sleeve 2530. As before, an epoxy or potting material 2534 may be used to secure transformer core 2520 in place in sleeve 2530. O-ring 2810 may be placed between sleeve portion 2530 and device enclosure 2512 to prevent moisture ingress into the electronic device. Contact plate 2820 may attach to transformer 2520 and provide contact areas for dynamic wires 2830. Dynamic wires 2830 may include an amount of slack to compensate for the movement of sleeve 2530 relative to device enclosure 2512 and the remainder of the electronic device.

One or more spring elements may bias sleeve 2530 towards the front of device enclosure 2512 in order to limit a gap between transformer core 2520 and transformer core 2620, as shown in FIG. 25. These spring members may include flexure 2840. In other embodiments of the present invention, the spring members may include plate 2850 having posts 2852, with springs 2860 positioned around posts 2852.

In this example, retention clips 2536 may be used to secure sleeve 2530 to device enclosure 2512 while still allowing sleeve 2530 to move relative to device enclosure 2512. In other embodiments of the present invention, other types of retaining features may be used. Examples are shown in the following figures.

Figure 29:
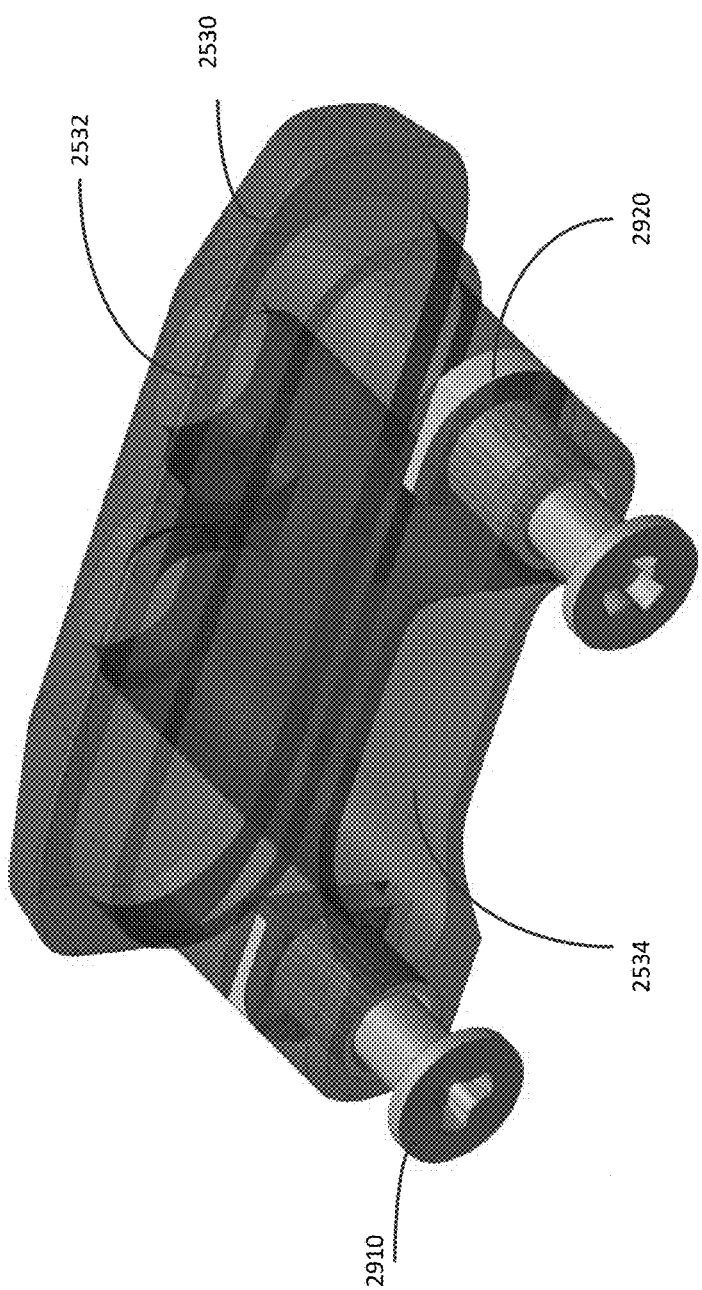
FIGS. 29-32 illustrate sleeves for inductive charging ports according to embodiments of the present invention.

FIG. 29 illustrates a sleeve for an inductive charging port according to an embodiment of the present invention. In this example, fasteners 2910 may be screwed into nuts 2920. Nuts 2920 may be insert-molded into sleeve 2530. Sleeve 2530 may include front openings 2532 for surfaces of transformer core 2520 as shown in FIG. 28, and a rear opening 2534 for the insertion of transformer core 2520 during assembly, also as shown in FIG. 28.

Figure 30:
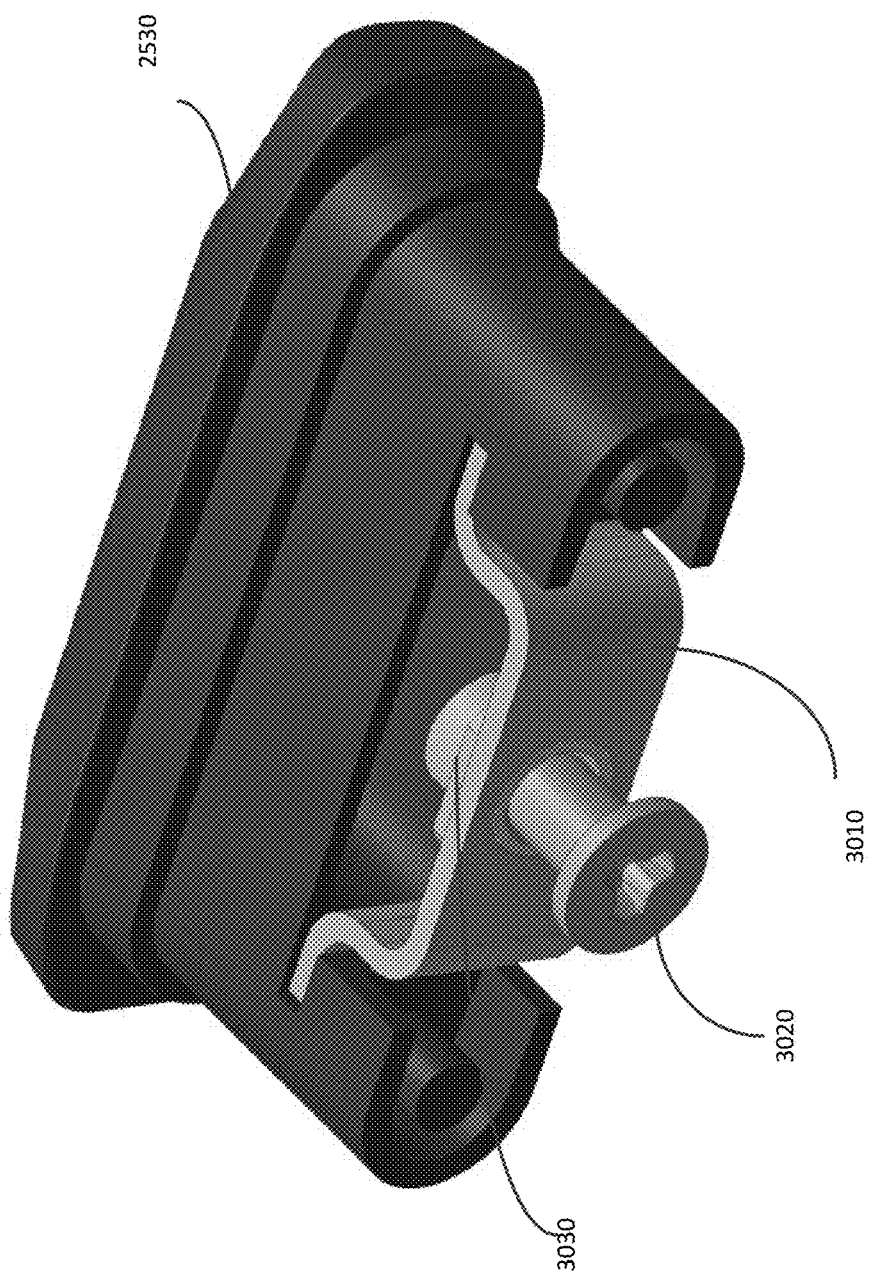

FIG. 30 illustrates a sleeve for an inductive charging port according to an embodiment of the present invention. In this example, bracket 3010 may provide support for fastener 3020 and nut 3030.

Figure 31:
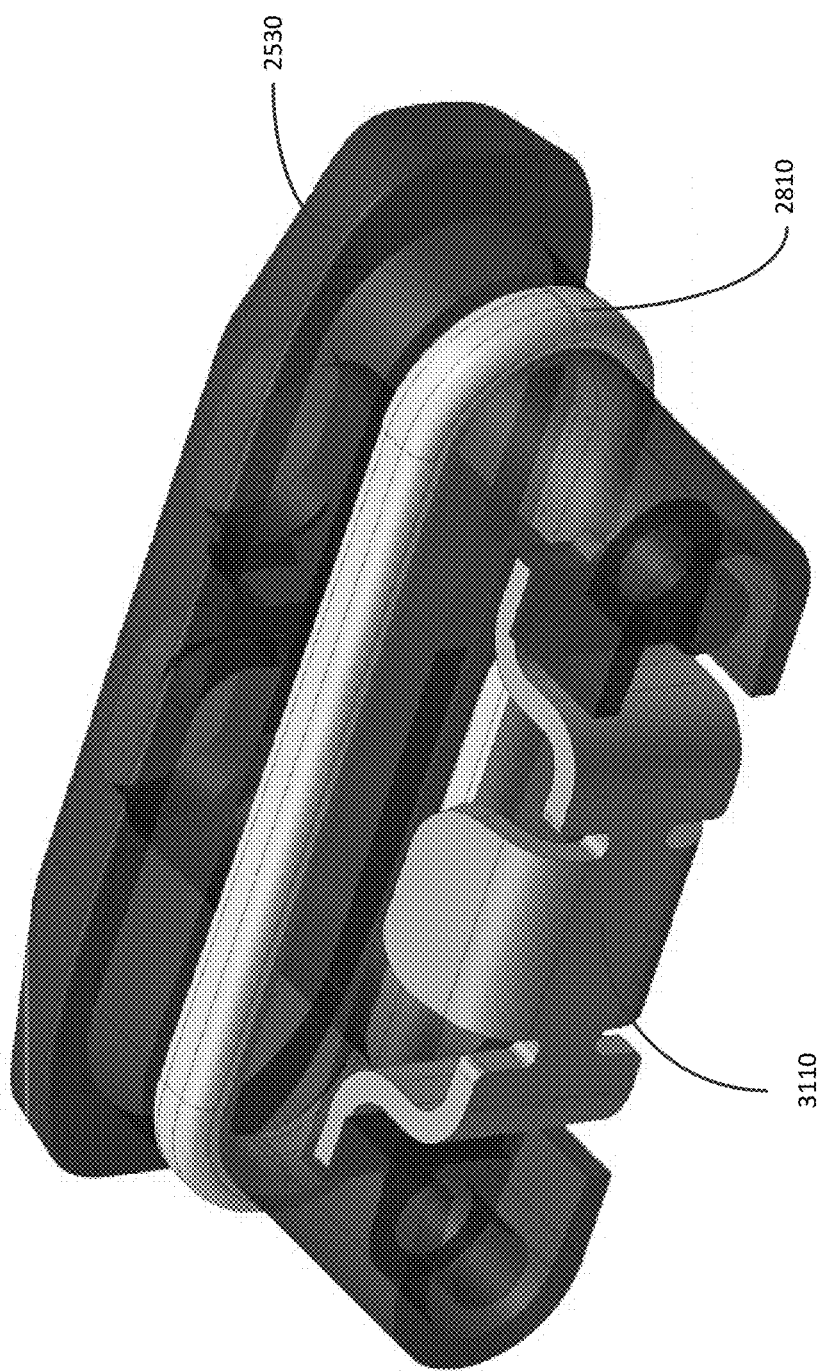

FIG. 31 illustrates a sleeve for an inductive charging port according to an embodiment of the present invention. In this example, retention clip 3110 may be fixed to a rear of sleeve 2530. O-ring 2810 is shown as well. Again, O-ring 2810 may be placed between sleeve 2530 and device enclosure 2512 to prevent ingress of moisture into the electronic device.

Figure 32:
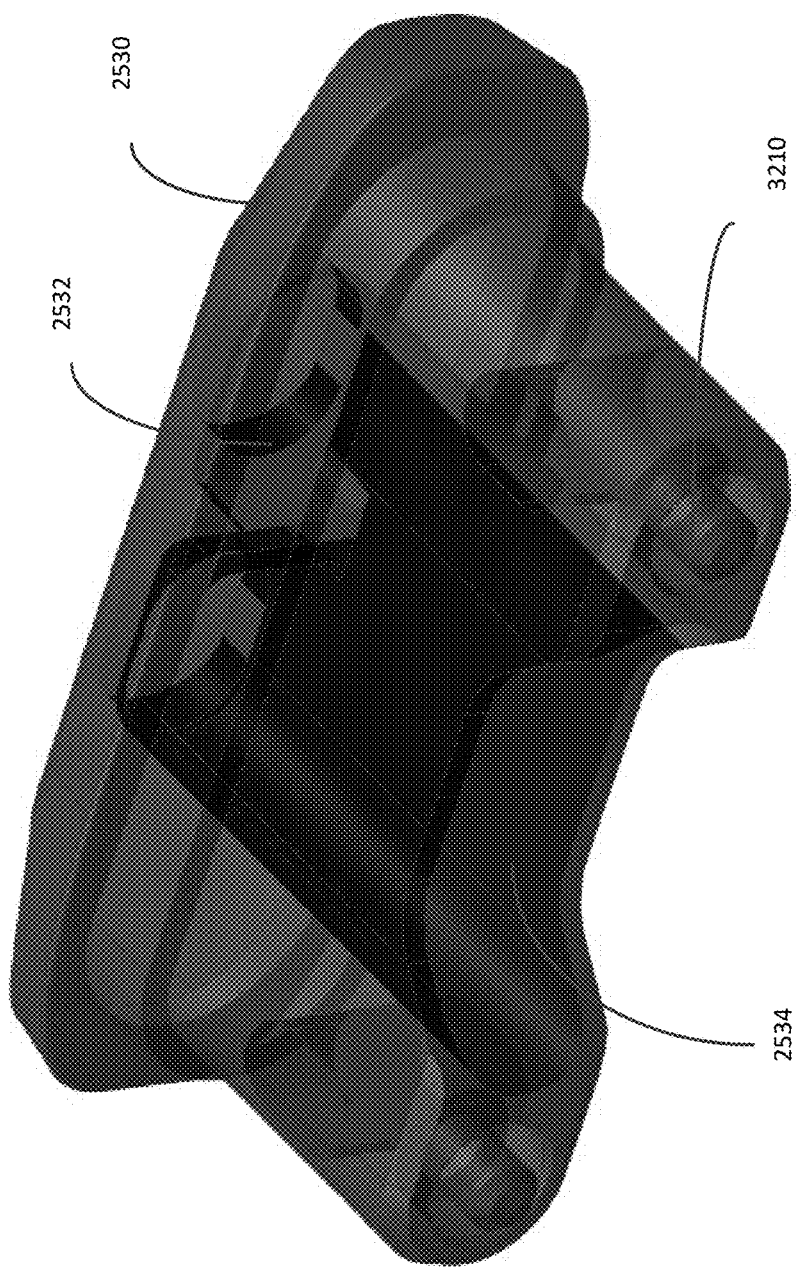

FIG. 32 illustrates a sleeve for an inductive charging port according to embodiments of the present invention. In this example, threaded recesses 3010 may be located in sleeve 2530. Fasteners (not shown) may be inserted from the front of sleeve 2530 into threaded recesses 3210. As before, sleeve 2530 may include openings 2532 for surfaces of transformer core 2520 and a rear opening 2534 for the insertion of the transformer core 2520, as shown in FIG. 28.

FIG. 33 illustrates a transparent view of an inductive charging port according to an embodiment of the present invention. In this example, transformer core 2520 may be at least partially wrapped by windings 2522. The legs of transformer core 2520 may be supported by yoke 2521. Transformer core 2520 may be located in sleeve 2530. Sleeve 2530 may be located in device enclosure 2512, as shown in FIG. 25. Yoke 2521 of transformer core 2520 may interface with contact plate 2820. Wires 2830 may be soldered at points 2832 to contact plates 2820. Wires 2830 may further be connected to flexible circuit board 3320 at connections 2834. Wires 2830 may be dynamic wires, that is they may have sufficient flex to allow sleeve 2530 to move relative to device enclosure 2512. In various embodiments of the present invention, sleeve 2530 may move 0.2, 0.4, or 1.0 mm relative to device enclosure 2512.

Again, sleeve 2530 may move relative to device enclosure 2512. Retention clips 2536 may secure sleeve 2530 in place in device enclosure 2512. Specifically, when sleeve 2530 is inserted into device enclosure 2512, sides of retention clips 2536 may release and move away from sides of sleeve 2530. Retention clips 2536 may be expanded and be located in notches 3310 in device enclosure 2512. Notches 3310 may have a greater length along a side of sleeve 2530 than retention clips 2536. This may limit the travel of sleeve 2530 relative to device enclosure 2512, while allowing the necessary freedom of movement.

Again, it may be desirable to push transformer core 2520 towards a transformer core of a corresponding inductive charging port. Accordingly, this inductive charging port may include plate 2850 having posts 2852. Springs 2860 may be located around posts 2852 and may be located between plate 2850 and device enclosure 2512. In this configuration, spring 2860 may push sleeve 2530 in a direction such that transformer core 2520 is moved closer to a corresponding transformer core, such as transformer core 2620 in charging port 2610, as shown in FIG. 25. As before, O-ring 2810 may be located between sleeve 2530 and device enclosure 2512 to prevent moisture leakage into the first electronic device.

Figure 34A:
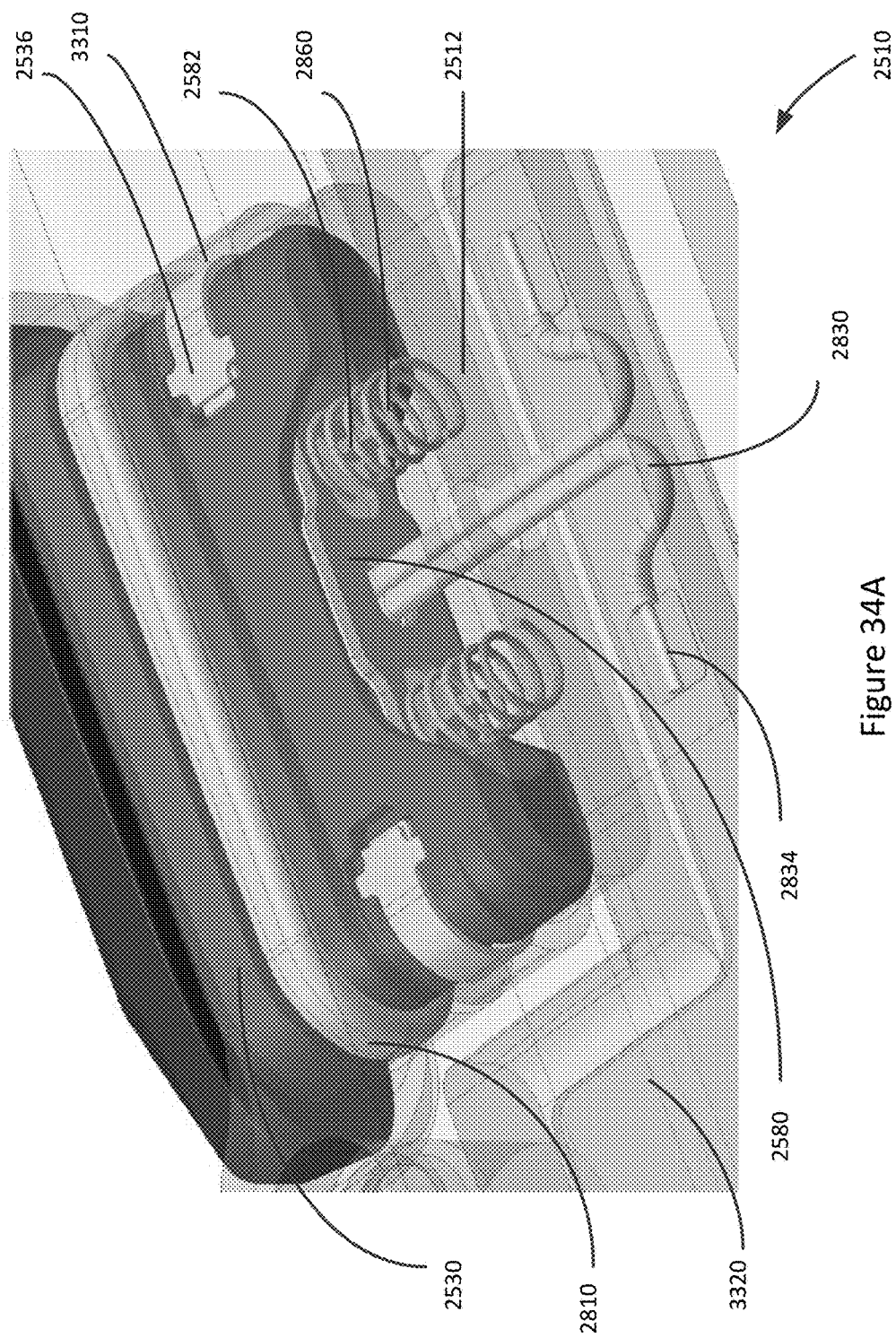

FIG. 34A illustrates another transparent view of an inductive charging port according to an embodiment of the present invention. Sleeve 2530 may be located in device enclosure 2512. Retention clips 2536 may be expanded away from sides of sleeve 2530 and may be located in notches 3310. This may allow retention clips 2536 to fix sleeve 2530 in an opening in device enclosure 2512 while allowing the necessary freedom of movement. O-ring 2010 may prevent moisture ingress into the first electronic device. Dynamic wires 2830 may make electrical connections through contacts 2834 to flexible circuit board 3320. Springs 2860 may drive plate 2850 away from a bottom surface of device enclosure 2512. Plate 2580 may include posts 2582 for stabilizing springs 2860 in place.

FIGS. 34B-34D illustrate a retention clip for securing a sleeve to a device enclosure according to an embodiment of the present invention. In FIG. 34B, retention clip 2536 may be attached to sleeve 2530. Specifically, retention clip 2536 may include tabs 3402 that may fit in notches 3412 in sleeve 2530. Retention clip 2536 and its flexures 3404 may be slid into groove 3414 in sleeve 2530. Tabs 3402 and notches 3412 may secure retention clip 2536 in place in sleeve 2530.

As sleeve 2530 is inserted into device enclosure 2512 (shown in FIG. 34A), retention clip 2536 may be compressed. This compression may allow sleeve 2530 to be inserted into device enclosure 2512. After insertion, retention clip 2536 may expand thereby securing sleeve 2530 in place in device enclosure 2512.

In FIG. 34C, retention clip 2536 may be compressed from position 2536A to position 2536B. Retention clip flexures 3404 may move from position 3404A to position 3404B. This compression may occur when sleeve 2530 is inserted into device enclosure 2512. This compression may be caused by a tool pushing retention clip 2536 against sleeve 2530. In these and other embodiments of the present invention, the compression may be caused by a chamfered leading edge (not shown) of retention clip 2536 engaging device enclosure 2512 as sleeve 2530 is inserted. In these and other embodiments of the present invention, the compression may be caused by a chamfered leading edge (not shown) of device enclosure 2512 engaging retention clip 2536 during the insertion. Once sleeve 2530 is inserted into device enclosure 2512, flexures 3404 may bias retention clip 2536 outward. That is, flexures 3404 may move from position 3404B to position 3404A, while retention clip 2536 may expand from position 2536B to position 2536A, thereby securing sleeve 2530 in place in device enclosure 2512. In FIG. 34D, retention clip 2536 may be compressed from position 2536A to position 2536B. Retention clip 2536 may be formed in various ways. For example, it may be stamped, forged, 3-D printed, molded, or formed in other ways. Retention clip 2536 may be formed of stainless steel or other flexible material.

Figure 35:
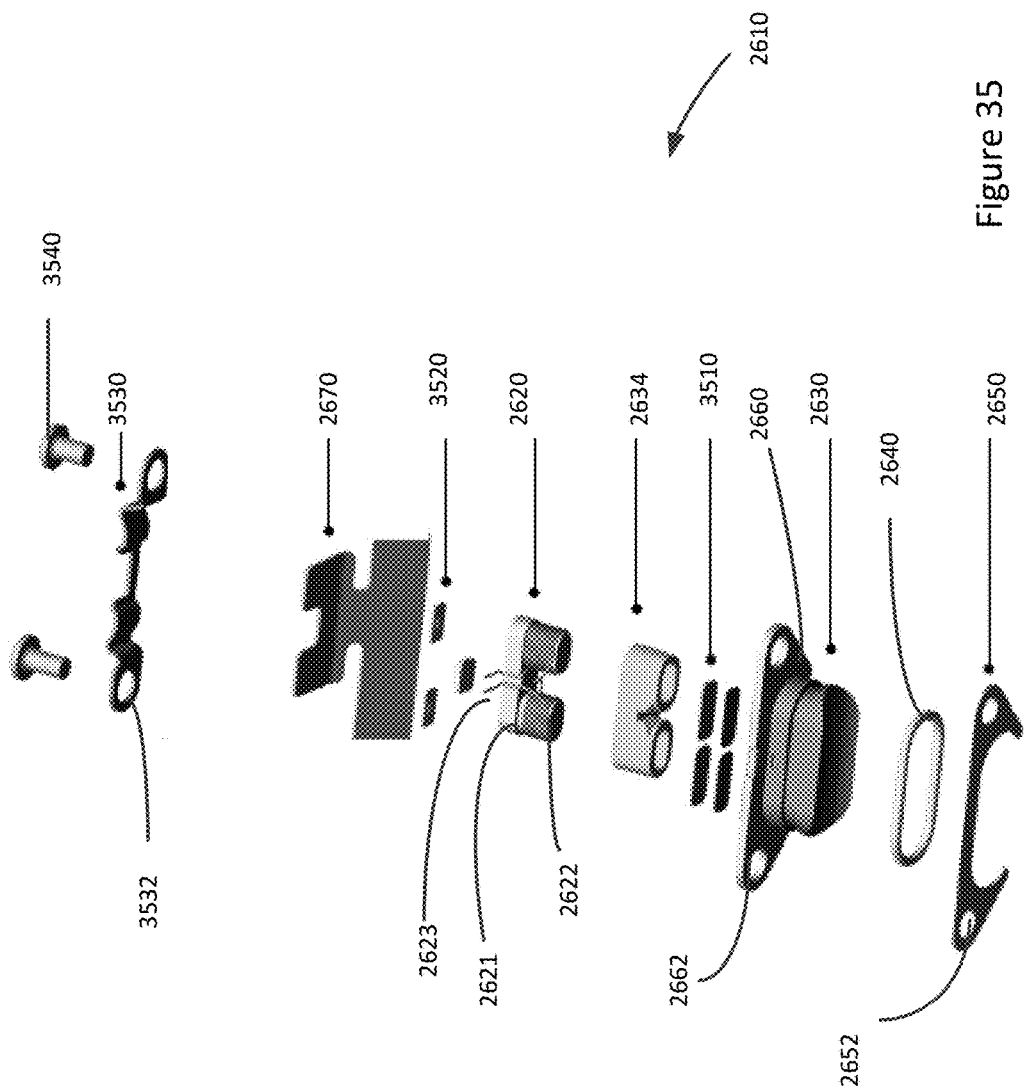
FIG. 35 illustrates an exploded view of another inductive charging port according to an embodiment of the present invention.

FIG. 35 illustrates an exploded view of another inductive charging port according to an embodiment of the present invention. In this example, inductive charging port 2610 may include sleeve 2630. Sleeve 2630 may be partially formed around bracket 2660. Bracket 2660 may be fixed to device enclosure 2612 to hold the inductive charging port 2610 in place. Windings 2622 may be wrapped around one or more legs of transformer core 2620. Yoke 2621 may support the legs of transformer core 2620. Transformer core 2620 may be inserted into sleeve 2630. Epoxy or other potting material 2634 may secure transformer core 2620 in place in sleeve 2630. Landing pads 3510 may provide contact areas for leads 2623 from windings 2622. Dimple plates 3520 may be used to form electrical connections between landing pads 3510 and flexible circuit board 2670. Bracket 3530 may hold dimple plates 3520 in place against landing pad 3510. Fasteners 3540 may pass through openings 3532 in bracket 3530, opening 2662 in bracket 2660, and opening 2652 in shim 2650, and into a threaded opening in device enclosure 2612 (not shown).

Again, it may be desirable to align transformer core 2620 with transformer core 2520 of inductive charging port 2510 as shown in FIG. 25. To improve the alignment of transformer core 2620 to a surface of device enclosure 2612, shim 2650 may be used. In various embodiments of the present invention, a number of shims 2650 having varying widths may be provided, where a shim 2650 having a desired width is selected from among them.

Figure 36:
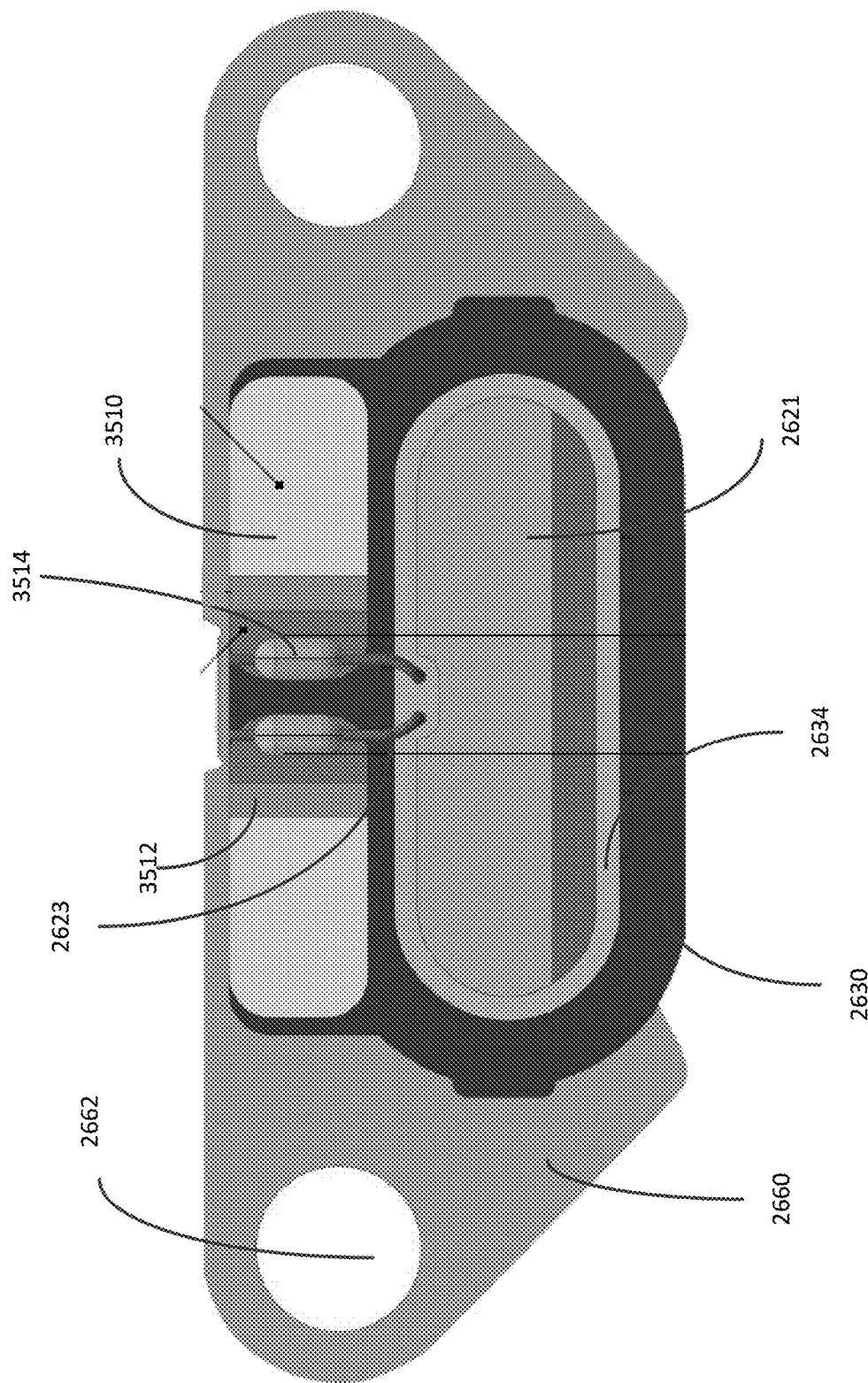
FIG. 36 illustrates a portion of an inductive charging port according to an embodiment of the present invention.

FIG. 36 illustrates a portion of an inductive charging port according to an embodiment of the present invention. Yoke 2621 may be located in sleeve 2630 and held in place epoxy or other potting material 2634. Leads 2623 may be soldered to landing pads 3510 at solder point 3514. Solder block regions 3512 may prevent solder from flowing onto the remainder of landing pads 3510. Bracket 3660 may be partially encapsulated in sleeve 2630 and may include opening 2662 for a fastener 3540, as shown in FIG. 35.

Figure 37:
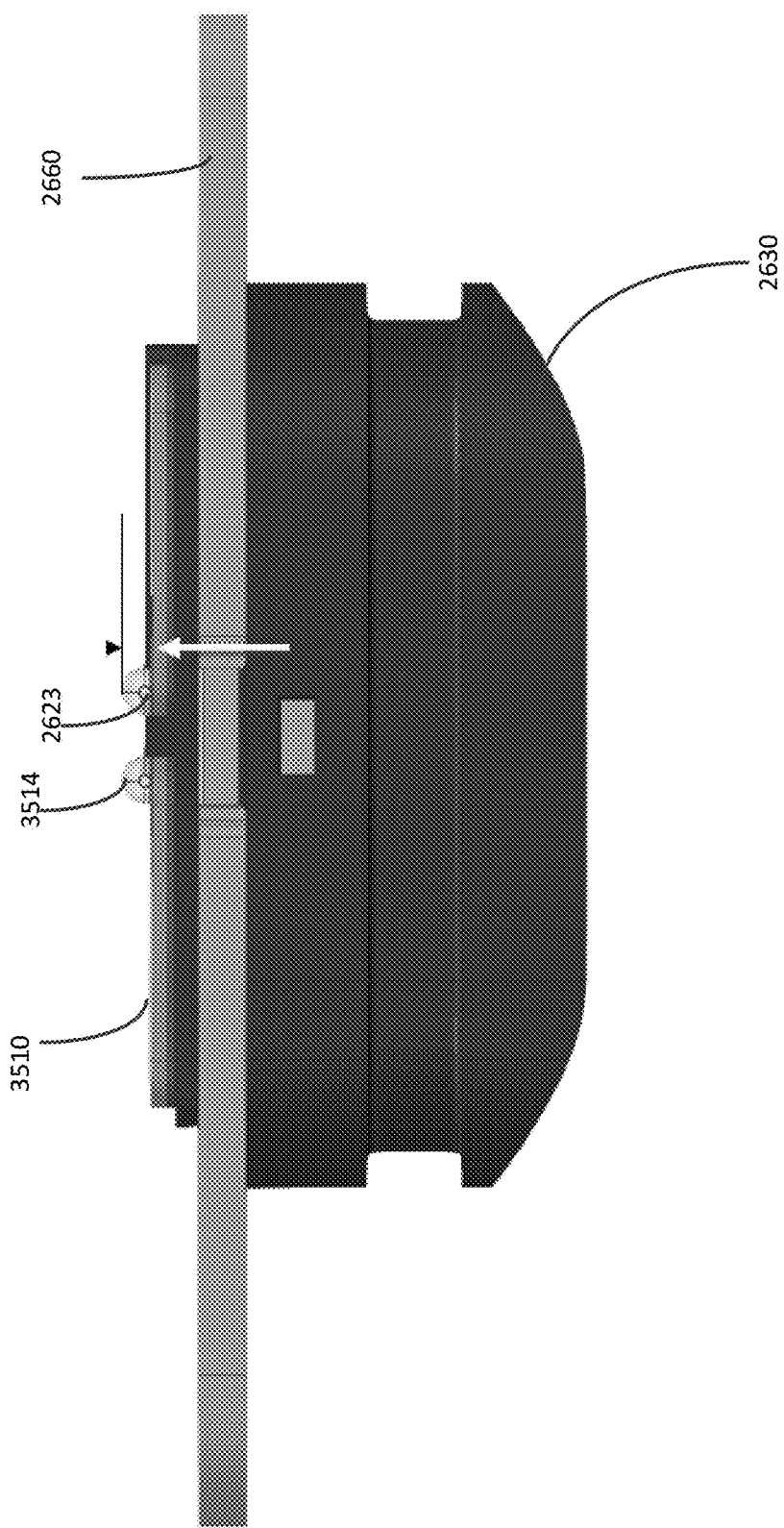
FIG. 37 illustrates a side view of a portion of an inductive charging port according to an embodiment of the present invention.

FIG. 37 illustrates a side view of a portion of an inductive charging port according to an embodiment of the present invention. Again, leads 2623 may be soldered at solder points 3514 to landing pads 3510. Sleeve 2630 may be formed at least partially around bracket 2660.

In various embodiments of the present invention, it may be desirable to form a removable connection to landing pads 3510. This may allow an easy rework of an inductive charging port, such as inductive charging ports 2510 and 2610, as shown in FIG. 25. For example, a sleeve and transformer core can be easily removed and replaced with such a removable connection to landing pads 3510. Accordingly, embodiments of the present invention may attach a dimple plate 3520 that may be held in place under force to form a connection to landing pads 3510. An example is shown in the following figures.

Figure 38:
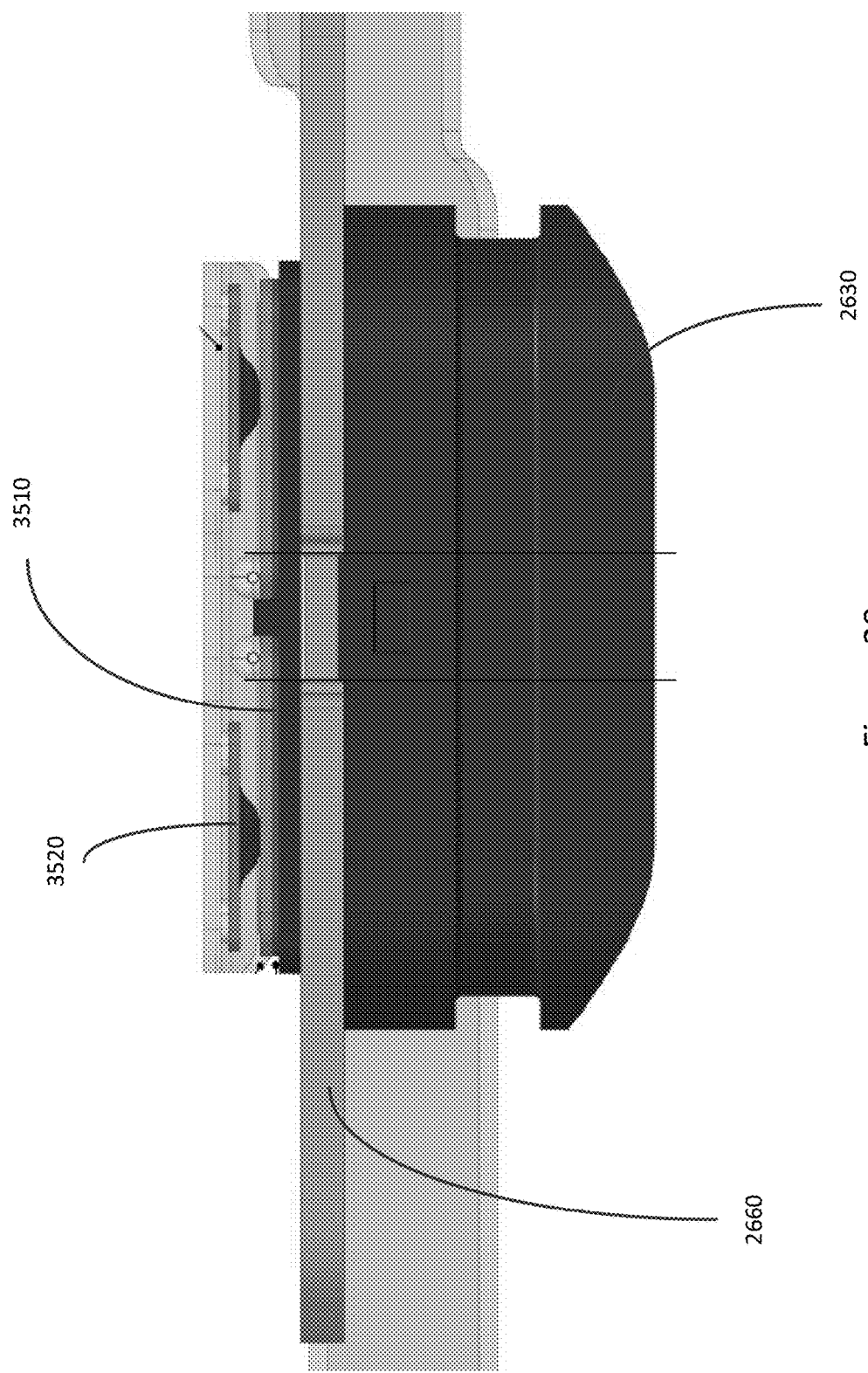
FIG. 38 illustrates a side view of a portion of an inductive charging port according to an embodiment of the present invention.

FIG. 38 illustrates a side view of a portion of an inductive charging port according to an embodiment of the present invention. In this example, dimple plates 3520 may be in contact with landing pads 3510. Again, bracket 2660 may be partially encapsulated by sleeve 2630.

Again, by not soldering dimple plates 3520 to landing pads 3510, it may be easier to rework these inductive charging ports, such as charging ports 2510 and 2610 in FIG. 25. Accordingly, in various embodiments of the present invention, it may be desirable to apply a force to dimple plates 3520. An example is shown in the following figure.

Figure 39:
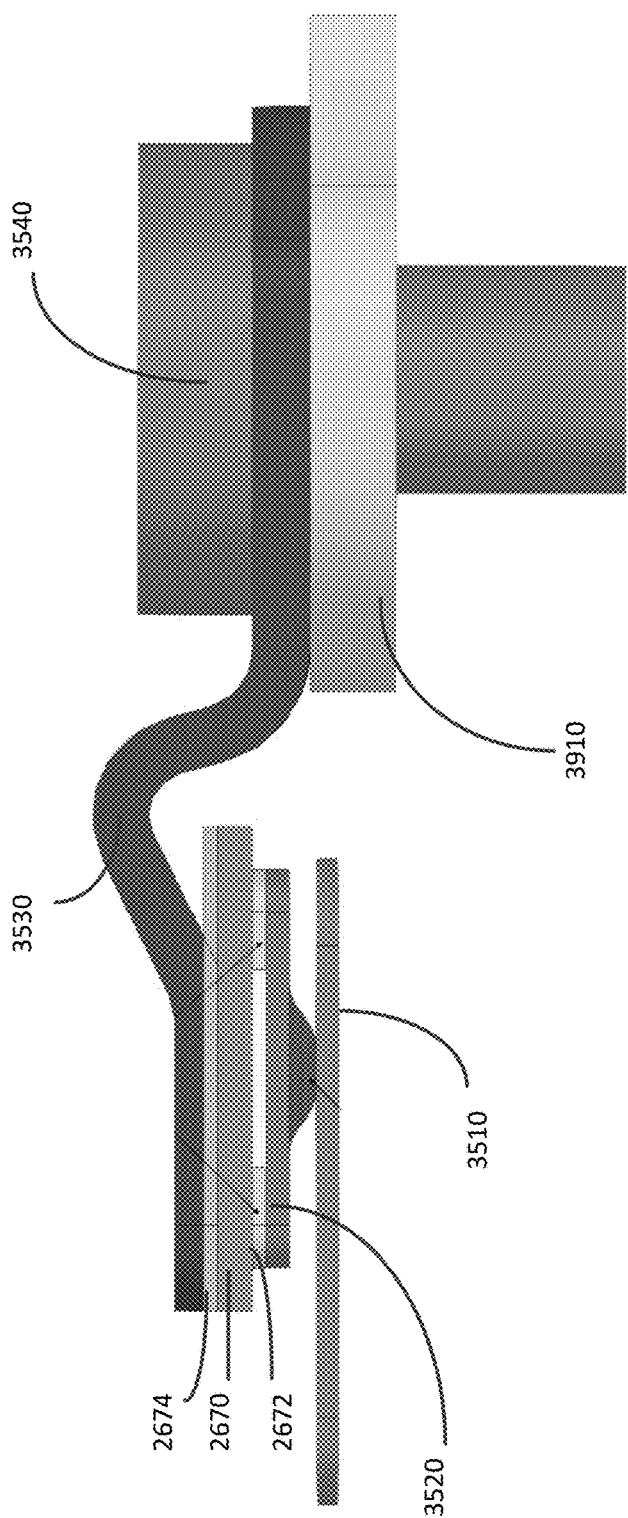
FIG. 39 illustrates a side view of a portion of an inductive charging port according to an embodiment of the present invention.

FIG. 39 illustrates a side view of a portion of an inductive charging port according to an embodiment of the present invention. In this example, dimple plate 3520 may be in contact with landing pad 3510. Dimple plate 3520 may be soldered by solder layer 2672 to flexible circuit board 2670. Flexible circuit board 2670 may include a protective layer 2674. Dimple plate 3520 may be pressed into contact with landing pads 3510 by bracket 3530. Bracket 3530 may be held in place by bracket 3910 and fastener 3540. As will be shown below, bracket 3910 may be a second bracket used in securing electronic components to device enclosure 2612.

Figure 40:
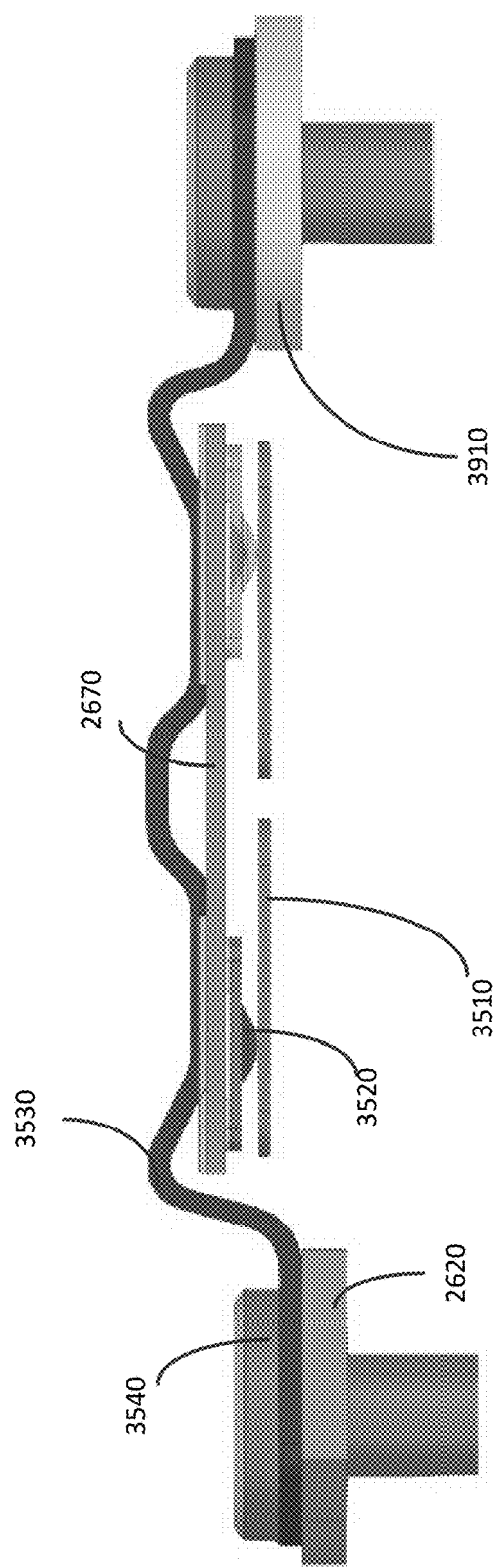
FIG. 40 illustrates a side view of a portion of an inductive charging port according to an embodiment of the present invention.

FIG. 40 illustrates a side view of a portion of an inductive charging port according to an embodiment of the present invention. Again, dimple place 3520 may be in contact with landing pads 3510. Dimple plates 3520 may be soldered to flexible circuit board 2670. Bracket 3530 may provide a force maintaining contact between dimple plates 3520 and landing pads 3510. In various embodiments of the present invention, bracket 3530 may be a flexure, a rigid bracket, or other spring-like structure, which may include actual springs. Fasteners 3540 may be inserted through openings in brackets 2620 and 3910 into openings in the device enclosure 2612 to secure this assembly in place.

Figure 41:
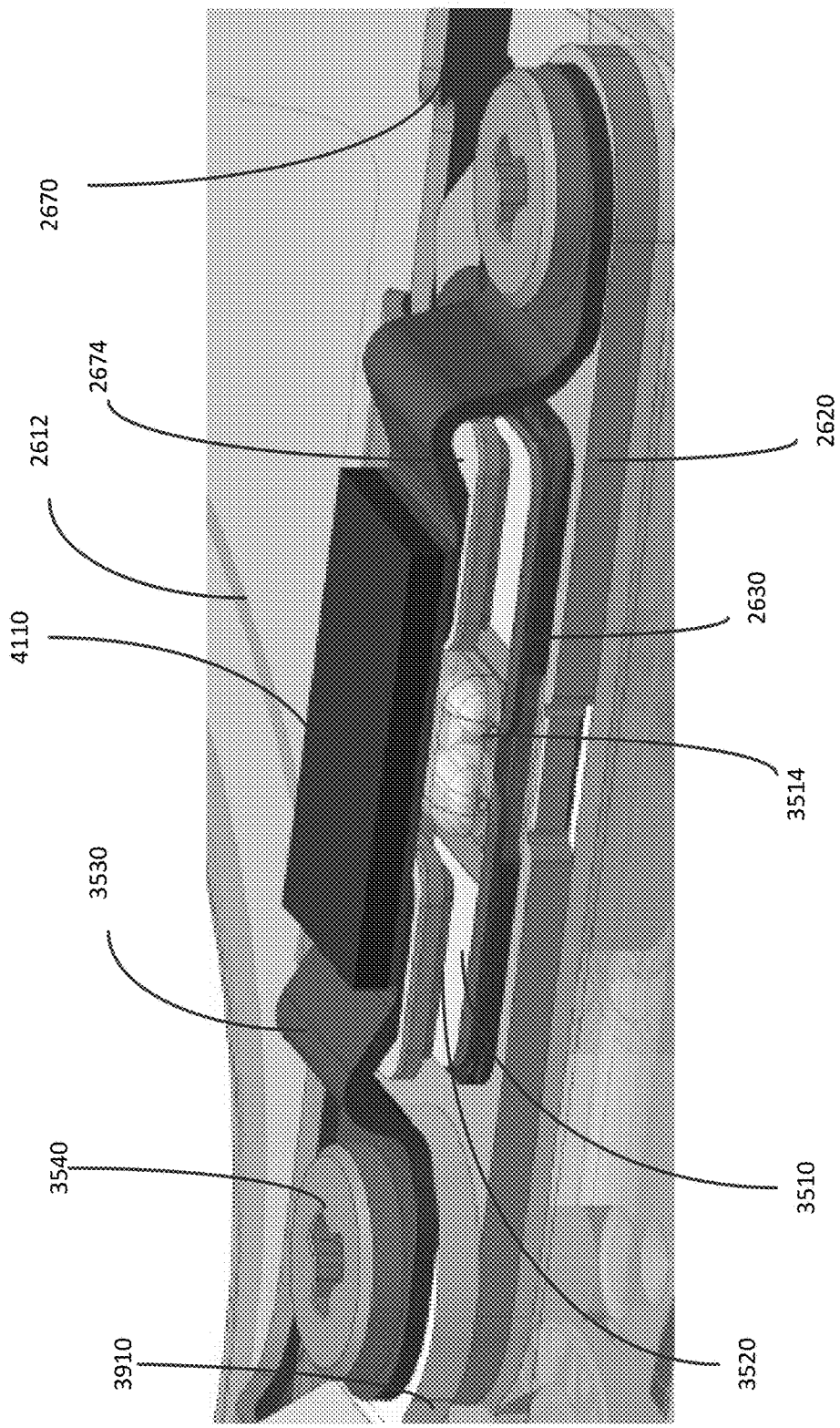
FIG. 41 illustrates a portion of an inductive charging port according to an embodiment of the present invention.

FIG. 41 illustrates a portion of an inductive charging port according to an embodiment of the present invention. Again, bracket 2620 may be partially enclosed by sleeve 2630. Leads from windings (not shown) from transformer core may be soldered at solder points 3514 to landing pads 3510. Dimple plates 3520 may be held in place against landing pads 3510 by bracket 3530. Dimple plates 3520 may be in electrical contact with flexible circuit board 2670. Protective layers 2674 may protect flexible circuit board 2670 from bracket 3530. Bracket 3530 may be held in place relative to the device enclosure 2612 by fasteners 3540, which may pass through openings in brackets 3530, 3910, and 2620, and into threaded recesses (not shown) in the device enclosure 2612.

In various embodiments the present invention, bracket 3910 may be used to secure other ports, such as other inductive charging ports or data ports. Some examples of such data ports are described above. Additional examples of such data ports are shown in the following figures, which relate to embodiments of a 60-GHz data port similar to that shown in FIG. 20 above.

Figure 42:
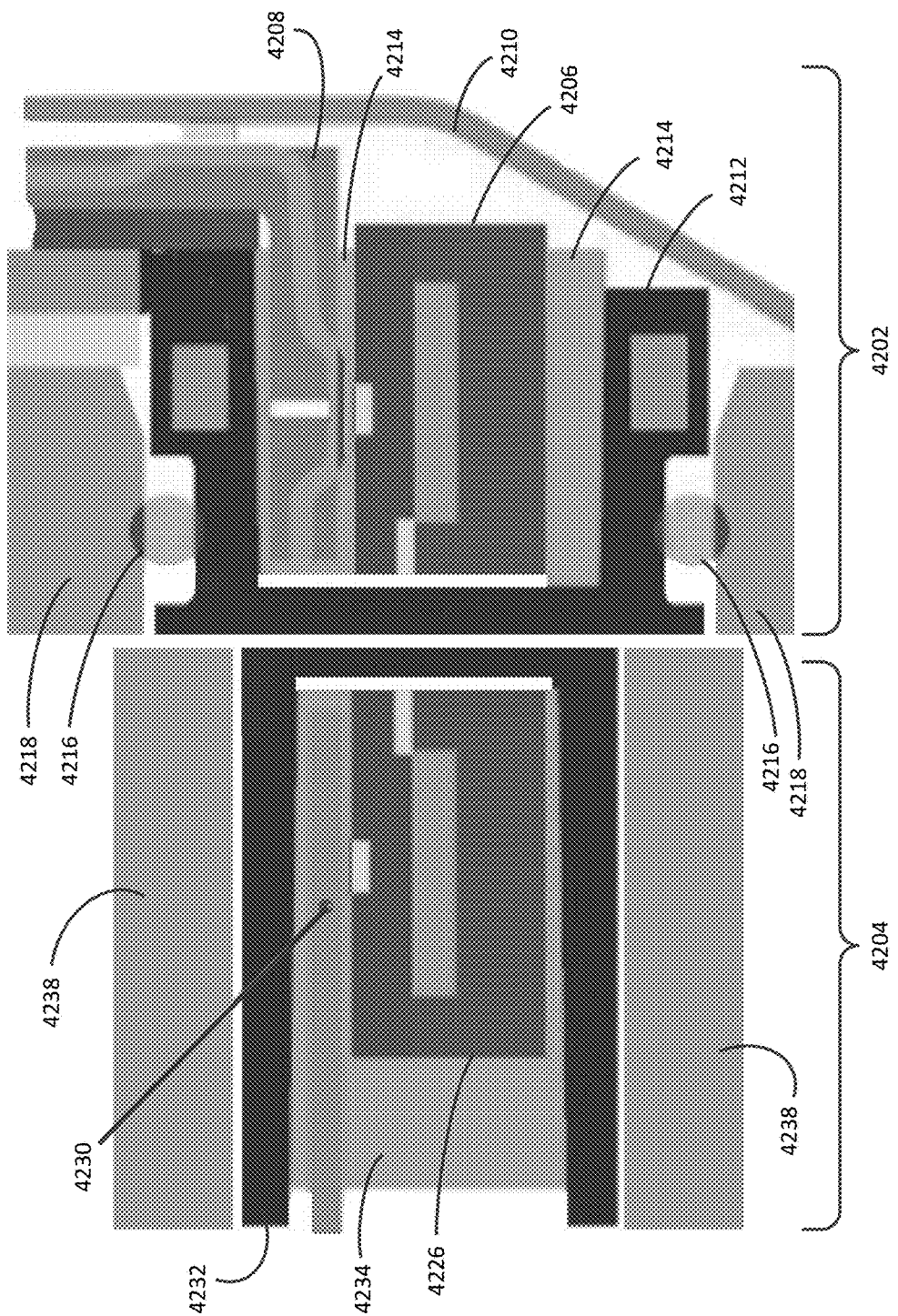
FIG. 42 illustrates a simplified cross-section view of complementary 60-GHz data ports according to an embodiment of the present invention.
Figure 43:
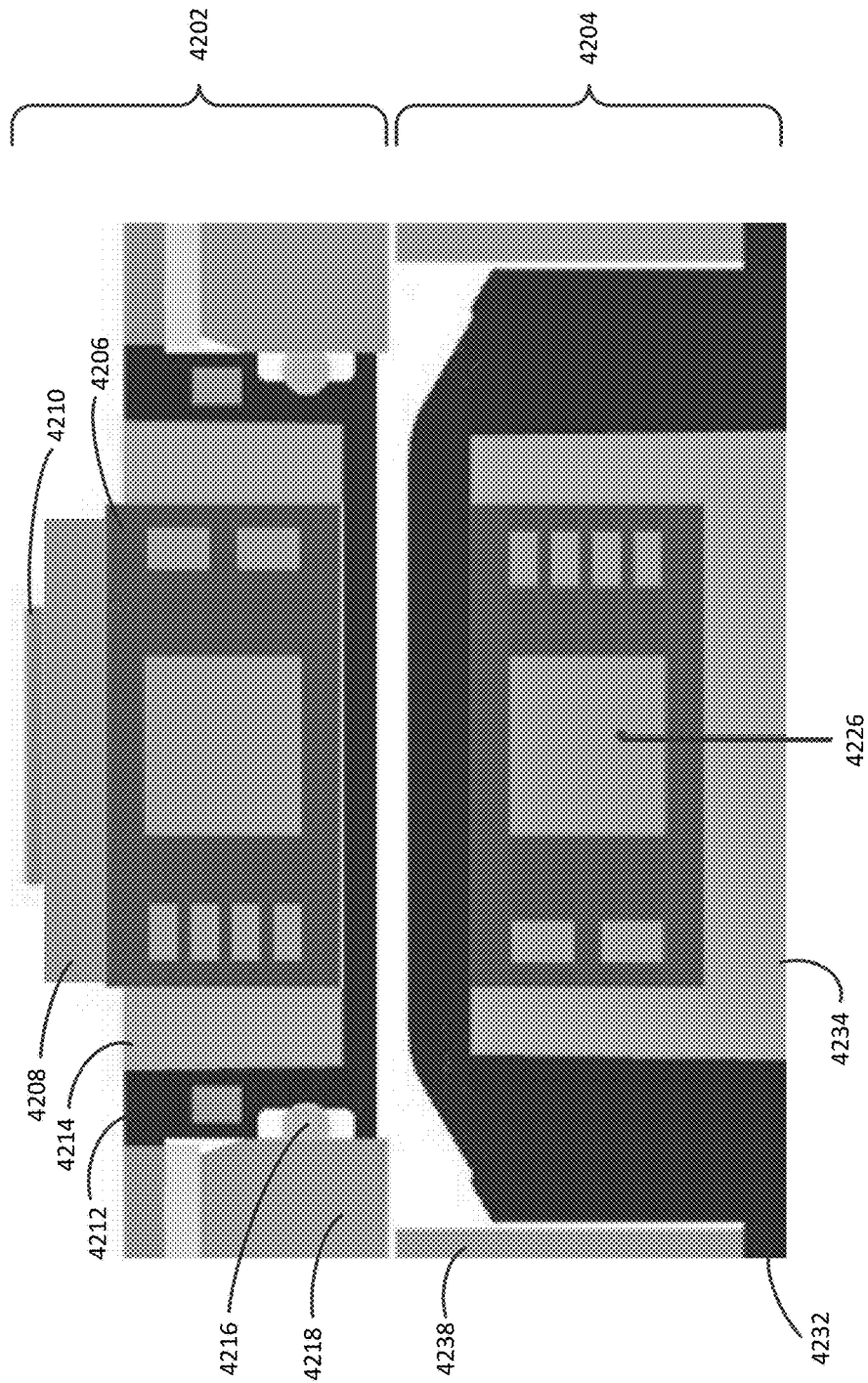
FIG. 43 illustrates another simplified cross-section view of the data ports of FIG. 42.

FIG. 42 shows a simplified cross-section view of complementary 60-GHz data ports 4202, 4204 according to an embodiment of the present invention, and FIG. 43 shows another simplified cross-section view along a direction orthogonal to that of FIG. 42. First data port 4202 may include a 60-GHz edge-fire antenna and transceiver chip 4206. An interposer 4208 may connect transceiver chip 4206 to a printed circuit board 4210, which may be a flexible circuit board that connects to other circuitry in a first electronic device in which first data port 4202 is located. Transceiver chip 4206 and interposer 4208 may be held in a housing 4212, which may be made of a plastic (e.g., liquid crystal polymer (LCP)) or other dielectric material. An encapsulating material 4214, such as epoxy or other resin, may hold transceiver chip 4206 and interposer 4208 in place within housing 4212. In some embodiments, data port housing 4212 may be placed in an opening in a housing 4218 of the first electronic device. An O-ring 4216 may provide a watertight seal between the outer surface of housing 4212 and the opening in housing 4218.

Second data port 4204 may also include a 60-GHz edge-fire antenna and transceiver chip 4226, which may be similar or identical in design to transceiver chip 4206. Transceiver chip 4226 may be connected to a printed circuit board 4230, which may be a flexible circuit board that connects to other circuitry in a second electronic device in which second data port 4204 is located. Transceiver chip 4226 may be held in a housing 4232, which may be made of a plastic or other dielectric material. An encapsulating material 4234, such as epoxy or other resin, may hold transceiver chip 4226 in place. In some embodiments, data port housing 4232 may be placed in an opening in a housing 4238 of the second electronic device. O-rings or other seals (not shown) may be provided between housings 4232 and 4238 if desired.

Figure 44:
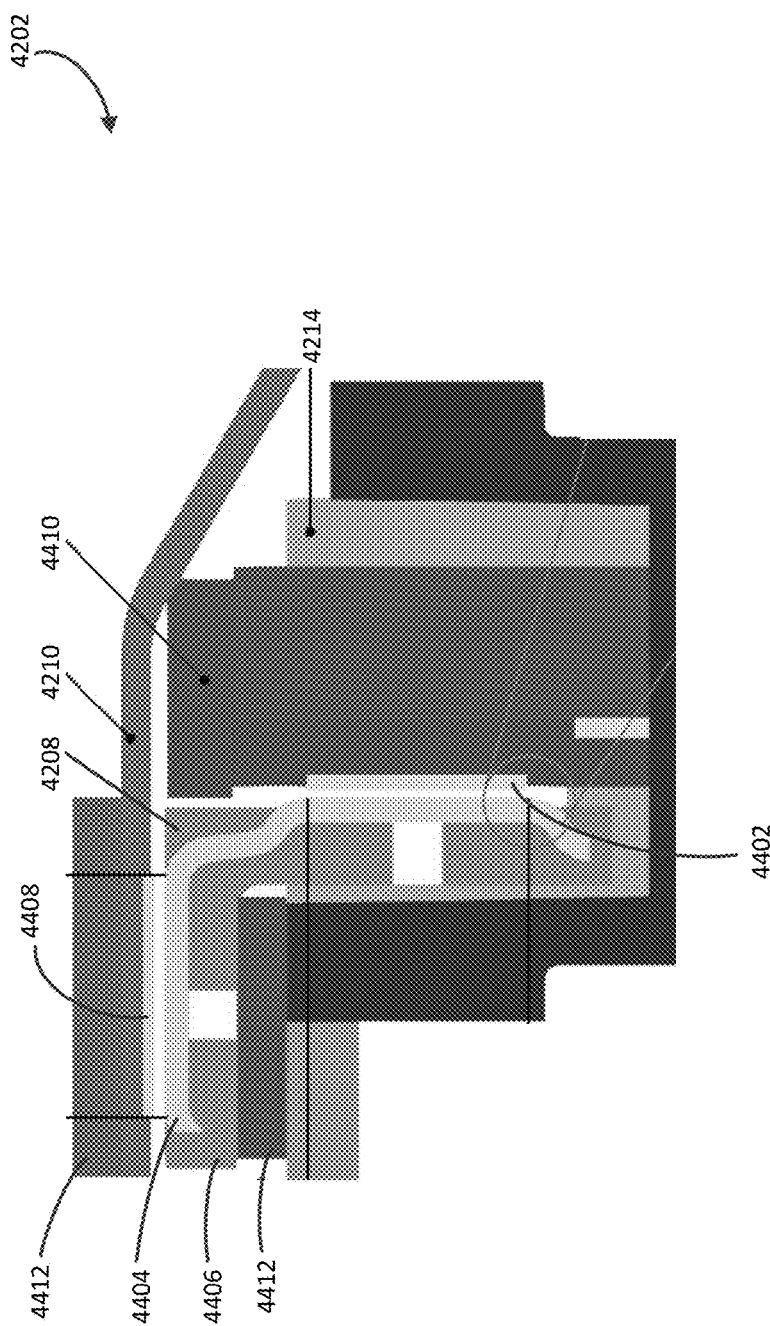
FIG. 44 illustrates another simplified cross-section view of a 60-GHz data port according to an embodiment of the present invention.
Figure 45:
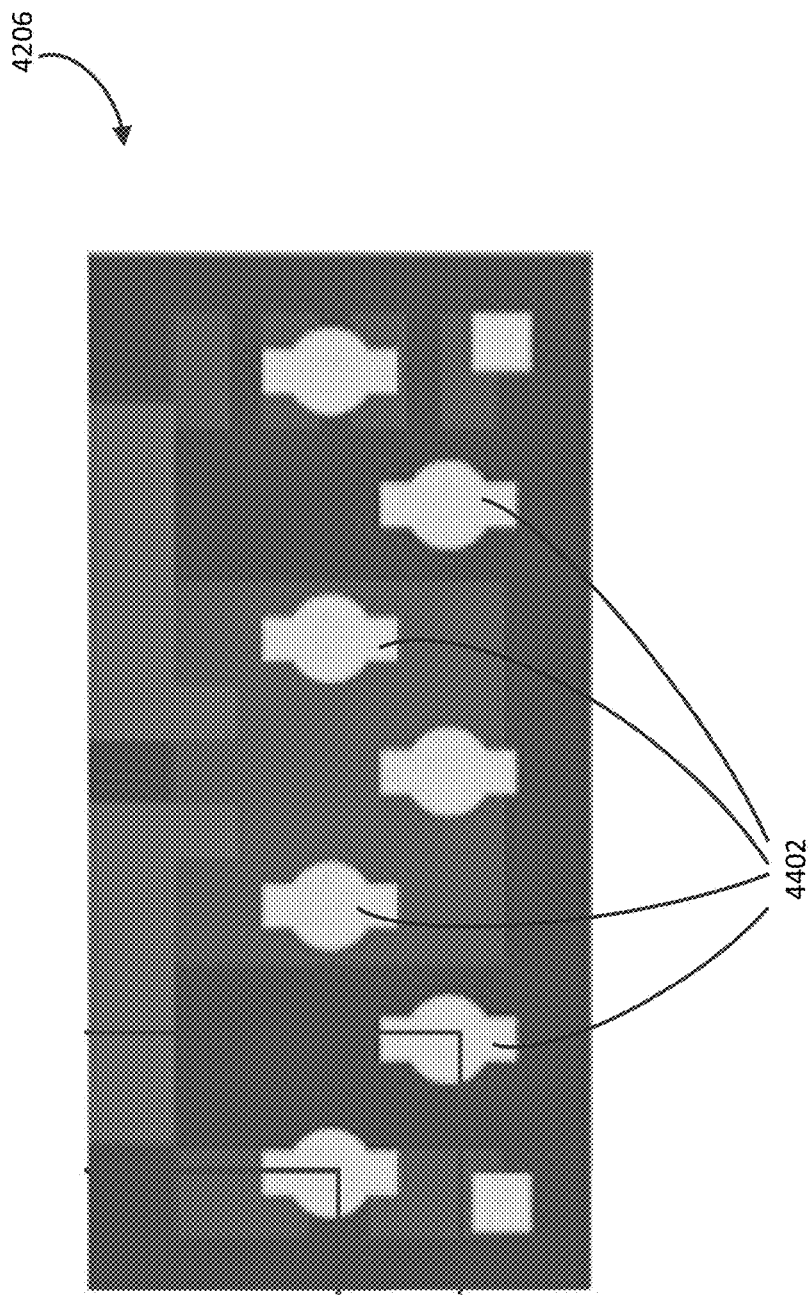
FIG. 45 illustrates contact pads for a 60-GHz transceiver chip that may be used according to an embodiment of the present invention.

FIG. 44 is another simplified cross-section view showing additional details of the electrical connections for first data port 4202 using interposer 4208 according to an embodiment of the present invention. Transceiver chip 4206 may have a number of electrical contact pads 4402 disposed on a back surface. For instance, as shown in FIG. 45, there may be seven contact pads 4402 arranged in two rows. Other configurations of contact pads may be used. Interposer 4208 may have a number of electrical leads 4404 corresponding to the number of contact pads 4402 Each electrical lead 4404 may be shaped as shown in FIG. 44 and held in position by an electrically insulating material 4406, which may be LCP or other plastic or other non-conductive material. Interposer 4208 may provide a right-angle bend in leads 4404. This may facilitate connection of leads 4404 to contacts corresponding contacts 4408 of printed circuit board 4210. Strain relief element 4410 (which may include, e.g., foam, rubber, or similar material) may be provided to protect printed circuit board 4210. Foam 4412 or other spacing material may be provided to facilitate assembly of data port 4202 into the housing of the first electronic device.

Figure 46:
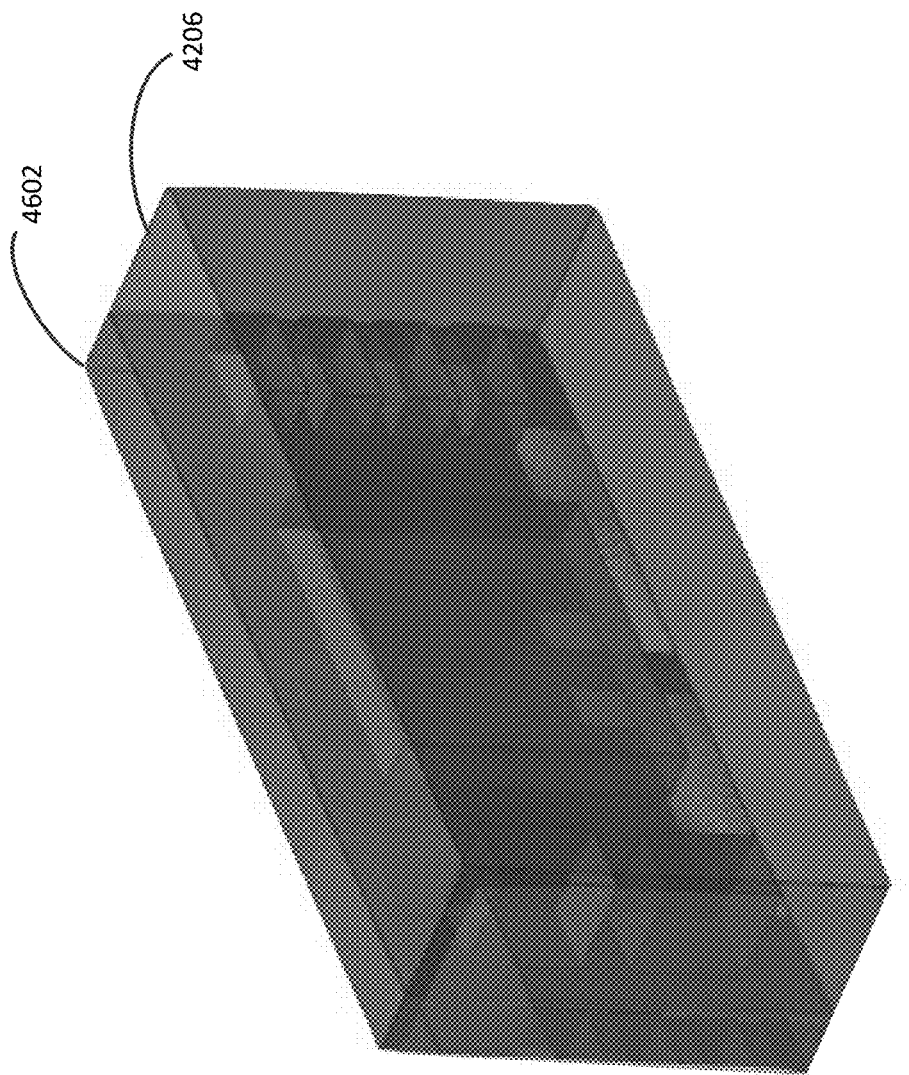
FIGS. 46-51 illustrate stages of an assembly process for a 60-GHz data port according to an embodiment of the present invention.

Assembly of an embodiment of data port 4202 will now be further described with reference to FIGS. 46-51, which show stages of an assembly process for a data port according to an embodiment of the present invention. FIG. 46 shows a simplified view of transceiver chip 4206. Transceiver chip 4206 may be a packaged semiconductor device that incorporates antenna components to generate and detect RF signals as well as signal processing circuitry (amplifiers, digital-to-analog converters, analog-to-digital converters, encoders, decoders, modulators, demodulators, etc.). A back surface portion 4602 of transceiver chip 4206 may have electrical contacts disposed thereon (e.g., as shown in FIG. 45) to supply power to transceiver chip 4206 and to provide signal input and output paths for data communication and control signals.

Figure 47:
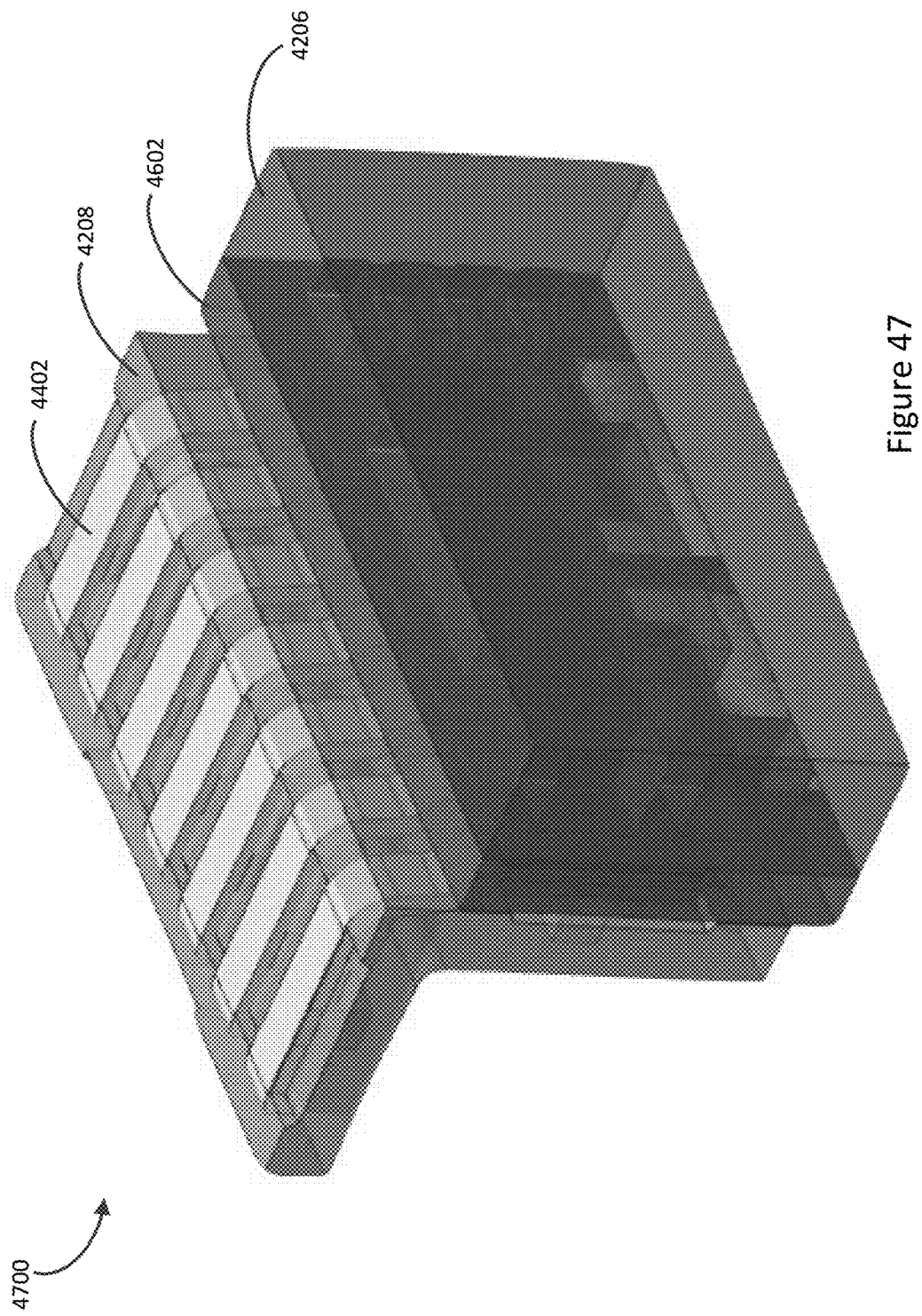

FIG. 47 shows an assembly stage 4700 in which interposer 4208 is bonded to back surface portion 4602 of transceiver chip 4206. Portions of leads 4402 may be exposed to make electrical contact with contacts 4402 on back surface portion 4602 of transceiver chip 4206. Top portions of leads 4402 may also be exposed. Other portions of leads 4402 may be encased in electrically insulating material (e.g., LCP or other plastic). In some embodiments, bonding of contacts 4402 to the contacts on the back surface portion 4602 of transceiver chip 4206 may be accomplished using soldering or sintering techniques. Soldering or sintering paste with a high reflow temperature may be used at this stage.

Figure 48:
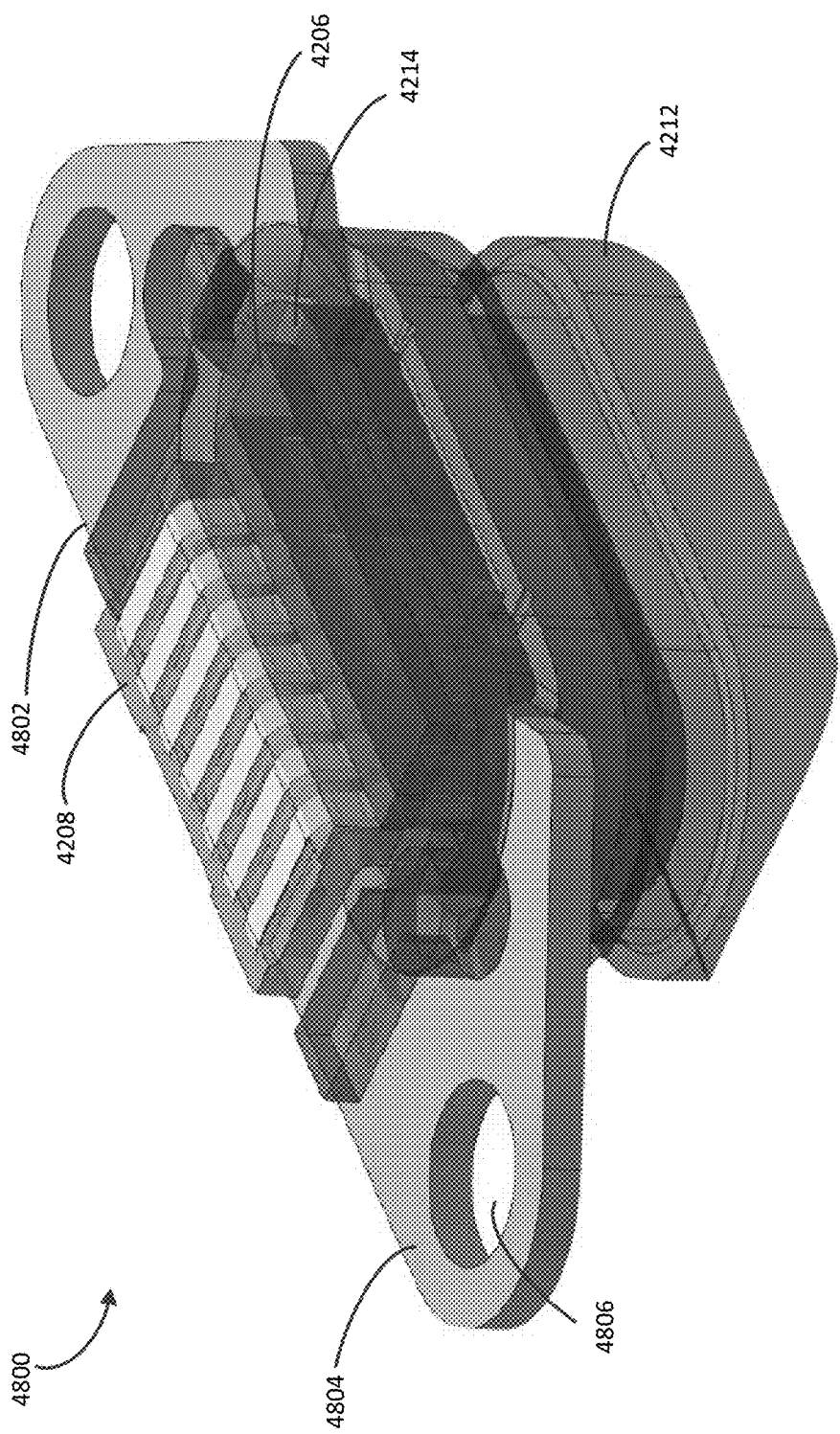

FIG. 48 shows a further assembly stage 4800. At this stage, interposer 4208 and transceiver chip 4206 may be inserted into housing 4212 and surrounded by encapsulating material 4214. In some embodiments, encapsulating material 4214 may be dispensed in a liquid form into housing 4212, and then cured. Housing 4212 may incorporate attachment structure 4802, which may include side tab regions 4804 with through-holes 4806 to facilitate attachment of assembled data port 4202 into the housing of an electronic device. Attachment structure 4802 may be made of stainless steel or other metals. The particular geometry of attachment structure 4802 and housing 4212 may be varied as desired.

Figure 49:
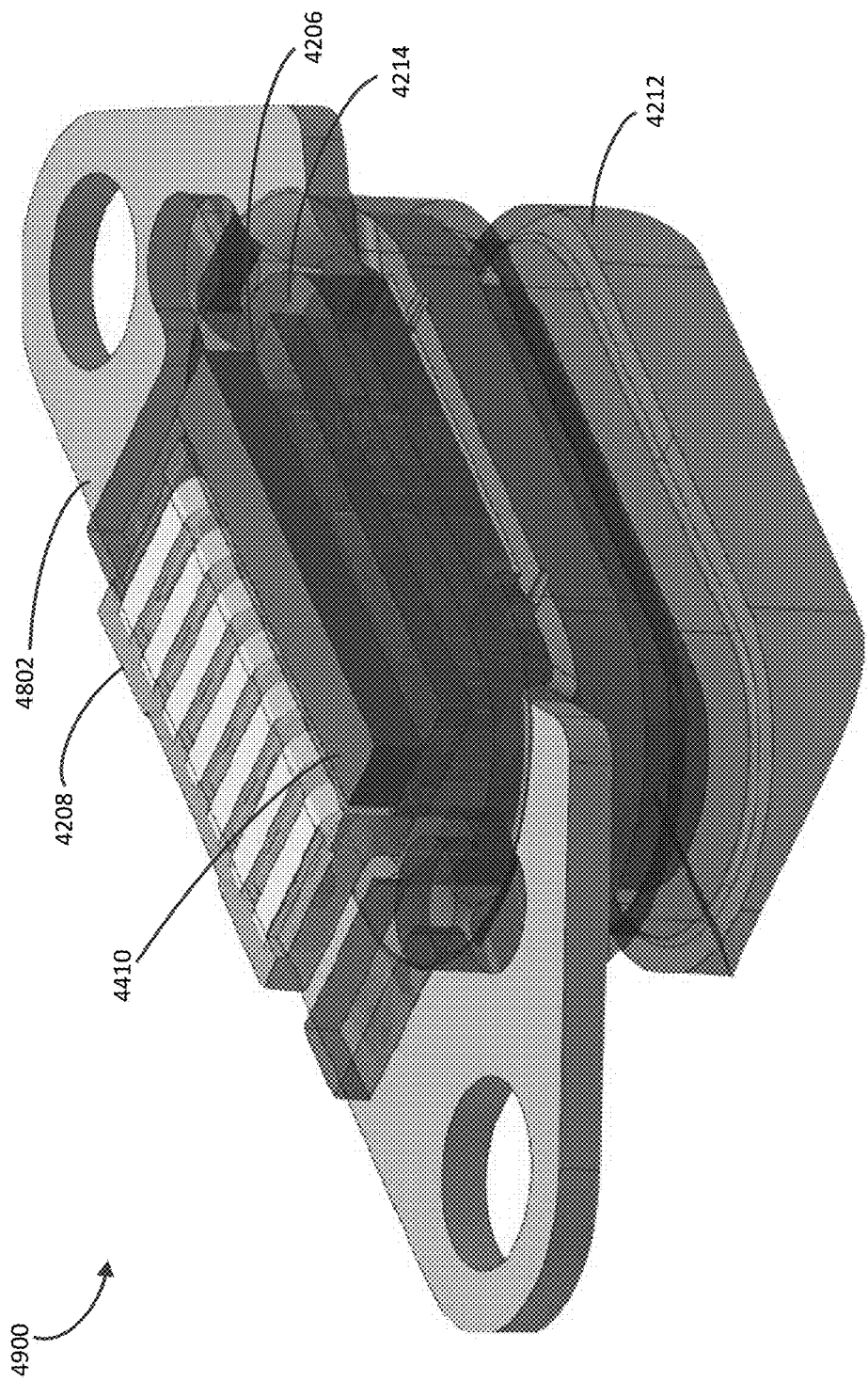

FIG. 49 shows a further assembly stage 4900. At this stage, strain relief element 4410 may be placed or attached to the exposed side surface of transceiver chip 4206.

Figure 50:
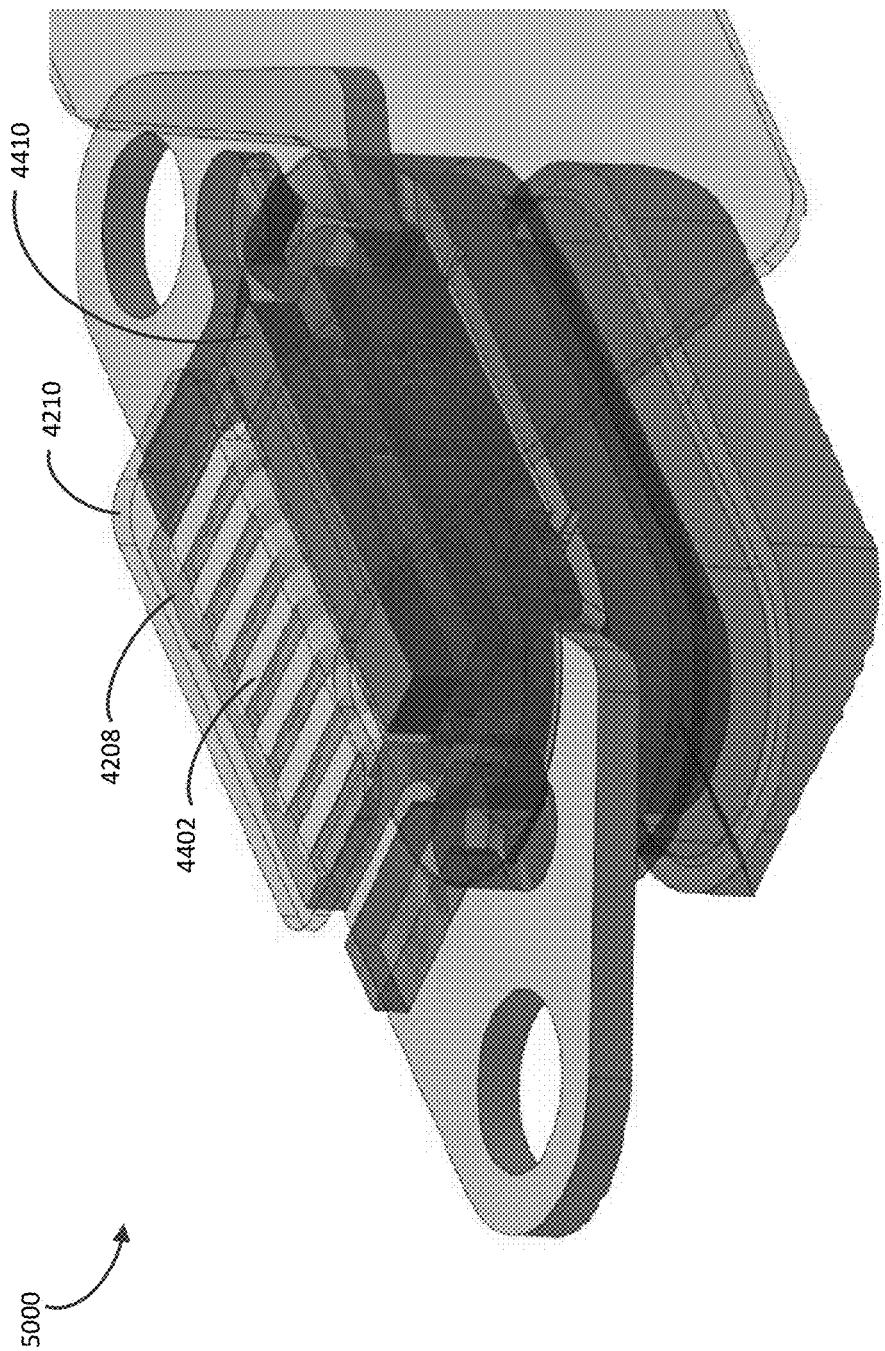

FIG. 50 shows a further assembly stage 5000. At this stage, flexible printed circuit board 4210 may be bonded to the exposed surfaces of leads 4402 of interposer 4208 to provide an electrical connection. Soldering techniques may be used. In some embodiments, a low-temperature reflow solder may be used at this stage, with the reflow temperature being low enough not to cause further reflow of solder or sintering paste used at assembly stage 4700. Strain relief element 4410 protects the bend radius of flexible printed circuit board 4210 to prevent damage. In some embodiments, strain relief element 4410 may be attached to flexible printed circuit board 4210 first, rather than to transceiver chip 4206.

Figure 51:
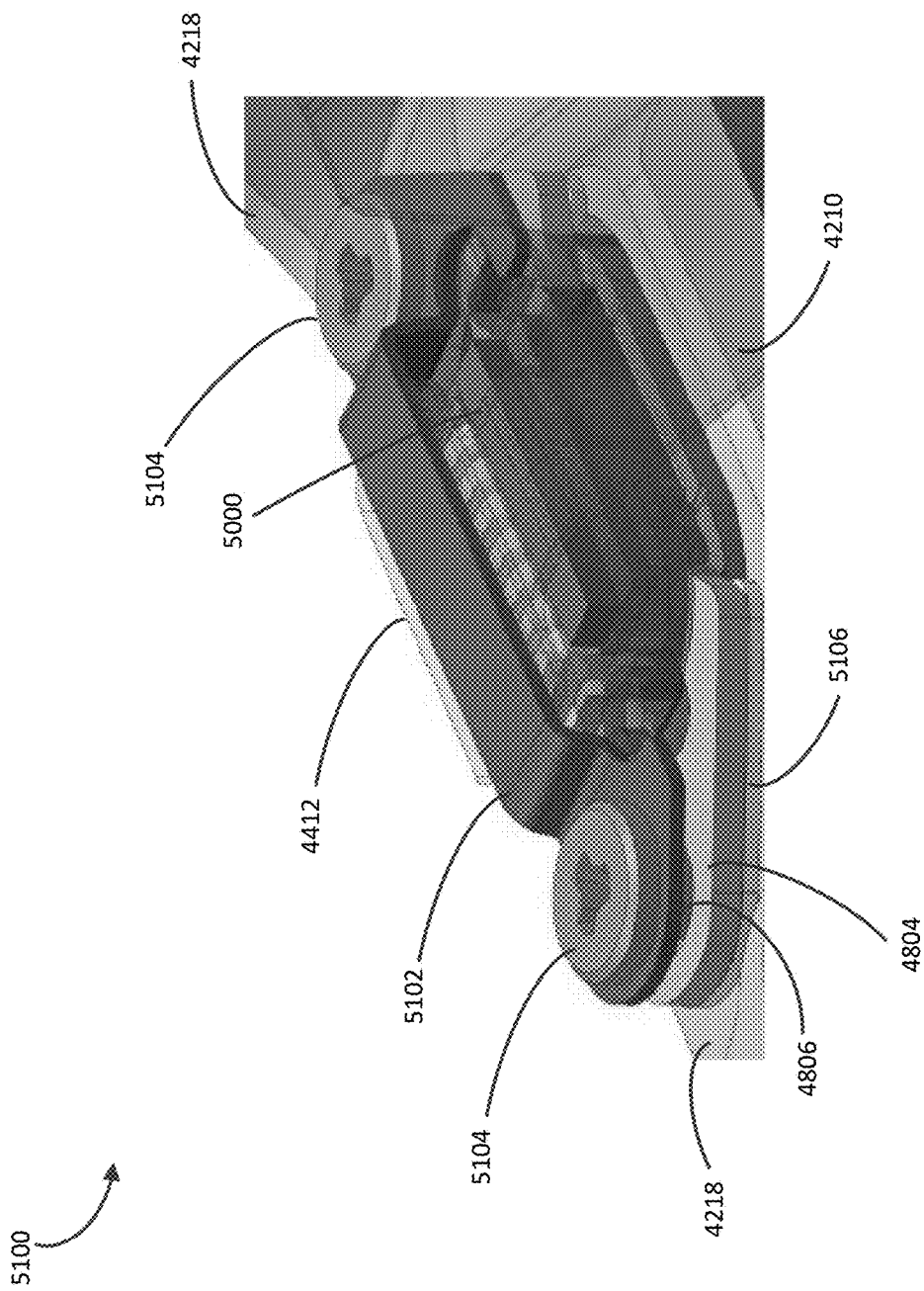

FIG. 51 shows a final assembly stage 5100. At this stage, assembly stage 5000 has been inserted into housing 4218 of a first electronic device. Assembly stage 5000 may be held in place by cowling 5102, which may be attached to housing 4218 using screws 5104 or other fasteners that may pass through holes 4806 in side tabs 4804. Foam 4412 may be placed between assembly stage 5000 and cowling 5102. A shim 5106 may be provided between side tabs 4804 and housing 4218. In some embodiments, shim 5106 may facilitate precise alignment of an exterior-facing surface of data port 4202 with an exterior surface of housing 4218. For example, in embodiments where the surface in which data port 4202 is installed slides laterally relative to a mating surface of a second electronic device, it may be desirable to provide a smooth exterior surface with no protrusions or indentations due to data port 4202. Flexible printed circuit board 4210 may extend into the interior of the first electronic device and may provide electrical connections to other circuits and components of the first electronic device. As shown, the assembly may be similar to data port 1804 shown in FIG. 18.

Figure 52:
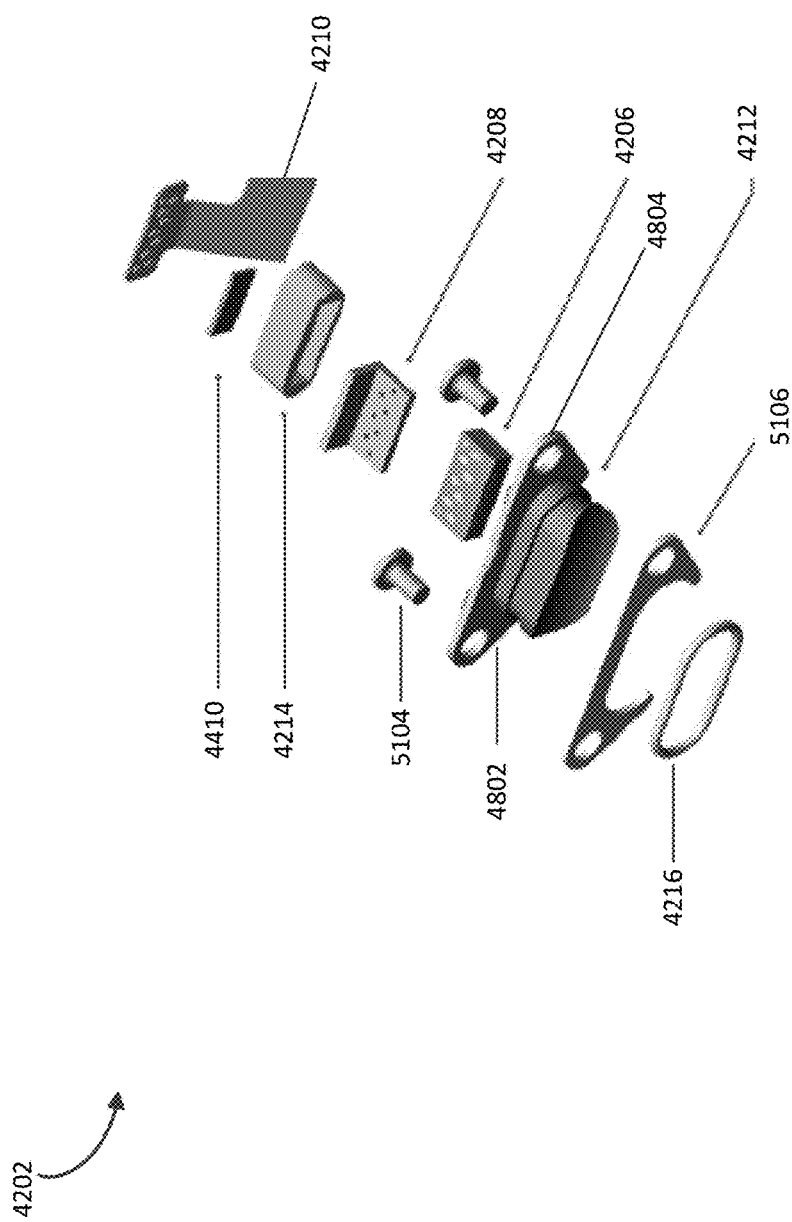
FIG. 52 illustrates an exploded view of an assembly for a 60-GHz data port according to an embodiment of the present invention.

A further understanding of assembly of data port 4202 may be had with reference to FIG. 52, which shows an exploded view of an assembly for data port 4202 according to an embodiment of the present invention. As shown, data port 4202 may include a housing 4212, which may be generally similar to housing 120 described above. Housing 4212 may include attachment structure 4802 with side tabs 4804. O-ring 4216 may be shaped to provide a seal between housing 4212 and a cavity in which housing 4212 is inserted, as described above. Transceiver chip 4206 may be connected to interposer 4208, which in turn may connect to flexible circuit board 4210. Strain relief element 4410 may provide protection for flexible circuit board 4210 where it bends to accommodate the shape of the first electronic device. Encapsulating material 4214 may surround and protect transceiver chip 4206 and a portion of interposer 4208. Data port 4202 may be inserted into a cavity in a housing of an electronic device and held in place using screws 5104 (or other fasteners) inserted through holes 4806 in side tabs 4804. Shim 5106 may be included between side tabs 4804 and the housing of the electronic device to provide precise alignment at an outer surface of the electronic device.

Data port 4202 may be used in an environment where a specific bend angle in flexible circuit board 4210 is desired, e.g., to accommodate the form factor (or internal geometry) of the electronic device in which data port 4202 is to be installed. In such environments, interposer 4208 may reduce the bend angle of flexible circuit board 4210. However, as noted above, assembly may require two reflow operations, and it may be desirable to simplify the assembly process.

Figure 53:
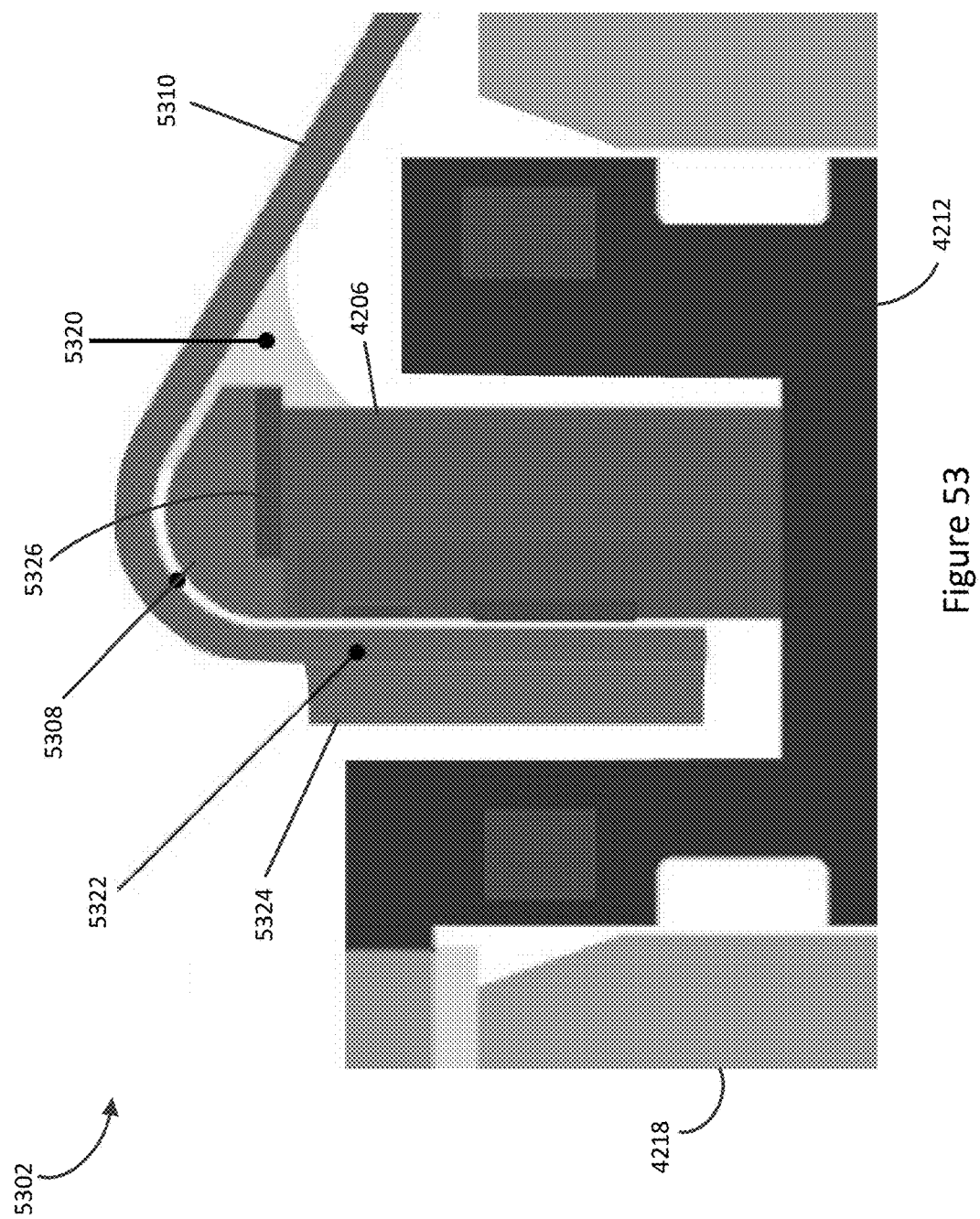
FIG. 53 illustrates a simplified cross section view of a 60-GHz data port according to another embodiment of the present invention.

In some embodiments, assembly may be simplified by connecting flexible circuit board 4210 directly to transceiver chip 4206 and using a mandrel to provide strain relief for the larger bend angle of the flexible circuit board. FIG. 53 shows a simplified cross section view of a 60-GHz data port 5302 according to an embodiment of the present invention. Data port 5302 may be generally similar to data port 4202 described above and may include a housing 4212 that holds 60-GHz transceiver chip 4206. Housing 4212 may be inserted in a cavity in housing 4218 of a first electronic device. Flexible circuit board 5310 may be connected to the back surface of transceiver chip 4206 and may bend around the top of data port 5302. In some embodiments, a mandrel 5308, which may be made of LCP or other dielectric material, may be provided. Mandrel 5308 may have an outer surface that is shaped to provide strain relief for flexible circuit board 5310. Glue 5320 or other adhesive may be used to secure flexible circuit board 5310 to mandrel 5308. In some embodiments, additional strain relief pads may be provided in the region 5322 where flexible circuit board 5310 contacts transceiver chip 4206. A stiffener 5324 may be applied to the back surface of flexible circuit board 5310 to provide additional mechanical strength for flexible circuit board 5310 and transceiver chip 4206. Encapsulating material (not shown) may fill the region around transceiver chip 4206, flexible circuit board 5310, and stiffener 5324, similar to encapsulating material 4214 described above.

Figure 54:
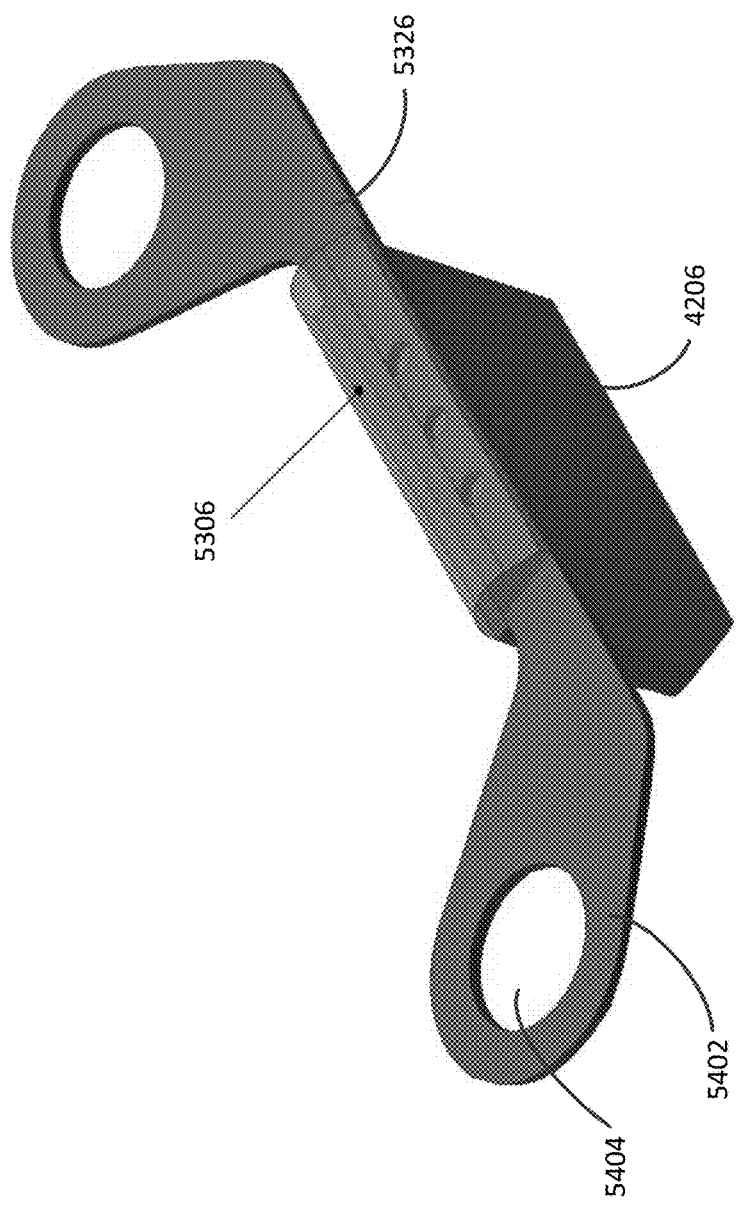
FIG. 54 illustrates a perspective view of a portion of the data port of FIG. 53 according to an embodiment of the present invention.

In some embodiments, mandrel 5308 may be attached to beam 5326. FIG. 54 shows a perspective view of a portion of data port 5302 according to an embodiment of the present invention. Mandrel 5308 may be attached to beam 5326, which in this example includes side tabs 5402 having through-holes 5404. Beam 5326, which may be made of stainless steel or the like, may provide additional alignment and mechanical strength for the assembly, as well as protection for transceiver chip 4206. In some embodiments, instead of polymers or plastics, mandrel 5308 may be formed of the same material as beam 5326, and mandrel 5308 and beam 5326 may be formed as a single integrated structure.

Figure 55:
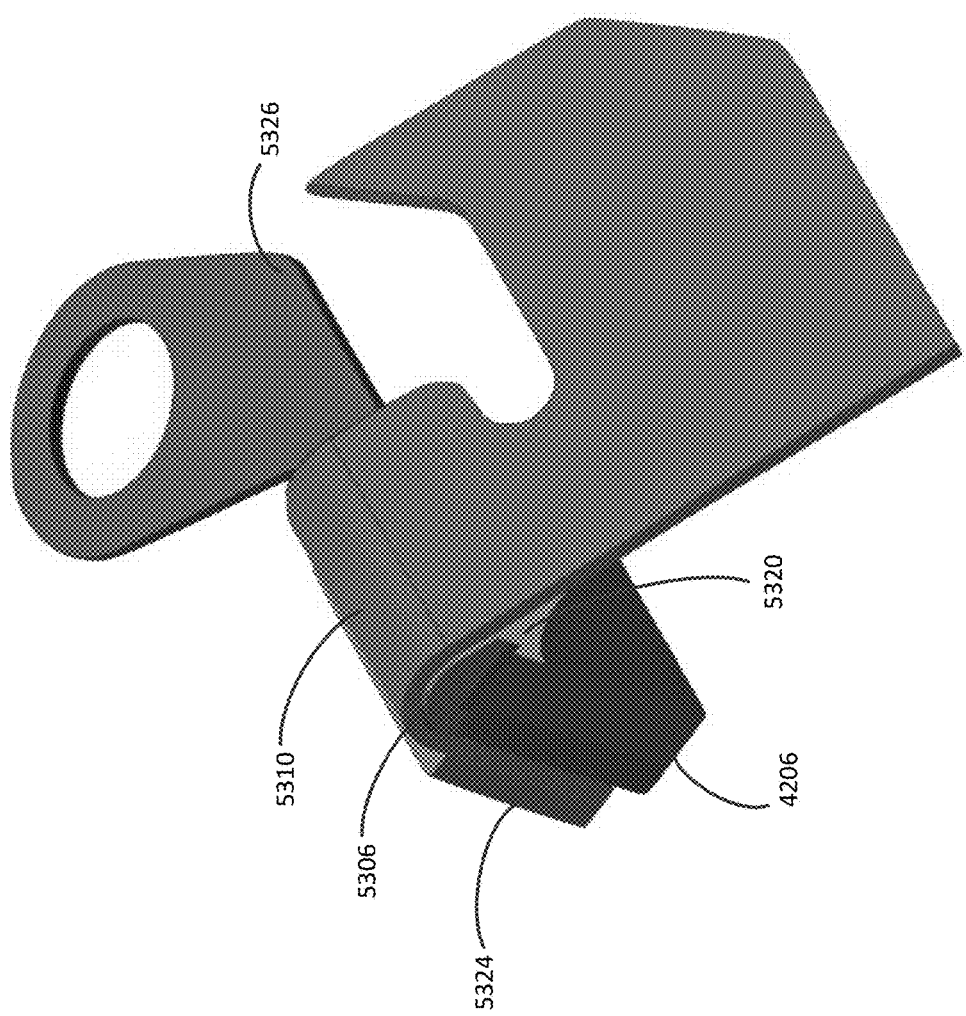
FIG. 55 illustrates a perspective cutaway view of a portion of the data port of FIG. 53 according to an embodiment of the present invention.

Further illustrating a data port assembly using a mandrel, FIG. 55 shows a perspective cutaway view of a portion of data port 5302 according to an embodiment of the present invention. As shown, beam 5326 is placed over the top side of transceiver chip 4206, and mandrel 5306 is opposite transceiver chip 4206. Flexible circuit board 5306 connects to electrical contacts on the back surface of transceiver chip 4206 and bends around mandrel 5306. Stiffener 5324 may be attached to the surface of flexible circuit board 5306 opposite transceiver chip 4206.

Figure 56:
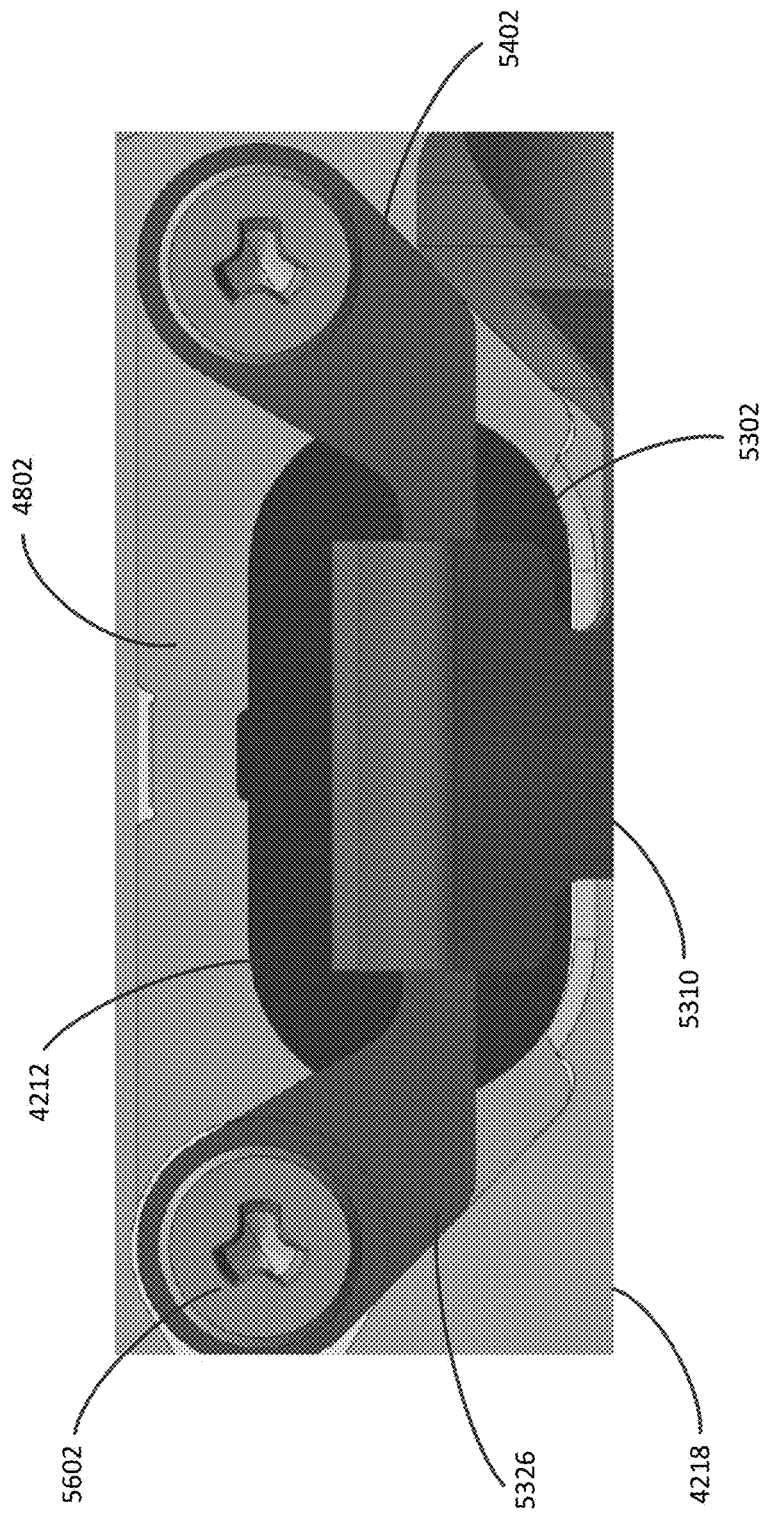
FIG. 56 illustrates a 60-GHz data port installed in an electronic device according to an embodiment of the present invention.

FIG. 56 shows data port 5302 installed in an electronic device according to an embodiment of the present invention. Data port 5302 may be inserted into an opening in housing 4218 of a first electronic device so that the bottom edge (as seen in FIG. 53) of transceiver chip 4206 is oriented toward the outside of the first electronic device. Housing 4212 may be sized and shaped to fit the opening in housing 4218 and may have attachment structure 4802 (as shown in FIG. 48) or another attachment structure. Flexible circuit board 5310 extends into the interior of housing 4212 to connect with transceiver chip 4206. The holes in side tabs 5402 of beam 5326 may align with holes in attachment structure 4802, allowing data port 5302 to be secured to housing 4218 using screws 5602 or other fasteners.

Figure 57:
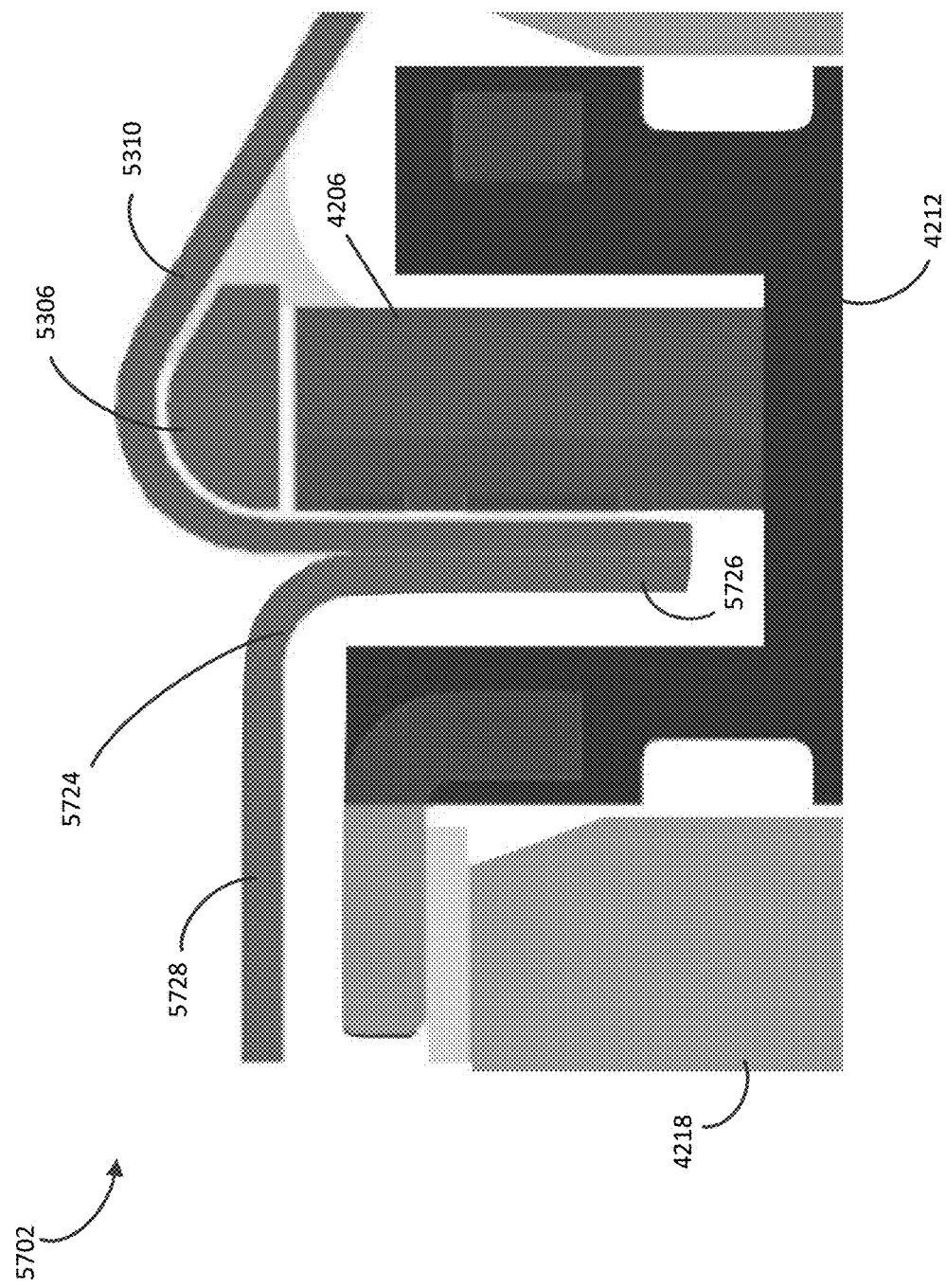
FIG. 57 illustrates a simplified side view of a 60-GHz data port according to another embodiment of the present invention.

In some embodiments, beam 5326 may be replaced using a stiffener tab. FIG. 57 is a simplified side view of a data port 5702 according to an embodiment of the present invention. Data port 5702 may be similar to data port 5302, except that beam 5326 is omitted and stiffener 5324 is replaced with a stiffener tab 5724. Stiffener tab 5724 may have a forward portion 5726 that may attach to flexible circuit board 5310 and a rear portion 5728 that extends over the top of data port 5702.

Figure 58:
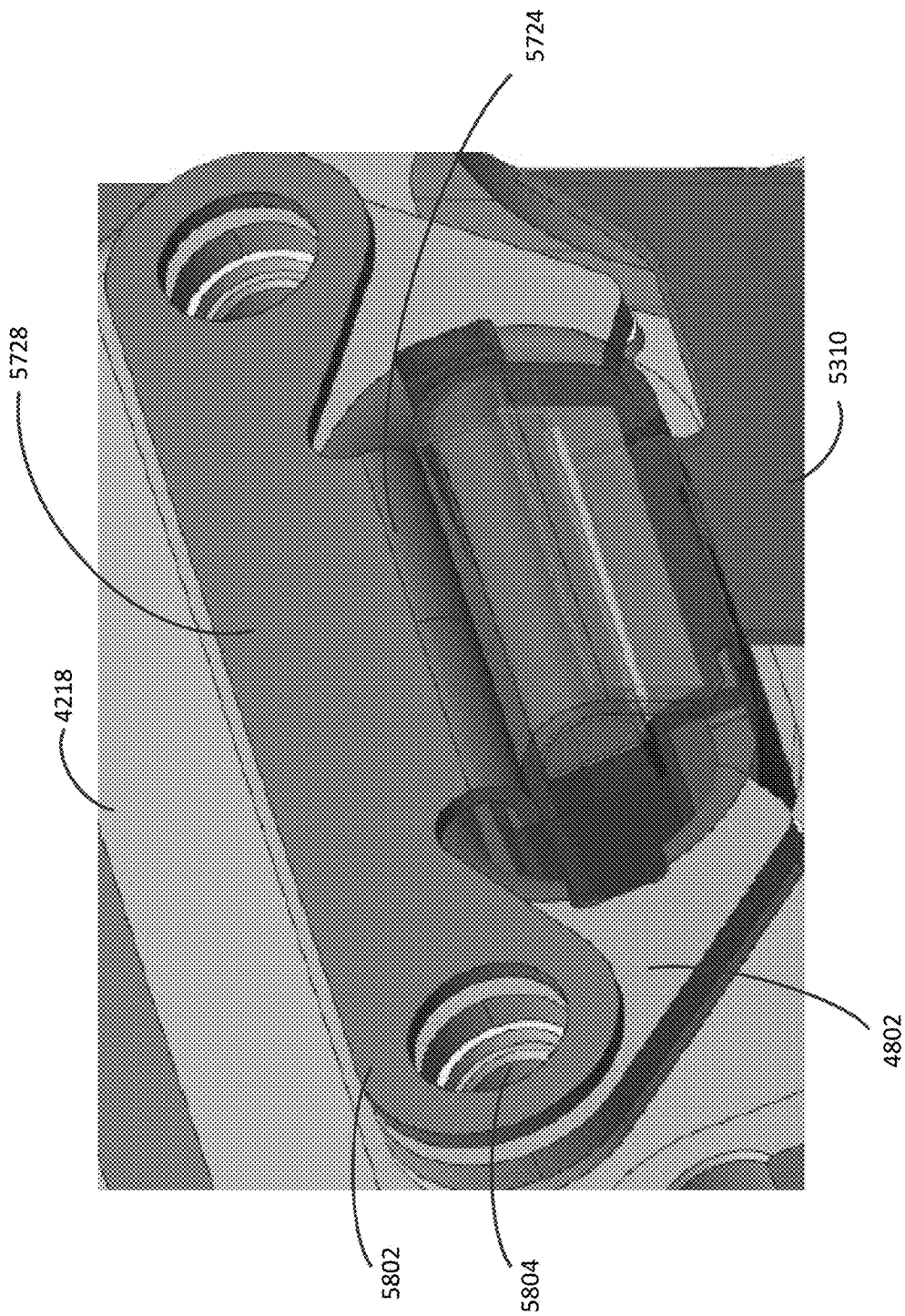
FIG. 58 illustrates a perspective view of the 60-GHz data port of FIG. 57 according to an embodiment of the present invention.

FIG. 58 is a perspective view of data port 5702 further illustrating a stiffener tab according to an embodiment of the present invention. As shown, rear portion 5728 of stiffener tab 5724 may be shaped to provide side tabs 5802 and through-holes 5804 that align with the through-holes of attachment structure 4802. Screws or other fasteners (not shown) may be used to hold the assembly in place.

Data port configurations of the type shown in FIGS. 44, 53, and 57 may be particularly useful in situations where the internal geometry of the electronic device in which the data port is included determines a particular exit path for a flexible circuit board or other electrical connection to the data port. For example, in FIGS. 44, 53, and 57, the angle between the back surface of transceiver chip 4206 and the exit path of flexible circuit board 4210 or 5310 is about 60 degrees. Use of an interposer (e.g., interposer 4208) or mandrel (e.g., mandrel 5306) may help to accommodate this angle while avoiding damage to the flexible circuit board or other components.

Figure 59:
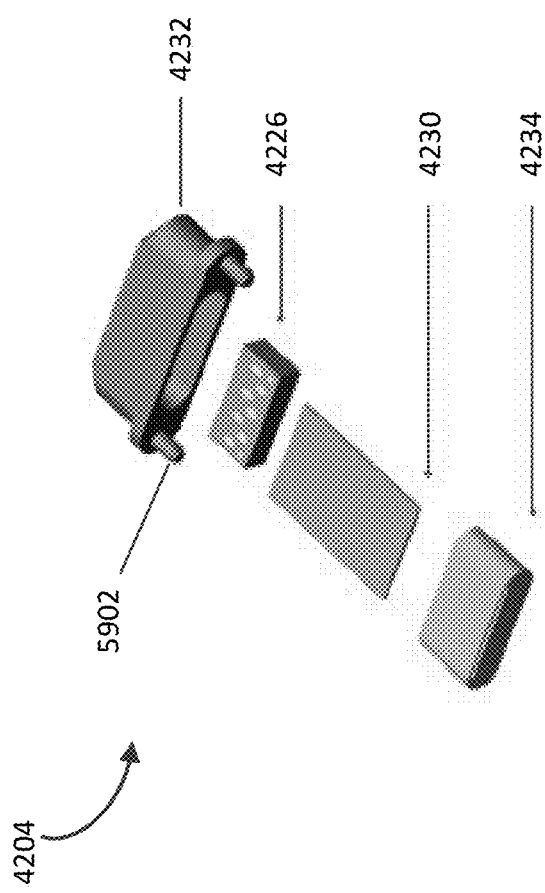
FIG. 59 illustrates a simplified exploded view of a 60-GHz data port according to another embodiment of the present invention.

In other situations, the internal geometry of an electronic device may allow for less of a sharp bend in a flexible circuit board. Where this is the case, the assembly of a 60-GHz data port may be simplified. For example, FIG. 59 shows a simplified exploded view of second data port 4204 (shown in cross section in FIG. 42) according to an embodiment of the present invention. As shown, data port 4204 may include a housing 4232, which may be generally similar to housing 220 described above. Housing 4232 may include mounting posts 5902 or other attachment structures to help hold data port 4204 in position in an electronic device. Transceiver chip 4226 may be connected to flexible circuit board 4230 and inserted into housing 4232. Encapsulating material 4234 (which may be similar to encapsulating material 4214) may be used to surround and protect transceiver chip 4226 and flexible circuit board 4230. Data port 4204 may be inserted into an opening in a housing of an electronic device.

The various 60-GHz data ports described above are illustrative, and variations and modifications are possible. The dimensions may be adapted to conform to the geometry of a particular connector assembly in which a data port is to be included. Materials may be varied as desired. In some embodiments, the performance of the transceiver chip may be affected by the dielectric coefficients of nearby dielectric materials. Accordingly, it may be desirable to make all plastic or other nonconductive materials in the data port from the same material (e.g., LCP) or from materials whose dielectric coefficients are similar to each other. For instance, where an interposer (e.g., interposer 4208) is used, the interposer may have the same dielectric coefficient as housing 4212.

In some embodiments, it may be desirable to provide water sealing around the transceiver chips and other electrical connections. Water sealing may be provided using conventional potting techniques (e.g., applying epoxy or other resins to seal the opening of the housing.

In some of the embodiments described above, the data port assembly is designed to accommodate the geometry of an electronic device in which the data port is to be included, for instance by providing various elements (e.g., interposer, mandrel) to provide electrical connections and strain relief for a flexible circuit board connected to the data port. It is to be understood that the shapes and dimensions of interposers and/or mandrels may be adapted for the internal geometry of a particular electronic device. Further, an interposer or a mandrel may also be used in connection with other types of data ports, such as the capacitive data ports of FIG. 19 or the optical data ports of FIG. 21, where it is desired to provide a data port with an electrical connection subject to particular geometric constraints.

In various embodiments of the present invention, the components of the connector assemblies may be formed in various ways of various materials. For example, conductive portions, and other portions such as the retention clips, may be formed by stamping, metal-injection molding, machining, micro-machining, 3-D printing, or other manufacturing process. The conductive and other portions may be formed of stainless steel, steel, copper, copper titanium, phosphor bronze, palladium, palladium silver, or other material or combination of materials. They may be plated or coated with nickel, gold, or other material. The nonconductive portions, such as the housings and other portions, may be formed using injection or other molding, 3-D printing, machining, or other manufacturing process. The nonconductive portions may be formed of silicon or silicone, Mylar, Mylar tape, rubber, hard rubber, plastic, nylon, elastomers, liquid-crystal polymers (LCPs), ceramics, or other nonconductive material or combination of materials. The transformer cores may be formed of ferrite material, such as a soft ferrite. The transformer cores may be sintered or subjected to other manufacturing steps. The flexible circuit boards may be replaced with printed circuit boards (PCBs) or other appropriate substrates.

Embodiments of the present invention may provide connector assemblies that may be located in, or may connect to, various types of devices, such as portable computing devices, tablet computers, desktop computers, laptops, all-in-one computers, wearable computing devices, cell phones, smart phones, media phones, storage devices, keyboards, covers, cases, portable media players, navigation systems, monitors, power supplies, adapters, remote control devices, chargers, and other devices. These connector assemblies may provide interconnect paths for signals that are compliant with various standards such as Universal Serial Bus (USB), High-Definition Multimedia Interface (HDMI), Digital Visual Interface (DVI), Ethernet, DisplayPort, Thunderbolt, Lightning, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. In various embodiments of the present invention, these interconnect paths provided by these connectors may be used to convey power, ground, signals, test points, and other voltage, current, data, or other information.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An inductive charging port for an electronic device, the inductive charging port comprising:
    a first housing located in a first opening of an enclosure for the electronic device; and
    an inductive coil around a transformer core, the transformer core fixed to the first housing and the enclosure such that a surface of the transformer core is exposed at the first opening of the enclosure, wherein a cover portion of the first housing covers the surface of the transformer core, and wherein the inductive charging port is sealed by a sealing structure between the enclosure and a sidewall of the first housing.

2. The inductive charging port of claim 1 wherein the sealing structure is an O-ring.

3. The inductive charging port of claim 1 further comprising a flexible circuit board electrically connected to the inductive coil.

4. The inductive charging port of claim 3 further comprising a bracket such that the flexible circuit board is between the bracket and the transformer core.

5. The inductive charging port of claim 3 further comprising a compliant piece such that the compliant piece is between the flexible circuit board and the transformer core.

6. An inductive charging port for an electronic device, the inductive charging port comprising:
- a first housing located in a first opening of an enclosure for the electronic device;
- an inductive coil around a transformer core, the transformer core fixed to the first housing, wherein the first housing and first inductive coil are movable relative to the enclosure;
- a second housing fixed to the enclosure; and
- a first resilient member having a first end around a first tail portion of the first housing and a second end in a first supporting cavity formed by sidewalls of the second housing, such that the first resilient member biases the transformer core in a direction out of the electronic device when the electronic device is not mated to a second device, and such that the first resilient member compresses such that the transformer core is moved in a direction into the electronic device when the electronic device is mated to a second device.

7. The inductive charging port of claim 6 further comprising a second resilient member having a first end around a second tail portion of the first housing and a second end in a second supporting cavity formed by sidewalls in the second housing.

8. The inductive charging port of claim 7 wherein the first and second resilient members are springs.

9. The inductive charging port of claim 8 wherein the springs bias the transformer core towards a surface of the enclosure when the electronic device is not mated to a second device and the springs compress allowing the transformer core to retract behind the surface of the enclosure when the electronic device is mated to a second device.

10. The inductive charging port of claim 9 wherein the second device mates with the electronic device by moving laterally along the surface of the enclosure, wherein the first housing includes a front surface having sloped lead-in features on each side of the transformer core such that as the second device moves laterally along the surface of the enclosure, one of the lead-in features encounters the second device and pushes the first housing into the electronic device.

11. The inductive charging port of claim 10 wherein a leading surface of the transformer core is recessed below peaks of the sloped lead-in features.

12. The inductive charging port of claim 6 wherein the inductive charging port is sealed by a sealing structure between the enclosure and a sidewall of the second housing.

13. The inductive charging port of claim 12 wherein the sealing structure is an O-ring.

14. An inductive charging port for an electronic device, the inductive charging port comprising:
- a first housing located in a first opening of an enclosure for the electronic device;
- an inductive coil around a transformer core, the transformer core fixed to the first housing, wherein the first housing and first inductive coil are movable relative to the enclosure;
- a first magnetic element fixed to the first housing; and
- a proximity sensor fixed to the enclosure, wherein when the electronic device is not mated to a second device, the first housing and the first magnetic element move away from the proximity sensor, and
- wherein when the electronic device is mated to a second electronic device, the first housing and the first magnetic element move towards the proximity sensor,
- wherein the proximity sensor uses the movement of the first magnetic element to detect a presence of the second electronic device.

15. The inductive charging port of claim 14 further comprising a second magnetic element fixed to the enclosure.

16. The inductive charging port of claim 15 further comprising a second housing fixed to the enclosure, wherein the proximity sensor and the second magnetic element are attached to the second housing.

17. The inductive charging port of claim 15 wherein the proximity sensor is a Hall-effect sensor.

18. The inductive charging port of claim 17 further comprising a first spring and a second spring each having a first end around a corresponding tail portion of the first housing and a second end in a corresponding supporting cavity formed by sidewalls of the second housing.

19. The inductive charging port of claim 18 wherein when the electronic device is not mated to a second device, the first spring and the second spring push the first housing and the first magnetic element away from the proximity sensor.

* * * * *